US006506139B2

(12) United States Patent
Hirt et al.

(10) Patent No.: US 6,506,139 B2
(45) Date of Patent: Jan. 14, 2003

(54) TRANSMISSION WITH AN ELECTRO-MECHANICAL ENERGY CONVERTER

(75) Inventors: Gunter Hirt, Lichtenau-Scherzehim (DE); Martin Brandt, Bühl/Baden (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/825,206

(22) Filed: Apr. 2, 2001

(65) Prior Publication Data

US 2002/0082134 A1 Jun. 27, 2002

Related U.S. Application Data

(63) Continuation of application No. PCT/DE99/03086, filed on Sep. 23, 1999.

(30) Foreign Application Priority Data

| Oct. 2, 1998 | (DE) | 198 45 521 |
| Nov. 9, 1998 | (DE) | 198 51 606 |
| Nov. 10, 1998 | (DE) | 198 61 042 |
| Dec. 16, 1998 | (DE) | 198 58 043 |
| Jul. 19, 1999 | (DE) | 199 33 764 |

(51) Int. Cl.[7] .................................. B60K 1/02
(52) U.S. Cl. ........................................ 477/3
(58) Field of Search .................. 74/661, 339; 477/3; 180/65–7

(56) References Cited

U.S. PATENT DOCUMENTS

| 4,463,621 A | 8/1984 | Fisher |
| 4,685,343 A | 8/1987 | Ehrlinger et al. |
| 5,259,260 A | 11/1993 | Schreider |
| 5,337,848 A | * 8/1994 | Bader .................. 180/65.2 |
| 5,875,691 A | * 3/1999 | Hata et al. .................. 74/661 |
| 6,006,620 A | * 12/1999 | Lawrie et al. .................. 74/335 |
| 6,251,042 B1 | * 6/2001 | Peterson et al. .................. 477/3 |

FOREIGN PATENT DOCUMENTS

| DE | 28 05 594 A 1 | 8/1979 |
| DE | 41 22 628 A 1 | 1/1993 |
| DE | 197 30 858 A1 | 1/1998 |
| EP | 0 348 622 A 2 | 1/1990 |
| EP | 0 492 152 A 1 | 7/1992 |
| EP | 0 845 618 A 2 | 6/1998 |
| FR | 2 689 821 A 1 | 10/1993 |
| WO | WO 99/32315 | 7/1999 |
| WO | WO 99/33682 | 7/1999 |

* cited by examiner

Primary Examiner—Dirk Wright
(74) Attorney, Agent, or Firm—Darby & Darby

(57) ABSTRACT

A motor vehicle transmission, shiftable between different transmission ratios, with an input shaft, an output shaft, and in some cases a countershaft has a plurality of gears arranged to cooperate in gear pairs, a plurality of clutches, and an electro-mechanical energy converter. The electro-mechanical energy converter can be coupled to the transmission through at least one of the clutches in order to perform at least one of the functions of starting the combustion engine of the vehicle, temporarily replacing or assisting the combustion engine in propelling the vehicle, maintaining vehicle traction during gear shifts, generating electrical energy from kinetic energy, and storing said electrical energy in a storage device.

38 Claims, 34 Drawing Sheets

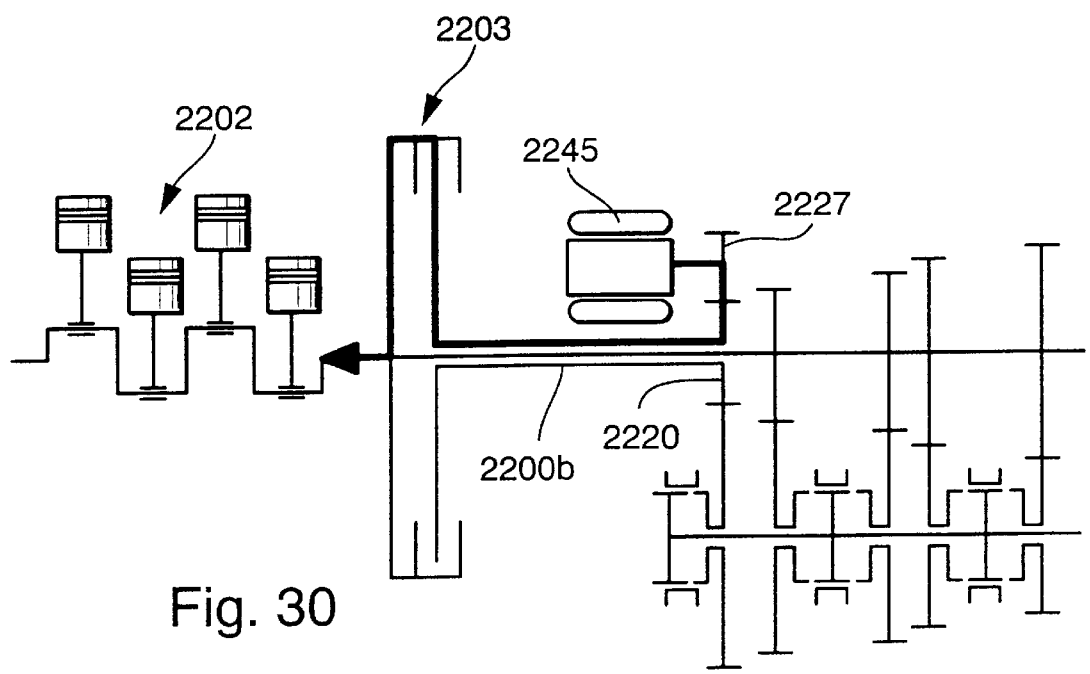
Fig. 30
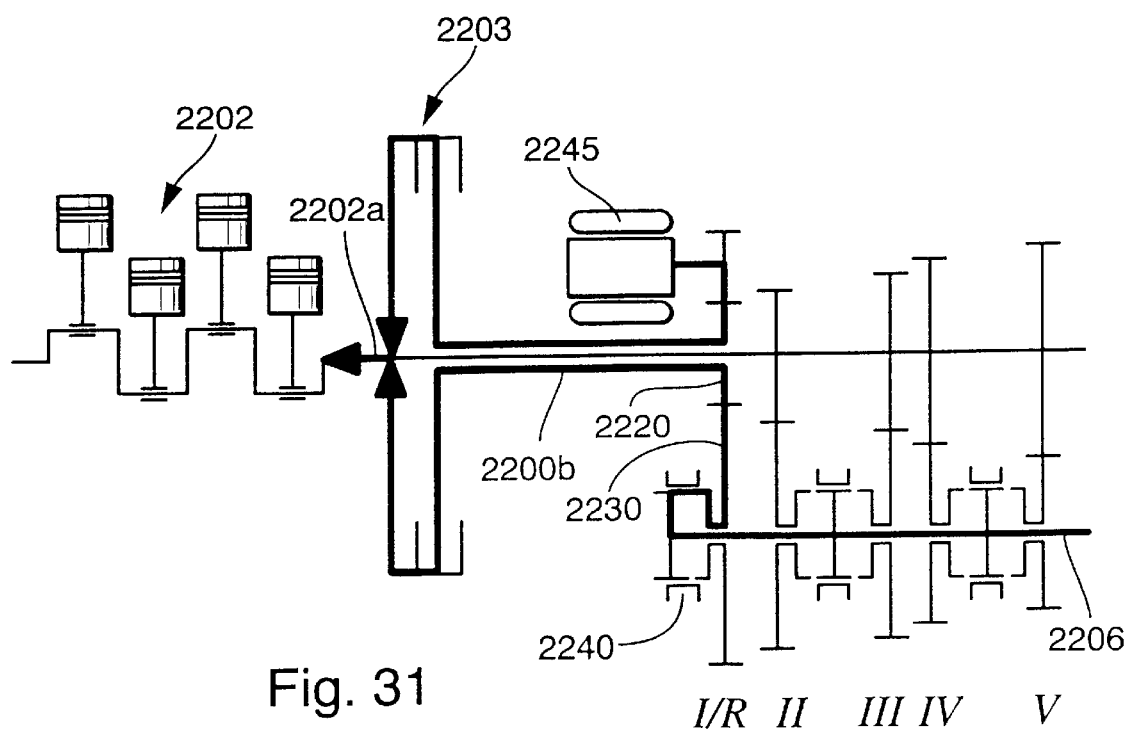
Fig. 31    I/R   II   III IV   V

TRANSMISSION WITH AN ELECTRO-MECHANICAL ENERGY CONVERTER

This is a continuation of PCT/DE99/03086, filed Sep. 23, 199

BACKGROUND OF THE INVENTION

The invention relates to a transmission, especially for motor vehicles, with at least two shafts, i.e. an input shaft, an output shaft, and in some cases a countershaft. The transmission has at least two or more pairs of gears, each pair consisting of a free gear and a fixed gear. The free gears have shift clutches by which they can be selectively coupled or uncoupled in rotation-locking engagement with a first shaft. The fixed gears are permanently tied to share the rotation of their shaft(s).

Transmissions of this kind are generally known in the field of automotive technology. They suffer from the drawback that they cannot transmit power during gear shifts. Consequently, there is an interruption in the tractive force when shifting gears to change the transmission ratio.

Furthermore, in vehicles with a transverse layout of the combustion engine, the axial space available for the power train is limited, which imposes severe design constraints on integrating an axially mounted electro-mechanical energy converter for generating electrical energy from kinetic energy and/or as a supplementary drive source. However, the use of electro-mechanical energy converters performing multiple functions is a desirable feature in modern power train concepts.

OBJECT OF THE INVENTION

It is therefore the object of the present invention to improve the design of a transmission of the aforementioned kind and to optimize the spatial layout, so that an electro-mechanical energy converter can be integrated in the transmission to perform the functions of, e.g., a starter for the combustion engine, an electric generator, or a supplementary drive source. In the latter function, the electro-mechanical energy converter serves to eliminate or at least reduce the temporary loss in traction during gear shifts.

SUMMARY OF THE INVENTION

According to the invention, the foregoing objective is met by a transmission, specifically a shiftable gear transmission with at least two shafts, i.e., an input shaft, an output shaft, and in some cases a countershaft. The input shaft is driven by a combustion engine by means of a crankshaft. The transmission has two or more gear pairs and an electro-mechanical energy converter. The electro-mechanical energy converter has a rotor and a stator. At least one clutch in the transmission serves to couple the electro-mechanical energy converter to at least one of the shafts.

The rotor can be coaxially arranged on the input shaft, output shaft, or another shaft of the transmission, with a clutch between the rotor and the shaft. A second shaft may also be equipped to be coupled to the electro-mechanical energy converter through a clutch. The electro-mechanical energy converter can also have its own rotor shaft, running parallel to one of the transmission shafts, where the rotor shaft can be driven or can drive one of the transmission shafts, e.g., by way of one of the fixed gears or through a separate gear provided specifically for this purpose. Belt drives or chain drives, including those with an automatically variable ratio such as a continuously variable cone-pulley transmission, are especially advantageous. As a further possibility, the electro-mechanical energy converter could be coupled to a flywheel, particularly a flywheel of the combustion engine.

A transmission according to the invention can, in principle, include a shiftable gear transmission with at least two shafts, e.g., an input shaft, an output shaft, and in some cases countershaft. The transmission has at least two or more pairs of gears, each pair consisting of a first gear (also called free gear) and a second gear (also called fixed gear). The free gears have shift clutches or sliding sleeves by which they can be selectively coupled or uncoupled in rotation-locking engagement with a first shaft. The fixed gears are permanently locked to a second shaft. To change the transmission ratio, at least one of the shift clutches or sliding sleeves is designed to be moved automatically by an actuator, e.g., an electric motor, electro-magnet, or by a hydraulic or pneumatic device. A shift clutch can be a friction-locking or form-locking clutch. Shift clutches as well as sliding sleeves (which serve to couple and uncouple the connections of free gears to their shafts) can be equipped with appropriate synchronization means.

In a transmission according to the invention, it can further be of advantage if the electro-mechanical energy converter can be switched selectively between the at least two shafts, e.g., between the input shaft and the output shaft of the transmission. In another embodiment of the invention, only one shaft, i.e., either the output shaft or the input shaft of the transmission, is configured to be connectable to the electro-mechanical energy converter by means of a clutch that can be moved into and out of engagement by an automated actuator of the kind described above.

To contribute further to the solution of the problem targeted by the invention, the electro-mechanical energy converter can be operated in such a way that during a gear shift for changing the transmission ratio from one level to another, the electro-mechanical energy converter is used to reduce the temporary loss in vehicle traction by delivering a driving torque to the output shaft. For example, in a gear shift with the steps of disengaging the start-up clutch, shifting out of the current gear, shifting into the new gear, and re-engaging the start-up clutch, the electric motor generator can be activated at the point where the start-up clutch begins to slip, i.e., where it no longer transmits the full amount of the engine torque to the input shaft of the transmission. The decrease and loss of torque passing through the start-up clutch can be at least partially compensated by an increasing contribution of torque from the electro-mechanical energy converter. Since the time interval for a gear shift is very short, it can be advantageous if the electro-mechanical energy converter is designed for a nominal continuous-duty power capacity that is less than the peak amount of torque which has to be compensated during a gear shift. Thus, the electro-mechanical energy converter will be under a thermal overload during a short time interval, e.g., at up to 300% of nominal power capacity, but this has the advantage that the dimensions of the motor/generator can be kept at a minimum. The deployment of the torque generated by the electro-mechanical energy converter is advantageously controlled in a manner where the torque on the output shaft varies smoothly, e.g., in a linear or other continuous transition, from the torque level required with the previously engaged gear to the torque level required for the new gear level. Especially with motor/generators of very small dimensions, it can also be advantageous if the traction-supporting torque of the motor/generator available during the interruption in vehicle traction is kept smaller than the lesser of the torques required for the previous or new gear ratio, e.g., between 100% and 30%, but preferably between 100% and 50% of the torque needed for the gear that requires the lower amount of torque.

It is further advantageous, if the transmission input shaft can be connected to the crankshaft of the combustion engine, e.g., through a start-up clutch that is controlled either automatically by means of an actuator or manually. The start-up clutch can be a dry-friction clutch, laminar disc clutch, or a hydrodynamic clutch such as a hydrodynamic torque converter or a fluid coupling (also called Fottinger coupling) which in some cases may have a converter-bypass clutch. Also advantageous is a design where the start-up clutch is arranged on a dual-mass flywheel. The start-up clutch can be advantageously accommodated in the clutch bell housing between the combustion engine and the transmission, or it can be arranged inside the transmission. Furthermore, the clutch that connects the electro-mechanical energy converter to the input shaft can be configured as a dual clutch together with the start-up clutch, and it can likewise be accommodated in the clutch bell housing or in the transmission. In special applications, it can also be advantageous if the clutch that couples the electro-mechanical energy converter to the input shaft is arranged outside the transmission and the start-up clutch is omitted.

The different clutches, such as the start-up clutch, the clutches of the free gears, as well as clutches by which the electro-mechanical energy converter is coupled to the input or output shaft, are engaged and disengaged by actuators, as mentioned previously. In principle, it is possible to operate all or at least some, especially two, clutches by means of one appropriately designed actuator. For example, this could be an actuator controlling the clutches by way of a sliding valve piston which controls each clutch through a hydraulic or pneumatic device with at least one master cylinder and one slave cylinder, associated connecting conduits, as well as a pressure source. As another possibility, the actuator could be an electric motor acting on two or more clutches through appropriate linkage mechanisms. It is particularly advantageous to combine actuators for clutches that move in the same axis, engaging preferably in opposite directions or engaging with different amounts of axial displacement, such as dual clutches and/or the clutches or sliding sleeves that serve to engage the free gears of the transmission. As an example of a particularly advantageous arrangement, one actuator may be used for engaging and disengaging the clutches, while a second actuator is used to select the clutch or sliding sleeve that needs to be engaged in order to shift into the desired gear ratio. The latter arrangement is known per se from conventional manually or automatically shifted transmissions, e.g., transmissions laid out according to an H-pattern and shifted by means of two electric motors. In order to optimize the shift process, the actuators, especially electric motors or electro-magnets, may be equipped with a series-mounted reducing or magnifying gear mechanism.

An electro-mechanical energy converter arranged to act on the input shaft of the transmission can be used to start the combustion engine, if the clutch between the input shaft and the electro-mechanical energy converter is engaged. It is advantageous if the vehicle also has a start-up clutch and a flywheel mounted on the input shaft. This provides the benefit of using the momentum of a moving mass to start the engine by first accelerating the flywheel and then engaging the start-up clutch to let the built-up kinetic energy start the engine with or without the simultaneous support of the electro-mechanical energy converter. If the electro-mechanical energy converter is arranged to be coupled to the output shaft, then the connection to the input shaft can be made, e.g., through one of the gear pairs, with the start-up clutch engaged and the free gear of the gear pair disengaged from the output shaft.

The electro-mechanical energy converter can further be used as drive source to drive at least a part of the transmission, i.e., at least one gear level, e.g., first or reverse gear. The engageable connection between the input shaft and the output shaft can be made directly through the respective gear pair, and the gear that connects to the electro-mechanical energy converter can be a free gear that can be coupled to its shaft through a clutch.

In a further mode of operation, the rotor of the electro-mechanical energy converter can be driven by a part of the transmission, e.g., a gear pair of one of the shift stages, to convert mechanical kinetic energy into electrical energy, where the electrical energy could be delivered to a storage device, e.g., a battery with a high current rating. The kinetic energy can be provided by the combustion engine, e.g., while the vehicle is moving, or also when the vehicle is standing still and the transmission is running in neutral. A torque flow path from the combustion engine and the electro-mechanical energy converter can be established through a suitable combination of clutch settings, e.g., by engaging the start-up clutch and the clutch that connects the electro-mechanical energy converter to the input or output shaft.

A further use of the electro-mechanical energy converter is in the recovery of kinetic energy from slowing down the vehicle. This requires that a torque-flow path be made available between the electro-mechanical energy converter and the output shaft, e.g., by engaging a clutch between the output shaft and the electro-mechanical energy converter if the latter is arranged on the output shaft. If the electro-mechanical energy converter is arranged on the input shaft, the torque flow path between the input and output shaft can be established through a gear pair with a free gear that can be locked by means of a clutch or sliding sleeve. The electro-mechanical energy converter can have a gear on its rotor shaft that is rotationally coupled to the input-shaft gear of the aforementioned pair, with a clutch to couple and uncouple the torque-transmitting connection to the electro-mechanical energy converter. This arrangement allows the electro-mechanical energy converter to recover and store energy that would otherwise be lost as heat energy in the brakes or in working against the drag torque of the engine. It may be advantageous, depending on the amount of braking action required, to couple or uncouple the combustion engine by means of the start-up clutch.

The electro-mechanical energy converter can further be used as the sole source of drive power or as a supplementary drive source to support the combustion engine (booster function), where the start-up clutch is engaged, disengaged, or in slipping engagement depending on the desired drive mode.

The electro-mechanical energy converter can be integrated in the transmission, so that the rotational axis of the rotor is coaxial to the input shaft or output shaft of the transmission, or the rotor shaft of the electro-mechanical energy converter can ran parallel to the input or output shaft of the transmission.

In an advantageous embodiment, the transmission according to the invention can be arranged with transverse orientation in the front portion of the vehicle. Another embodiment can involve an advantageous lengthwise arrangement in the front portion of the vehicle. The transmission according to the invention can also be used in other advantageous power train layouts.

The actuators of the clutches or shifter elements in different embodiments are advantageously based on electric motors with rotary movement of an output element or electric motors with linear movement of an output element, including linear motors. It is also advantageous to use rotary hydraulic actuators (such as gear pumps, vane pumps, etc.), linear hydraulic actuators (such as piston/cylinder units, etc.), rotary pneumatic actuators (vane pumps, etc.), linear pneumatic actuators (pistons, etc.), piezo-electric actuators, and thermo-mechanical actuators.

An actuator can have force-amplifying mechanisms interposed between a motor and an actuating element, including, e.g., levers, wedges, cam-disc devices, threaded spindles, worm gears, spur gears, planetary gear sets, etc. Actuators can also work with hydraulic or pneumatic transmitting devices employing master cylinders and slave cylinders, or with pressure-medium based devices in general.

To drive the movement of the actuator-controlled element, motion-transmitting devices can be used to good advantage, including adjustable or self-adjusting transmitting devices, mechanical devices such as levers, pull ropes, rods, slides, wedges, curve-follower devices, etc.; or hydrostatic devices such as master/slave cylinders with or without sniffle bores, hydrodynamic and pneumatic devices.

The functions of several individual actuators for selecting and shifting gears in a gear-changing process can also be combined through the use of transmitting mechanisms. This makes it possible to shift more gear pairs than there are actuators. Examples for this are shift transmissions with an H-shaped shifting pattern or a shift-control cylinder which can shift between any number of gear levels with a single actuator. The clutches, including a start-up clutch as well as other clutches, can be of a conventional push- or pull-action design, where in a non-actuated state the clutch engagement is maintained by a spring-bias force of an energy-storing device. A clutch can further be of a force-reducing, self-adjusting type, in which the effect of wear, e.g., on the friction linings is automatically compensated. In a further embodiment, the clutch can be an actuator-engaged clutch whose engagement has to be maintained at least in part by an actuator force.

It is advantageous to include a torsional oscillation damper in the power train, e.g., with a spring damper unit between the engine and the start-up/shift clutch. The damper can be integrated in the clutch disc or in a dual-mass flywheel.

Sensors are arranged to monitor the rpm rates of the engine and the transmission. The output rpm rate of the transmission can also be calculated from the wheel rpm rates. It can further be advantageous, if an rpm sensor is arranged at the transmission input shaft.

A motor vehicle transmission according to the present invention may further include:
  a control unit with microprocessor including signal-processing functions, electronics, control logic, signal amplifiers, data bus systems, etc.;
  indicator systems such as warning light, acoustic warning device, shift-level indicator, etc.;
  an operator-control element such as stick-shift lever, switch, etc.;
  programs with selector elements for selecting between automatic shift, manual shift, winter mode, sport mode, individual driving habit adapter, etc.;
  an electronic engine control unit with electronic fuel-injection control, such as the so-called E-gas feature, in the combustion engine (electro-motoric, electronic, or other operating principle);
  a sensor arrangement for the detection of engine rpm rate, wheel rpm rate, vehicle doors not shut, hood not shut, etc.;
  a data and control signal communication system between the transmission control unit and the engine control unit of the combustion engine.

With a transmission as described above, an electro-mechanical energy converter can be designed as an integral combination of starter motor, generator, alternator, starter/generator, decelerator/auxiliary drive source. It is advantageous if the electro-mechanical energy converter is of a type that performs functions including engine start, generating electricity for the on-board power system of the motor vehicle, and in some cases electrical braking to recover kinetic energy, in which case the surplus electrical energy is put back into the power train. The electro-mechanical energy converter can also be used to assist in synchronizing the transmission and to decelerate the transmission input shaft to zero when the vehicle is standing still. This offers the advantage that synchronizer rings can be omitted in some embodiments of the invention. The electro-mechanical energy converter can also be used advantageously to supply torque to the power train during shift phases in order to smooth out abrupt declines of the drive torque.

The electro-mechanical energy converter can apply torque to the combustion engine by acting on the flywheel. In the case of a dual-mass flywheel, the electro-mechanical energy converter can work on the primary or secondary flywheel. In another embodiment, it is advantageous if the electro-mechanical energy converter works or acts on the transmission input shaft, either in a coaxial or offset arrangement. The electro-mechanical energy converter can drive the combustion engine directly or through an intermediate gear mechanism. The intermediate gear mechanism can have a fixed or variable transmission ratio. It may be switchable between two or more fixed ratios, or the ratio may be variable in a continuous range without steps. The setting of a ratio may be performed under the control of a centrifugal device or by an actuator.

The rotary movement of the electro-mechanical energy converter can be transmitted to the engine shaft or to the transmission input shaft through the following rotation-transmitting elements:
  Tooth-profiled gears (spur gear, bevel gear, etc.)
  Endless-loop drives (chain, V-belt, gear belt, etc.)
  Hydraulic drives (pump/motor, etc.)

The engine can be started, among other possibilities, in one of the following two ways. Either the electro-mechanical energy converter is used to accelerate the combustion engine directly, or the electro-mechanical energy converter is first brought up to speed independently and then coupled to the combustion engine, e.g. by engaging a friction clutch, in order to use the momentum of a higher rpm rate to start the engine. The latter kind of starting method can be performed through the start-up clutch after the electro-mechanical energy converter has first accelerated the input shaft of the transmission.

With transmissions according to the invention, it is possible to direct the full power of the electro-mechanical energy converter to the output side of the power train or to the input or output shaft of the transmission. Under different operating conditions of the transmission, it may also be enough to direct only a part of the full power of the electro-mechanical energy converter to the input or output shaft.

Arrangements are possible, where the electro-mechanical energy converter can be switched between the input shaft and the output shaft of the transmission.

The electro-mechanical energy converter can be operatively coupled to the input shaft of the transmission to perform one of the following: starting the combustion engine, generating electrical energy from kinetic energy of the engine or transmission, recovering energy, decelerating the rpm rate at the electro-mechanical energy converter (ratio change between the input and output shaft), setting the vehicle in motion with the electro-mechanical energy converter as drive source for the vehicle, boosting the propulsive power of the vehicle by using the electro-mechanical energy converter in tandem with the combustion engine, and moving the vehicle in reverse.

The electro-mechanical energy converter can be operatively coupled to the output shaft of the transmission to perform one of the following: filling the gap in vehicle traction during a shift phase of the transmission when, e.g., the start-up clutch on the input side is at least partially disengaged, generating electricity from kinetic energy of the engine or the transmission, recovering energy, decelerating the rpm rate at the electro-mechanical energy converter (ratio change between the input and output shaft), setting the vehicle in motion with the electro-mechanical energy converter as drive source for the vehicle, boosting the propulsive power of the vehicle by using the electro-mechanical energy converter in tandem with the combustion engine, and moving the vehicle in reverse.

In advantageous design variations, the electro-mechanical energy converter is arranged to act on:

a gear set for one of the forward speeds, a gear on the input shaft, a gear on the output shaft, or the gear set for reverse drive.

The shift clutch of the gear set driven by the electro-mechanical energy converter can be advantageously configured as follows:

form-locking or friction-locking clutch at the gear on the input shaft, or form-locking or friction-locking clutch at the gear on the output shaft.

A friction-locking clutch may be arranged with a gear on the input shaft and used as start-up clutch.

The actuators may be configured advantageously as electrically energized actuators or pressure-energized (hydraulic or pneumatic) actuators.

One actuator may be advantageously employed to actuate more than one shift clutch of the gear set of the electro-mechanical energy converter or to actuate all other shift elements, e.g., through a shift cylinder or a central shift-control shaft.

A torque-transmitting arrangement between the electro-mechanical energy converter and a gear stage of the transmission is advantageously configured:

as a direct-driving coaxial arrangement, with a constant up/down ratio through an intermediate gear, with a constant up/down ratio through a gear stage, with a continuously variable transmission, or with a step-shifting transmission.

Based on an estimate, the minimum power rating required in an electro-mechanical energy converter in a vehicle is nominally between 2 and 20 kW, preferably around 10 kW, assuming that the electro-mechanical energy converter can handle short-term overload conditions. If the electrically propelled driving mode is to be comparable to the combustion-powered mode and if, e.g., the first transmission level is to be replaced by an electrically powered speed level, it is practical to design the electro-mechanical energy converter for a nominal power of about 35 kW.

According to the inventive concept for the power train, the actuation of the start-up clutch and the shift transmission are automated. A control unit coordinates the functions and also regulates the electro-mechanical energy converter. The control unit communicates with other control devices of the vehicle, e.g., by way of a controller-area-network (CAN) bus.

The transmission control unit can be combined with other control units, e.g., of the combustion engine and the brake system (e.g., in the case of an electrical brake) and for the recovery of kinetic energy. The commands as to which operating mode is to be used and which gear is to be engaged may be dictated by a master control unit of the entire drive train.

If the power-steering system, the coolant pump and, if applicable, further auxiliary devices are operated electrically, the belt-drive(s) for these devices can be completely eliminated, whereby friction is reduced in the combustion engine.

The electro-mechanical energy converter has to be operable both as a motor and as a generator. To the extent possible and within the given capacity limit, the torque needs to be controllable independently of the rpm rate of the rotor through a voltage control, so that through an appropriate actuating means, the electro-mechanical energy converter can be set to run at the desired point of its operating characteristic (exciter field attenuation). It is also advantageous if the electro-mechanical energy converter has the capability to withstand short-term overload situations, because the operating modes as an engine starter and as a substitute drive source during traction gaps require a high power output only during short time intervals.

If the reverse gear of the shift transmission is to be replaced by a purely electrical reverse-drive mode, the electro-mechanical energy converter needs to be designed so that it can run in either sense of rotation, and the electronic power control must be capable of directing the flow of electric power accordingly.

Suitable types of power plants are externally excited machines such as reluctance motors, asynchronous motors, EC motors, DC shunt motors and, possibly, synchronous motors and stepper motors. The control capability of the machine should include its use as an energy-recovering brake.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

In the following detailed description, examples of embodiments of the invention are discussed on the basis of the attached drawing in which

FIGS. 20 to 35 illustrate advantageous operating modes of the inventive transmission;

DETAILED DESCRIPTION OF PREFERRED EMBODIMENTS

Figure 1:
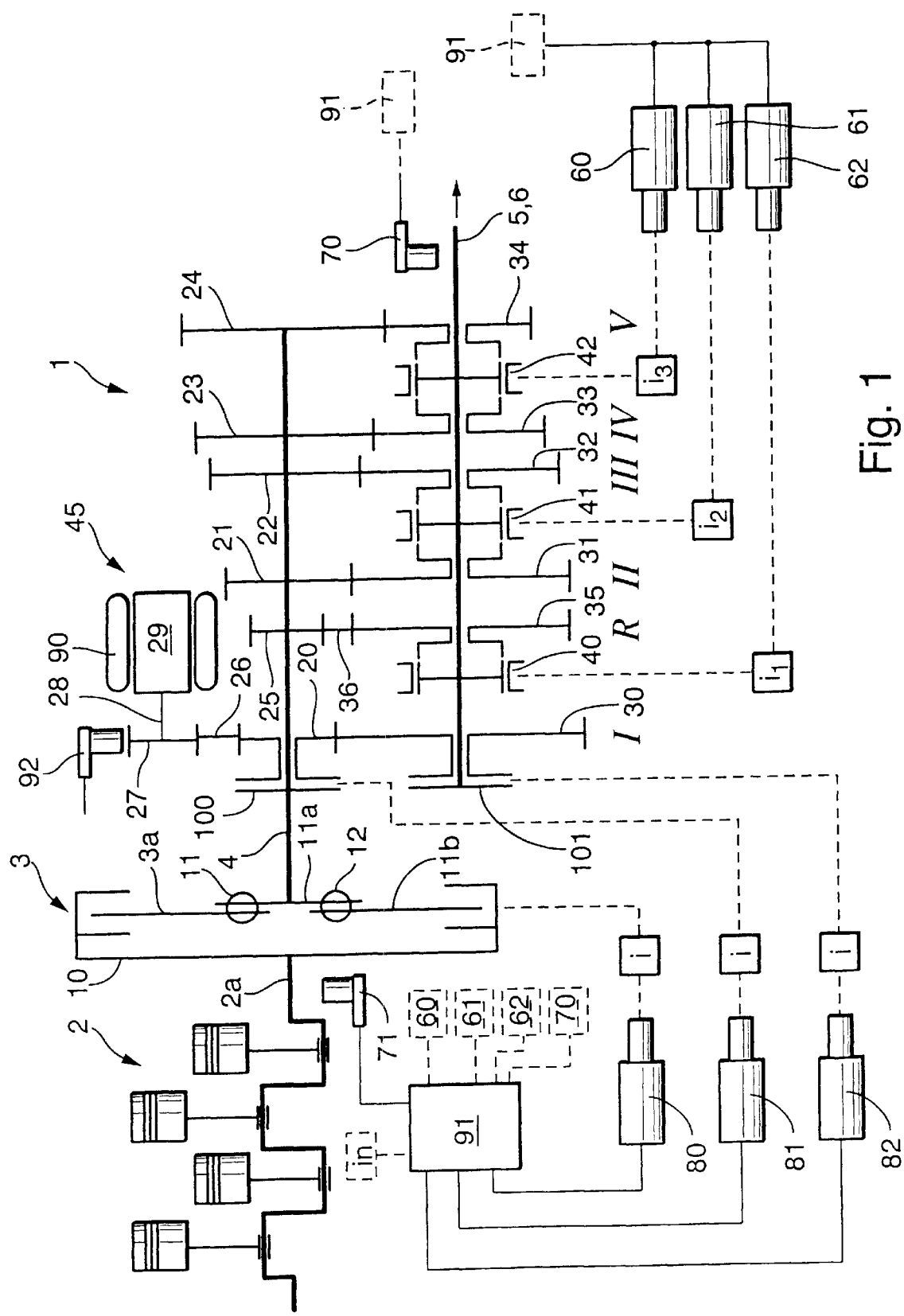
FIGS. 1 to 19 represent advantageous embodiments of the inventive transmission.

FIG. 1 gives a schematic view of a motor vehicle transmission 1 arranged in series after a drive source 2, such as a combustion engine, and a start-up or shift clutch 3, such as a friction clutch that is rotationally constrained to the crankshaft 2a of the combustion engine 2. The transmission has an input shaft 4, a countershaft 5, and in some cases an additional output shaft 6. In the example of FIG. 1, the countershaft 5 and the output shaft 6 are constituted by one and the same shaft.

Between the engine 2 and the transmission 1 is a flywheel 10 on which the friction clutch 3 with a pressure plate and a clutch cover is arranged in an essentially known manner. The rigid flywheel 10 can be replaced by a dual-mass flywheel that has two momentum-carrying masses rotatable in relation to each other against position-restoring forces generated, e.g., by energy-storing devices that are arranged between the two masses of the flywheel.

A torsional vibration damper 11 is arranged between the clutch disc 3a and the transmission input shaft 4. The radially outer portions of the clutch disc may have friction linings to effect a frictional engagement with the pressure plate (not shown in detail). The torsional vibration damper has at least two disc-shaped components 11a, 11b that are rotatable in relation to each other against tangentially directed position-restoring forces, e.g., of energy-storing devices 12 that may be arranged between the disc-shaped components.

The shafts, i.e., the input shaft 4, output shaft 6 and, if applicable, the countershaft 5 of the transmission 1 are rotatably supported by means of bearings (not shown) in a transmission housing (also not shown), radially centered and, if necessary, axially constrained.

The input shaft 4 and the output shaft 6 are arranged essentially parallel to each other. In another embodiment, the output shaft can also be coaxial with the input shaft, likewise supported and centered in bearings inside the transmission housing.

The start-up and shift clutch 3 in an advantageous embodiment is configured, e.g., as a wet running friction clutch inside the transmission housing. In another advantageous embodiment, the clutch 3 is designed, e.g., as a dry friction clutch arranged in a bell housing that is axially interposed between the engine 2 and the transmission 1.

The fixed gears 21, 22, 23, 24 and 25 for the shift levels R, I, II, III, IV, V are axially and rotationally fixed on the input shaft 4 of the transmission 1. They mesh with the free gears 31, 32, 33, 34 and 35 that are arranged on the output shaft 6 and can be rotationally locked to the latter through the clutches 40, 41, 42. Gear 20 is a free gear on the input shaft 4, and gear 30 is a free gear on the output shaft 6. The gears 20 and 30 can be rotationally locked to their respective shafts through the clutches 100, 101. The clutches 100, 101 can be configured as friction clutches allowing a certain amount of slippage, so that a synchronization device is not necessarily required. The gear 20 meshes with a direction-reversing gear 26 which, in turn, meshes with a gear 27 that is rotationally fixed on the rotor shaft 28, so that the rotor 29 can be connected to or disconnected from the input shaft 4 by means of the clutch 100. By way of the gear 30, which meshes with the gear 20, the electro-mechanical energy converter 45 can further be connected to or disconnected from the output shaft 6 by means of the clutch 101. A direction-reversing gear 36 is interposed between gears 25 and 35. Thus, the group of gears 25, 35, 36 represents the combination for the reverse drive mode (R). The gear pair 20, 30 represents the combination for first gear (I) and also serves for the connection to the electro-mechanical energy converter 45. The gear pair 21, 31 represents the combination for second gear (II), the gear pair 22, 32 represents the combination for third gear (III), the gear pair 23, 33 represents the combination for fourth gear (IV), and the gear pair 24, 34 represents the combination for fifth gear (V). It is self-evident, that different arrangements of gear pairs with different layouts for the gear ratios or a different placement of the free gears on the input shaft or output shaft can likewise constitute advantageous embodiments and are included in the scope of the invention.

The reverse gear (R) can be brought into a form-locking, rotationally fixed engagement to the output shaft 6 by moving the clutch 40, which can have the form of a sliding sleeve, in an axial direction out of its neutral position. In like manner, the gears 31, 32 and 33, 34 can be brought into form-locking engagement to the output shaft 6 by pushing the respective sliding sleeves 41, 42 in one axial direction or the other. In each case, this will cause the engagement of the shaft 6 with only one of the two adjacent gears that share a sliding sleeve, e.g., the gears for the levels II and III, or the gears for the levels IV and V, because the sliding sleeves 41, 42, by moving in one direction, will engage the shaft 6 to the gear 31 or 33, and, by moving in the other direction, to the gear 32 or 34, respectively.

As illustrated, the layout of the transmission 1 is structured into three component groups, each of which is constituted by two gear pairs with a clutch, such as a sliding sleeve, arranged between them.

In further examples of advantageous embodiments, the clutches 40, 41 and/or 42 can be configured as form-locking clutches such as dog clutches. Also, in another advantageous embodiment, the clutches can be friction clutches with conical or plane friction surfaces in a circular, ring-shaped arrangement of one or more friction surfaces such as a laminar-disc clutch. The clutches may further comprise a synchronization device with one or more synchronizer rings.

As is evident from the drawing, the gear pairs of first and reverse gear with the additional reverse idler gear constitute the first component group within the transmission, the gear pairs of second and third gear constitute the second component group, and the gear pairs of fourth and fifth gear constitute the third component group. The gear level I is engaged by means of the clutches 100, 101, which also serve to couple the electro-mechanical energy converter to the input shaft 4 or output shaft 6.

The sliding sleeves 40, 41 and 42 for shifting the gears R and II to V of the transmission 1 are shifted between their different axial positions by means of actuator units 60, 61, 62. The actuators 60, 61, 62 act on their associated sliding sleeves 40, 41, 42, respectively, through a connection such as a rod linkage, a rope pull, a Bowden cable, or a selector shaft. The actuator unit may be energized by an electric motor, electro-magnet, and/or a pressure device such as a hydraulic unit. The actuating connections $i_1$, $i_2$, $i_3$ may further include a motion-amplifying or -reducing mechanism.

The scope of transmissions according to the invention also includes, for example, four-speed transmissions with four forward gears and a reverse gear, or six-speed transmissions with six forward gears and a reverse gear, without restricting the general applicability of the concepts of the invention.

An rpm sensor 70 serves to measure the rpm rate at the output of the transmission, i.e., the rpm rate of the shaft 6. A further rpm sensor 72 may be provided to measure the rpm rate of the input shaft 4. An rpm sensor 71 serves to measure the rpm rate of the engine.

The transmission according to the invention offers the further advantageous possibility that the electro-mechanical energy converter 45, whose stator 90 can be mounted on the transmission housing, can serve as starter for the combustion engine 2 by driving the shaft 4 with the clutch 100 engaged and the clutch 101 disengaged. The electro-mechanical energy converter 45 can also be operated as an electric generator in an energy-recovery mode, in which kinetic energy is supplied from the output shaft 6 through the engaged clutches 100 and 101, where the combustion engine may or may not be disengaged from the drive train. Alternatively, in a reversal of the function as a starter motor, the electro-mechanical energy converter 45 can be supplied with kinetic energy by the engine through the engaged start-up clutch 3. This operating mode is available with the clutch 101 disengaged if the vehicle is standing still, or with the clutch 101 engaged if the vehicle is moving, while the clutch 100 is engaged in either case. It is self-evident that in simplified embodiments of the invention, the electro-mechanical energy converter 45 could also be used only for the starter and generator function alone.

The electro-mechanical energy converter is arranged in an alcove of the transmission housing outside of the radial range of the ratio-shifting gear pairs, and the stator 90 is rigidly connected to the transmission housing. It can also be advantageous if the electro-mechanical energy converter has its own separate housing that is flange-mounted on the housing of the transmission 1, where the rotor shaft 28 reaches into the transmission housing and can be coupled to and uncoupled from the input shaft and/or output shaft through an appropriate positively locking connection such as a gear set and at least one clutch. For the most efficient use of the available space, it can further be advantageous if the electro-mechanical energy converter is oriented with the output side of its rotor shaft pointing in the direction or against the direction of the crank shaft.

The transmission 1 according to the invention shifts gears, or is capable of shifting gears, while vehicle traction is maintained. The shift under a traction load is achieved by connecting the electro-mechanical energy converter 45 to the output shaft 6 by means of a clutch 101. When a gear-shift is taking place, the electro-mechanical energy converter 45 is activated at the point where the start-up clutch begins to disengage, with the clutches 100, 101 transmitting torque to the output shaft 6 by being either fully engaged or at least in slipping engagement.

According to the invention, the clutches 3, 100, 101 in the foregoing process are actuated automatically by the clutch actuators 80, 81, 82, which could also be replaced by a single, central actuator. Analogous to the shift actuators 60, 61, 62, there could be linkage mechanisms, hydraulic or pneumatic devices, as well as motion-magnifying or -reducing mechanisms and/or branching-off mechanisms interposed between the actuators 80, 81, 82 and the clutches 3, 100, 101. Thus, a particularly advantageous embodiment could be equipped with a clutch actuator, a gear-shifting actuator, and a gear-selecting actuator.

For the control of the transmission 1 and its functions, particularly in connection with the electro-mechanical energy converter 45, the inventive concept further includes an electronic control unit 91 with a microprocessor for the electronic control of the transmission, an rpm-monitoring arrangement, an electronic throttle-valve control or engine fill control, and an electronic engine control system for the combustion engine, a manually operable gear-selector element such as a lever, switch or the like for manual and/or automated gear selection, and an indicator device in the interior space of the vehicle for indicating the currently operative gear. The respective input signals are entered into the electronic control unit 91 through an interface (In) or through individual signal input connections.

To set the vehicle in motion, a low gear (I or II) or reverse gear is engaged. The start-up clutch 3 is moved into engagement by the actuator 80, while the depressed gas pedal directs the engine 2 to build up torque to accelerate the vehicle. The start-up phase is concluded when the start-up clutch ceases to slip. From this point on, the engine torque is transmitted to the output shaft 6 through the engaged clutch 3 and the engaged gear stage.

The gear-shifting process is initiated in all cases either by the driver's desire to shift gears or by the automatic control.

Advantageous design choices for the clutches 3, 100, 101 include—but are not limited to—the following types:

wet-running clutch;

dry-running clutch;

disc clutch;

conical clutch with one or more conical friction surfaces;

clutch with one friction surface;

clutch with two friction surfaces; or clutch with a plurality of friction surfaces (such as, e.g., a laminar disc clutch).

The shift clutches or sliding sleeves 40, 41, 42 to couple the free gears 31, 32, 33, 34, 35 to the shaft 6 can be advantageously configured as form-locking clutches, such as a dog clutches, or friction-locking clutches.

In order to optimize the efficiency of the transmission 1, it is particularly advantageous if the engagement of the clutches 40, 41, 42 or sliding sleeves of the free gears on the shaft 6 is maintained essentially without an expenditure of externally supplied additional energy. This can be achieved by using form-locking clutches. To keep a friction-locking clutch engaged without expending energy, it is advantageous to use energy-storing elements such as, e.g., springs that push the friction surfaces against each other. It is also possible to use wedge-action devices or spring-biased friction clutches.

The tooth profile of form-locking clutches can be configured in various different ways, e.g., with smooth, rounded teeth, with convex claws, Berliet claws, or repelling claws.

It can be advantageous to provide a synchronization with synchronizer rings for first and/or reverse gear. In another embodiment, it can be of practical benefit if at least some of the other gears have a synchronization with synchronizer rings.

In transmissions with a countershaft, the free gears 30 to 35 and clutches 40 to 42 can be arranged in different ways.

The free gear of each gear can be arranged either on the input shaft or on the countershaft. Thus, the clutch that couples the electro-mechanical energy converter to the output shaft can likewise be arranged on one shaft or the other in different embodiments.

Figure 2:
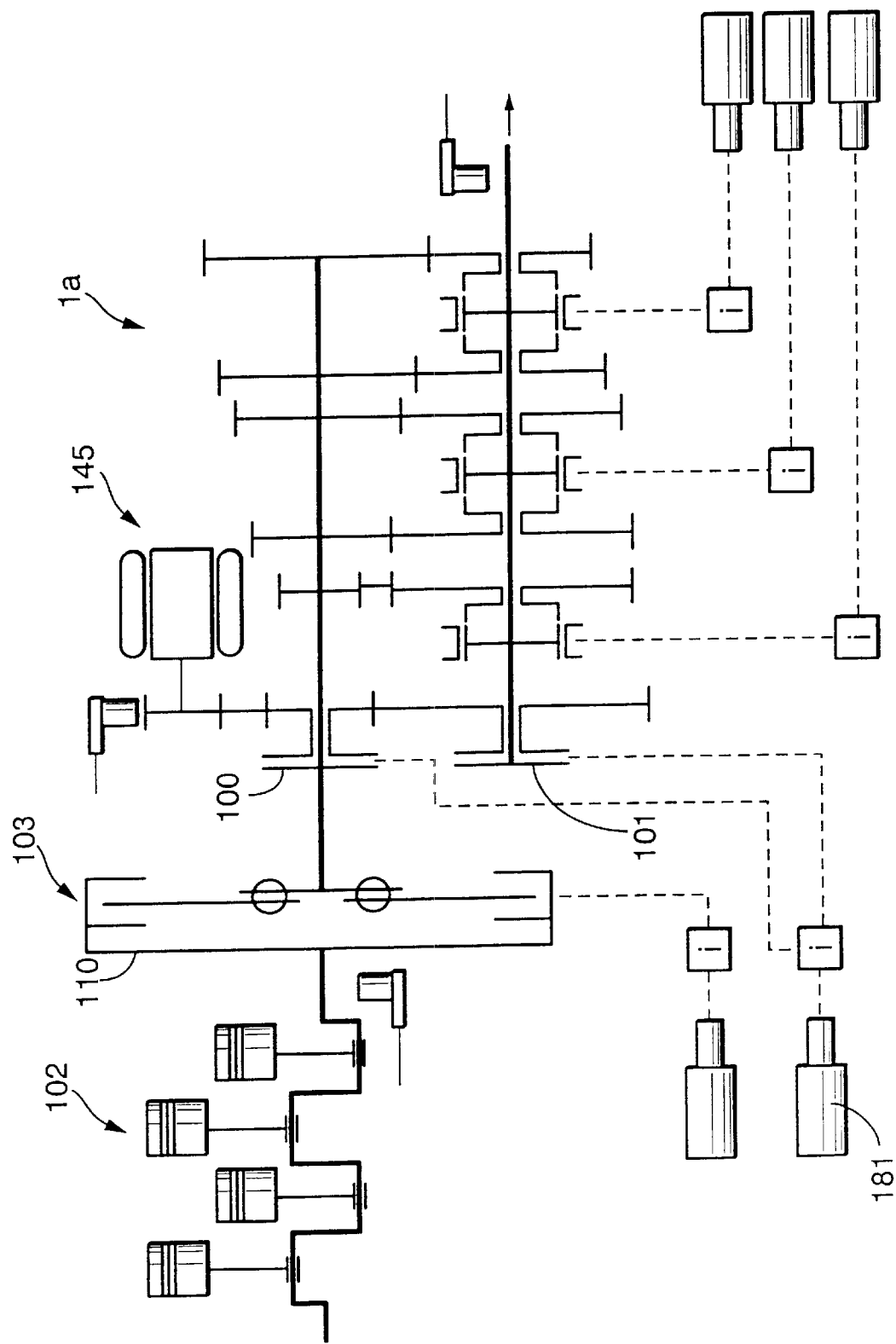

FIG. 2 illustrates a transmission 1a that is identical to the transmission 1 of FIG. 1, except that the clutches 100, 101 are controlled by a single actuator 181. The actuator 181, and the branching mechanism i can be of an advantageous design where both clutches 100, 101 can be engaged and disengaged either one after the other or independently of each other.

If the actuator 181 engages first the clutch 100 and then the clutch 101 and disengages the clutches in the reverse order, the combustion engine 102 can be started by the electro-mechanical energy converter 145 with clutch 100 engaged and clutch 101 disengaged, either by turning the engine 102 directly with the start-up clutch 103 engaged, or by first accelerating the flywheel 110 and then engaging the start-up clutch 103 in order to take advantage of the kinetic energy build-up of the flywheel 110.

When both clutches 100 and 101 are engaged, the transmission 1a is in a locked condition. This function can be used as a parking lock.

Figure 3:
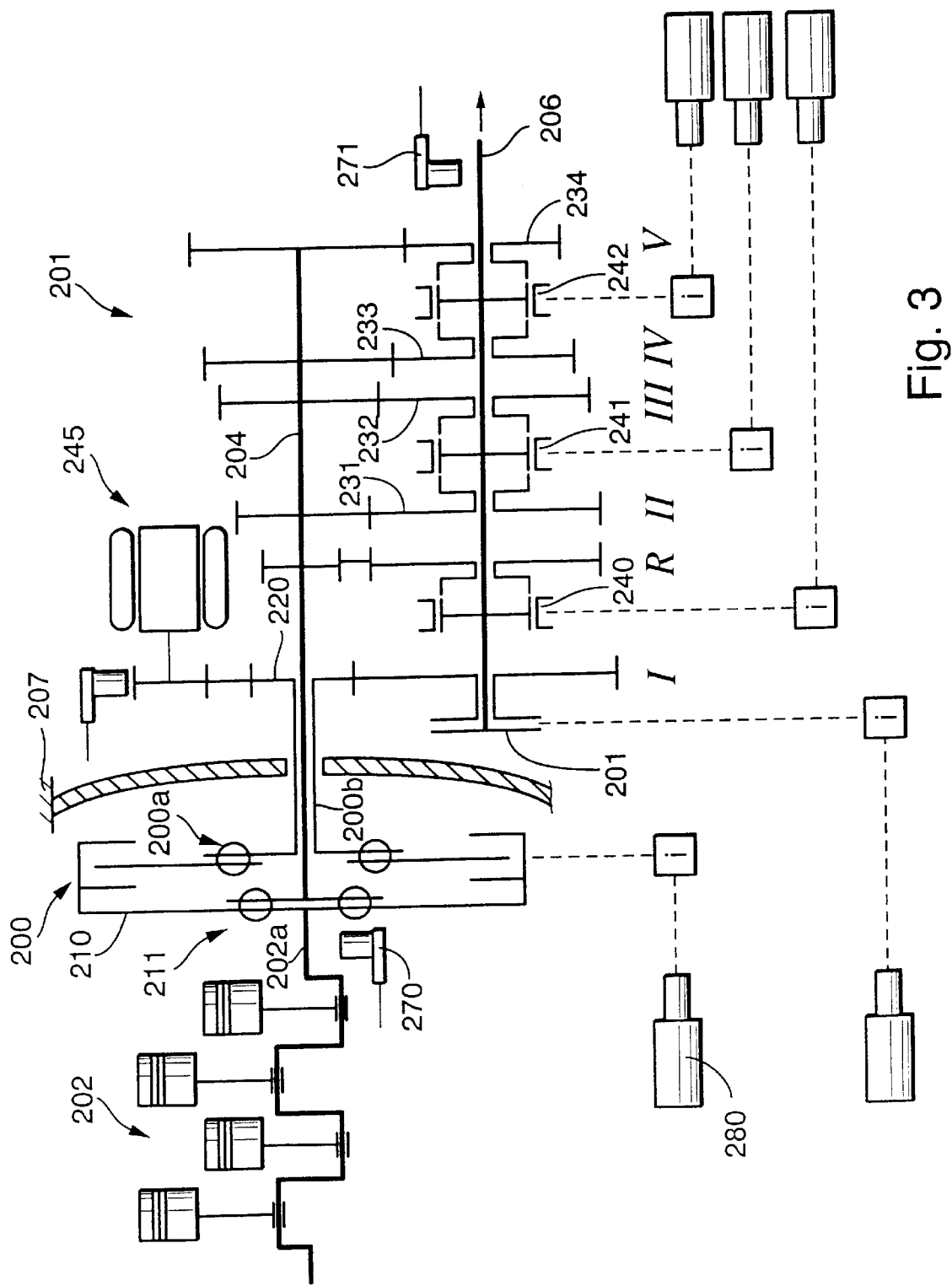

FIG. 3 illustrates a transmission 201 according to the invention, which is similar to the embodiments of FIGS. 1 and 2, except for the modification that the clutch 200 for connecting the electro-mechanical energy converter to the input shaft 204 is accommodated in the bell housing that is delimited by and formed out of the transmission housing 207, so that the clutch can be designed as a dry clutch. The clutch 200 can include, e.g., a clutch disc with friction linings arranged in a radially outer portion for a frictional engagement with a pressure plate and a clutch plate that is rotationally fixed to the crankshaft 202a of the combustion engine 202. A damper device 200a can be arranged so that in an engaged condition of the clutch 200, the torque flows from the crankshaft 202a through the friction linings, the input and output parts of the damper, a hub seated in a rotationally locked condition on the sleeve 200b, and the gear 220 to the electro-mechanical energy converter 245. The input and output parts of the damper are rotatable within a limited range in relation to each other against tangentially acting energy-storing devices that may be supplemented by a friction device. The sleeve 200b is sealed against the transmission input shaft 204 and the transmission housing 207.

In the illustrated transmission 201, the input shaft is connected to the flywheel 210 through an interposed damper device 211. To facilitate assembly, the connection can be designed as an axial plug-in connection.

The flywheel can also be designed as a split flywheel with two inertial masses arranged on the engine crankshaft or on the transmission input shaft. With interposed dampers constituted by arcuate coil springs, the masses are rotatable in relation to each other within a limited range. Alternatively, with an interposed slip clutch, the masses are rotatable in relation to each other without limitation. A tooth-profiled connection couples the split flywheel to the other of the two shafts.

It can further be of advantage to provide a start-up clutch and to combine the clutch 200 with the start-up clutch into a dual clutch. A single actuator 280, which would otherwise be used to operate the clutch 200 alone, can be used to operate both of the clutches 200 and 203 in an arrangement that can include an interposed transmitting mechanism.

In the embodiment shown in FIG. 3, the combustion engine 202 is started with clutch 200 engaged, clutch 101 disengaged, and with the transmission 201 in neutral, i.e., with the sliding sleeves 240, 241, 242 in their neutral positions where the output shaft 206 is not coupled to the input shaft 204, as the latter rotates together with the engine because there is no separate start-up clutch.

To operate the electro-mechanical energy converter 245 in a generator mode, the clutches and sliding sleeves are set to the same respective positions as has just been described for the process of starting the combustion engine 202, except that the direction of the torque flow is reversed.

In the energy-recovery mode, the clutch 101 is engaged and the clutch 200 is disengaged.

When the clutch 101 is disengaged, the position of the clutch 200 dictates which drive source propels the vehicle. With the clutch 200 disengaged, the vehicle can be driven by the electro-mechanical energy converter alone. With the clutch 200 engaged, the electro-mechanical energy converter 245 can run idle, work as a generator, or work as a supplementary drive source, i.e., as a booster drive.

When shifting between gears II–V, the electro-mechanical energy converter 245 can transmit torque to the output shaft 206 through the gear pair I with clutch 101 engaged and clutch 200 disengaged while the rpm rate of the combustion engine 202 is lowered. Thus the torque deficit from the combustion engine 202 can be at least partially compensated during a shift process in which the currently operative gear is taken out of engagement and the new gear is moved into engagement by locking one of the free gears 231, 232, 233, 234 to the output shaft 206 by means of sliding sleeves 241, 242 as soon as the rpm rates are synchronized and there is a torque-free state between the elements being engaged to each other. The synchronous rpm rate is achieved by regulating the rpm rate of the combustion engine 202, by controlling the electro-mechanical energy converter 245, or by simultaneous control of the engine and electro-mechanical energy converter. The input quantities for this control function can be constituted at least by the respective rpm rates of the output shaft 206 and the crankshaft 202a, which can be detected by appropriate sensors, e.g., by the rpm sensors 270, 271.

Figure 4:
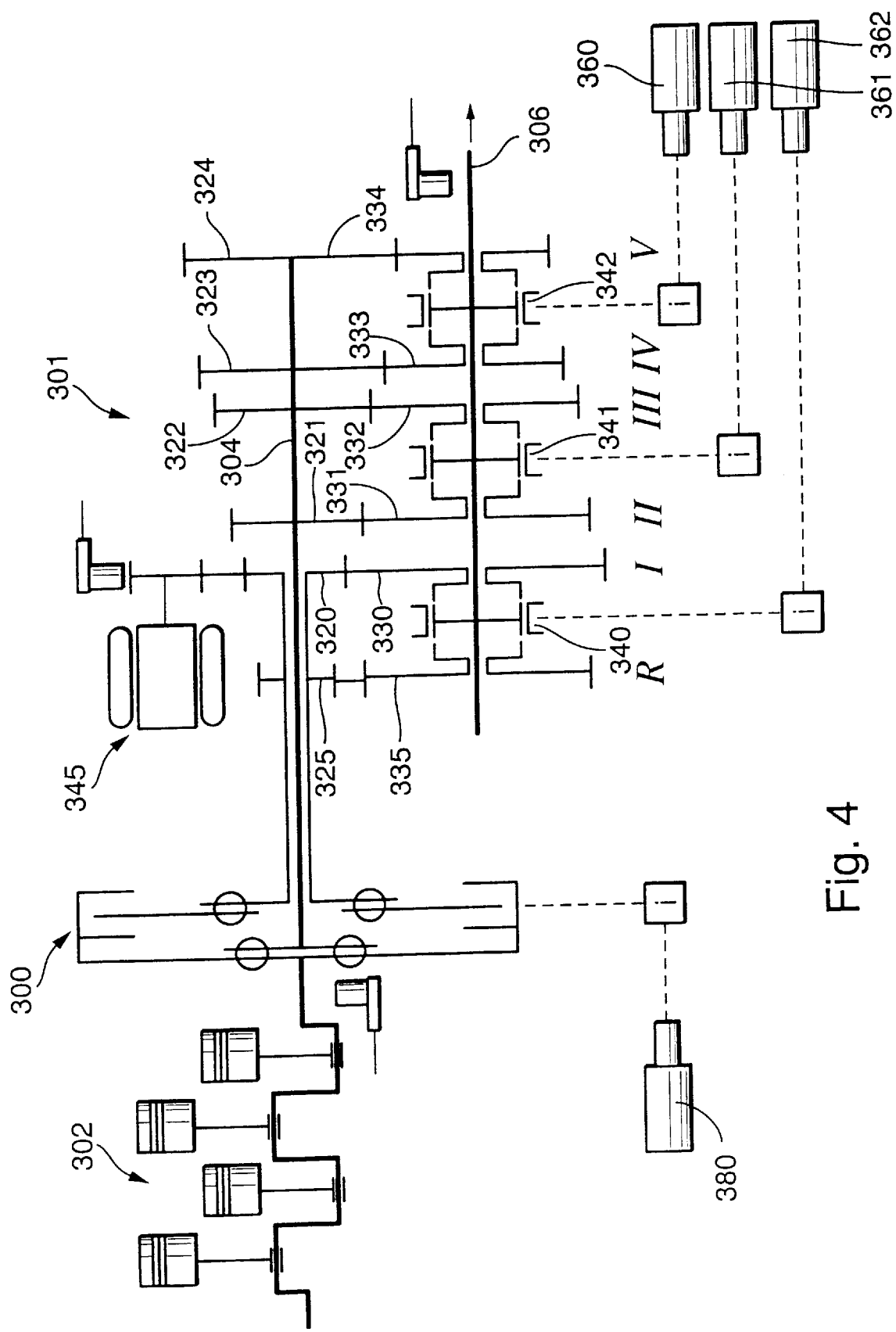

The embodiment of FIG. 4 represents a transmission 301 that is similar to the embodiments of the previously discussed embodiments of FIGS. 1 to 3. The gear stages of the transmission 301 are arranged so that the clutch 101 shown in FIGS. 1 to 3 is no longer necessary.

The transmission 301 is characterized by having three analogous groups of gears, where each group consists of two gear pairs. The transmission input shaft carries the fixed gears 320, 321, 322, 323, 324, 325, and the transmission output shaft carries the free gears 330, 331, 332, 333, 334, 325 for the shift levels I through V and R, respectively.

Sliding sleeves 340, 341 and 342 are axially interposed between the respective gear pairs for levels R and I, II and III, IV and V. When all sliding sleeves are in a midway position, the transmission is in a neutral state, in which none of the free gears are in a torque-locked engagement with the output shaft 306. To activate a desired gear level I, II, III, IV, V or R, the appropriate sliding sleeve 340, 341, or 342 is moved into engagement by the appropriate actuator 360, 361 or 362 after the synchronous rpm rate and a torque-free state have been reached between the respective free gear and the output shaft 306. For example, when shifting from first into second gear, the currently operative gear stage I is deactivated by moving the sliding sleeve 340 into its neutral position. After reaching a synchronous rpm rate, the sliding sleeve 341 is moved from its neutral position towards the free gear 331 to lock the latter to the output shaft 306. The other gears are shifted in an analogous manner. It is self-evident that the electro-mechanical energy converter 345 can also support the output torque during the shift process.

The clutch or sliding sleeve 340 further performs the function of coupling the electro-mechanical energy converter 345 to the output shaft 306. The sense of rotation of the electro-mechanical energy converter 345 can be reversed depending on which of the free gears 335 and 330 is coupled to the output shaft 306. The clutch 300, which is controlled by the actuator 380, connects the electro-mechanical energy converter 345 to the combustion engine 302, e.g., to start the latter.

Figure 5:
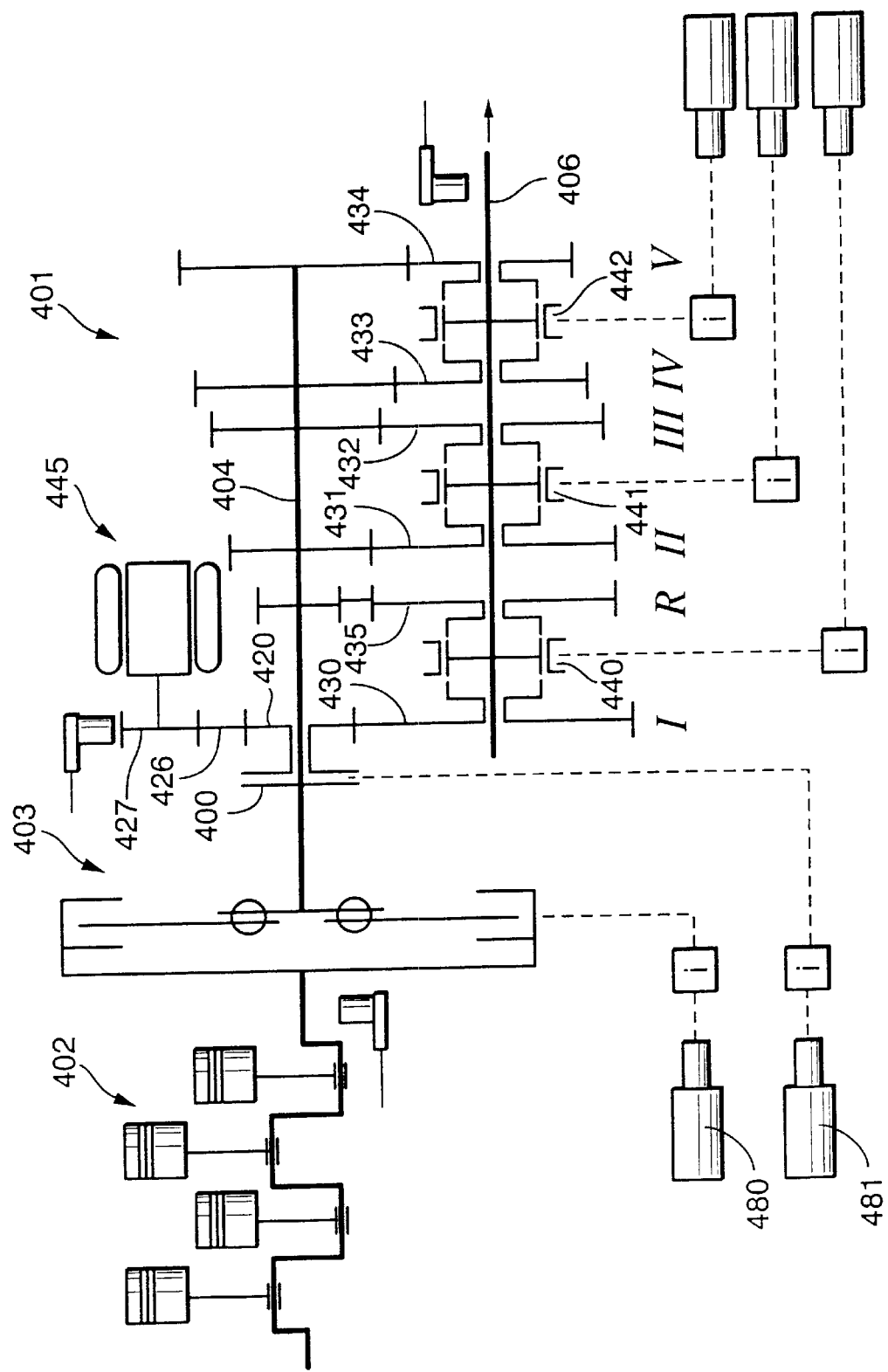

FIG. 5 illustrates a transmission 401 that is similar to the transmission 1a of FIG. 2, but lacking the clutch 101 of the transmission 1a. The same function is performed by the sliding sleeve 440 which, by moving out of a neutral position in one direction or the other connects either the free gear 430 (I) or 435 (R). If the free gear 430, i.e., gear level I, is engaged, the electro-mechanical energy converter 445 is coupled to the output shaft 405 by means of the sliding sleeve 440. The electro-mechanical energy converter 445 in this case is communicating its rotation through the gears 427, 426 to the free gear 420. The latter is supported, but not rotationally fixed, on the input shaft 404, and coupled to the free gear 430 on the output shaft 406. The gear pair 420, 430 constitutes shift level I of the transmission 401. The free gear 420 can be coupled to the input shaft 404 by means of the clutch 400 under the control of actuator 481.

The electro-mechanical energy converter 445 in the foregoing arrangement is designed to perform the operating modes of starting the combustion engine, generating electricity, recovering kinetic energy, and/or supplying propulsive power to the vehicle either alone or supporting the combustion engine.

When the electro-mechanical energy converter 445 is used to start the combustion engine 402, the clutch 400 and the start-up clutch 403 (the latter controlled by actuator 480) are engaged and all of the sliding sleeves 440, 441, 442 are in the neutral position, i.e., none of the sliding sleeves is putting a form-locking constraint on the free gears 430, 435.

When the combustion engine 402 is running, the electro-mechanical energy converter 445 can be used as a generator, both in a standing or moving condition of the vehicle. As in the starter mode, the clutch 400 and the start-up clutch 403 are both engaged.

When the electro-mechanical energy converter 445 works as the sole drive source for the vehicle, the clutch 400 is engaged, while the start-up clutch 403 is disengaged. If the electro-mechanical energy converter 445 is only assisting the combustion engine 402 in propelling the vehicle, then the start-up clutch, too, is engaged. Two possible paths exist for the torque flow from the electro-mechanical energy converter 445 to the output shaft 406. The first possibility is for the torque to pass through the gears 426, 427, 420, 430 and through the engaged sliding sleeve 440 to the output shaft 406, in which case the clutch 400 is disengaged. Alternatively, if the clutch 400 is engaged, the torque is transmitted to the input shaft 404 and reaches the output shaft 406 by way of one of the gear stages R, II, III, IV, V, depending on the position of the sliding sleeves 440, 441 and 442.

In the energy-recovery mode, the currently operative gear stage is disengaged and the sliding sleeve 440 is moved towards the free gear 430, whereby a rotation-locked connection is established to the electro-mechanical energy converter, enabling the latter to work as a generator, receiving kinetic energy out of the power train and converting it into electric energy that can be fed into a storage device. The torque transmitted to the electro-mechanical energy converter 445 can be limited by engaging the clutch 400, so that the combustion engine through the engaged start-up clutch 403 can contribute its compression torque for the purpose of slowing down the vehicle. A decelerating effect can also be achieved with one of the gears II to V engaged and the clutch 400 disengaged, in which case a portion of the torque is transmitted through the engaged clutch 403 to the combustion engine 402. The clutch 403 can be used with a controlled amount of slip to meter the amount of torque transmitted to the engine.

Figure 6:
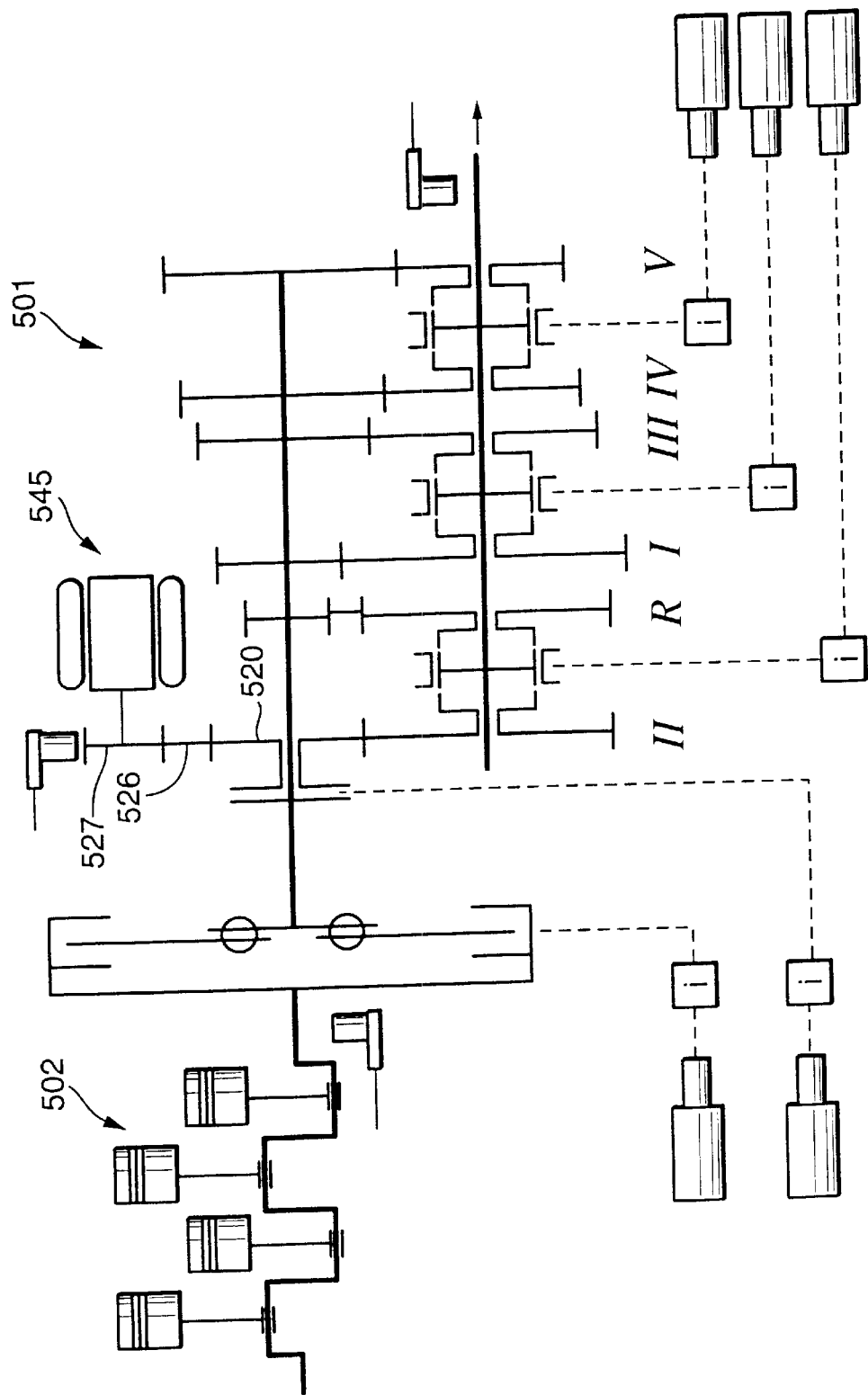

FIG. 6 illustrates a transmission 501 that corresponds to the transmission 401 of FIG. 5, except that the positions of the gear levels I and II are switched. This has the advantage that the electro-mechanical energy converter works at comparatively lower rpm rates in the generator and energy-recovery modes, while the gear-ratio associated with the gears 520, 526 and 527 is still available for starting the combustion engine 502.

Figure 7:
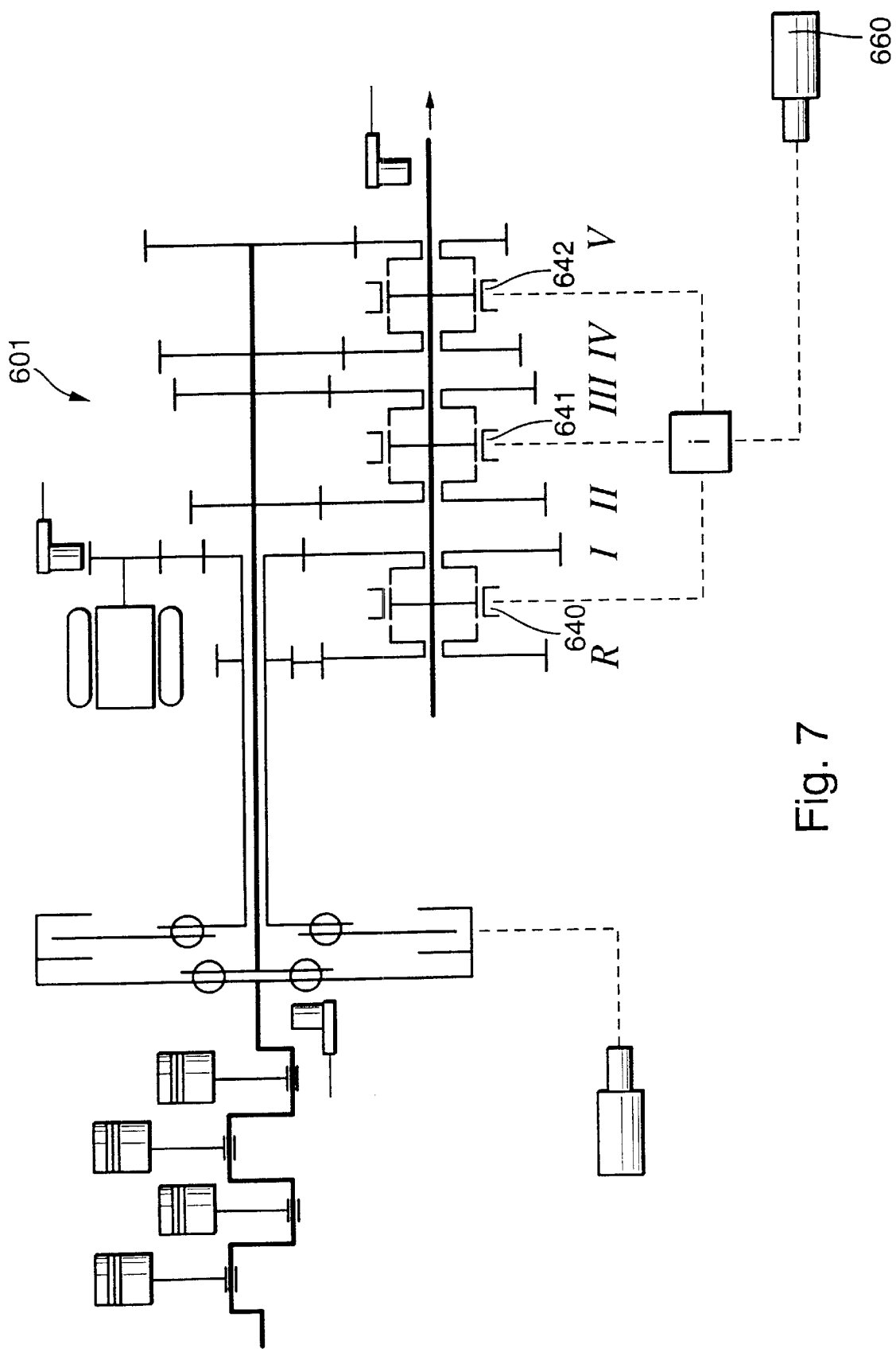

FIG. 7 illustrates a transmission 601 that is identical to the transmission 301 of FIG. 4, except for the way in which the sliding sleeves 640, 641, 642 are actuated. The sliding sleeves 640, 641, 642 in this embodiment are controlled by a single actuator 660 through a motion-transmitting mechanism i that is interposed between the actuator 660 and the sliding sleeves. The motion-transmitting mechanism can be of a kind where a shifter cylinder controls the sliding sleeves 640, 641, 642 independently of each other and engages the desired gear by generating the appropriate axial movements in relation to the output shaft.

Figure 8:
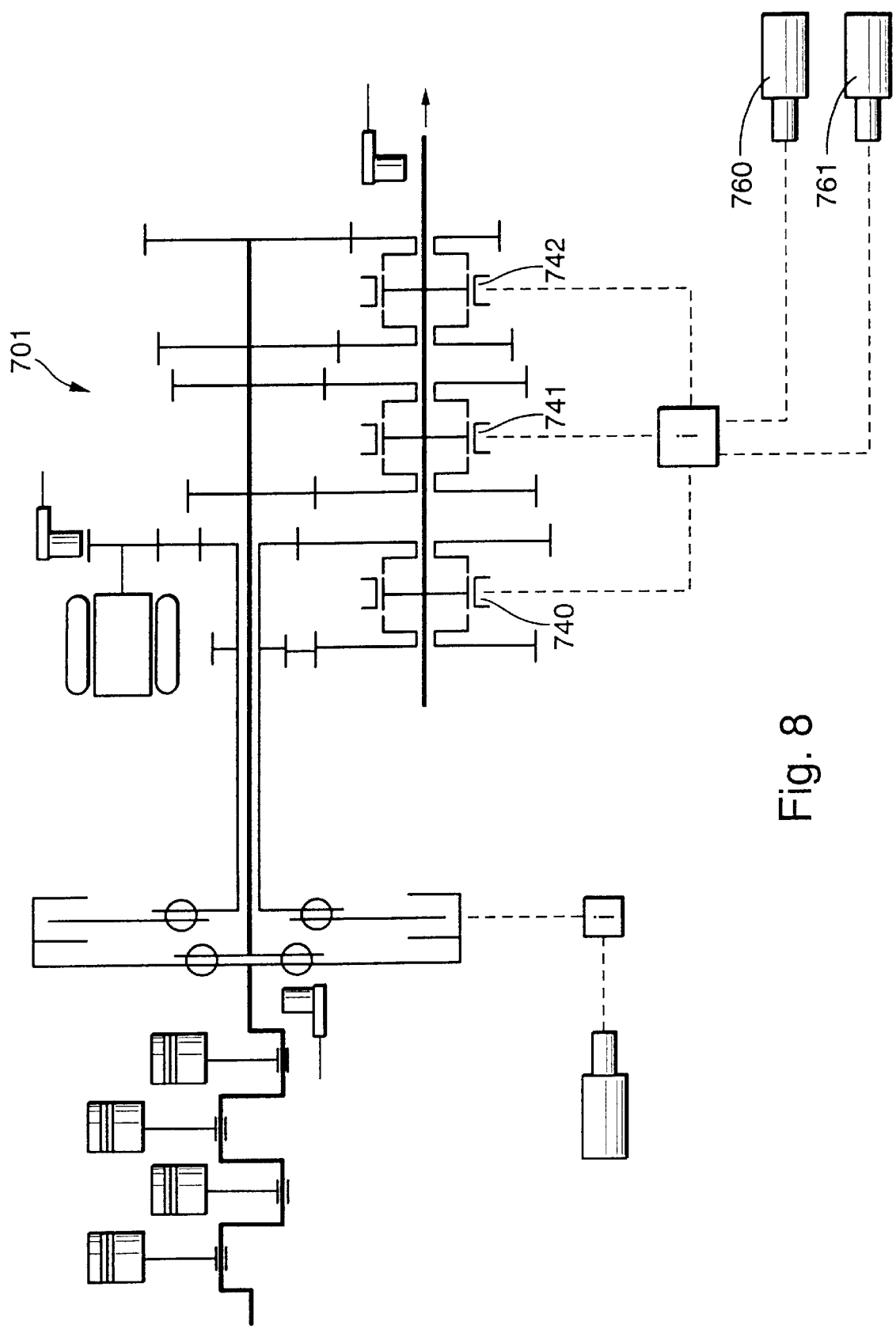

Instead of the one actuator 660 of FIG. 7, the transmission 701 of FIG. 8 has two actuators 761, 760 controlling the sliding sleeves 740, 741, 742 through an interposed mechanism i. Preferably in this arrangement, one actuator performs the axial shifting of the sliding sleeves while the second actuator serves to select which of the sliding sleeves is to be shifted by the first actuator. This gear-shifting system is similar to known manual stick-shift transmissions that are shifted according to an H-shaped pattern, except that in the embodiment of FIG. 8, the automated shift process is performed by the actuators 760, 761. Preferably, the latter are accommodated inside the transmission housing, but in special cases they can also be arranged on the outside of the transmission housing as an add-on or retrofit module to automate a manual stick-shift transmission by mimicking the manual shift movements.

Figure 9:
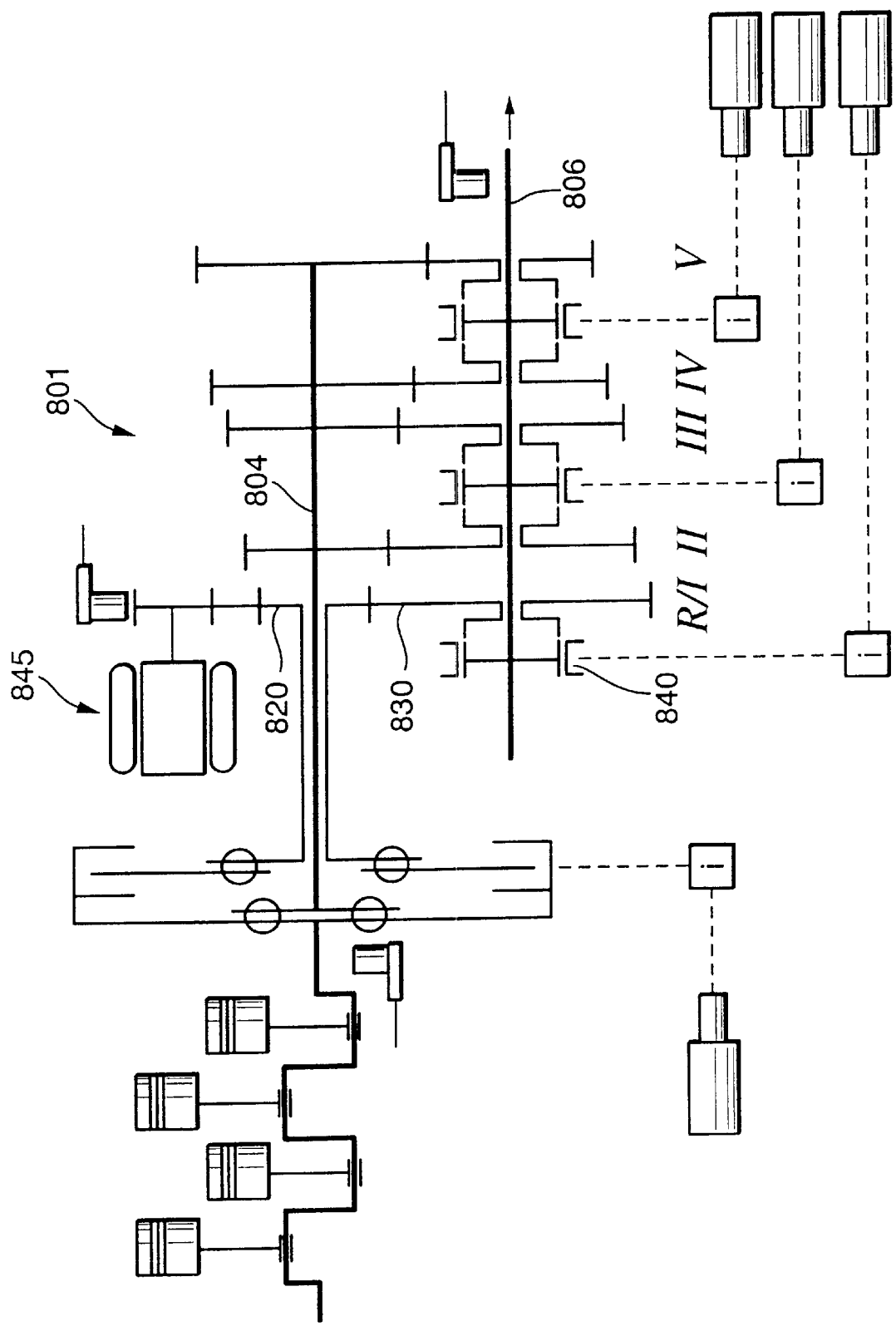

The transmission 801 of FIG. 9 uses only five gear pairs for the transmission ratios R and I through V. The transmission ratios R and I use one gear pair together. Both gears of the pair are free gears, i.e., a gear 820 on the input shaft 804 and a gear 830 on the output shaft 806. The clutch 800 serves to lock the free gear 820 to the input shaft 804, and the sliding sleeve 840 serves to lock the free gear 830 to the output shaft 806. Except for the fact that only one gear pair is used for the transmission levels R and I, the transmission 801 is analogous to the transmission 301 of FIG. 4. The power for driving in reverse (R) is supplied by the electro-mechanical energy converter 845, so that the reverse idler gear can be omitted and the same gear stage can be used for first as well as reverse gear. The rotation-locked connection of the free gear 830 to the output shaft 806 of the transmission 801 is established by means of the sliding sleeve 840.

Figure 10:
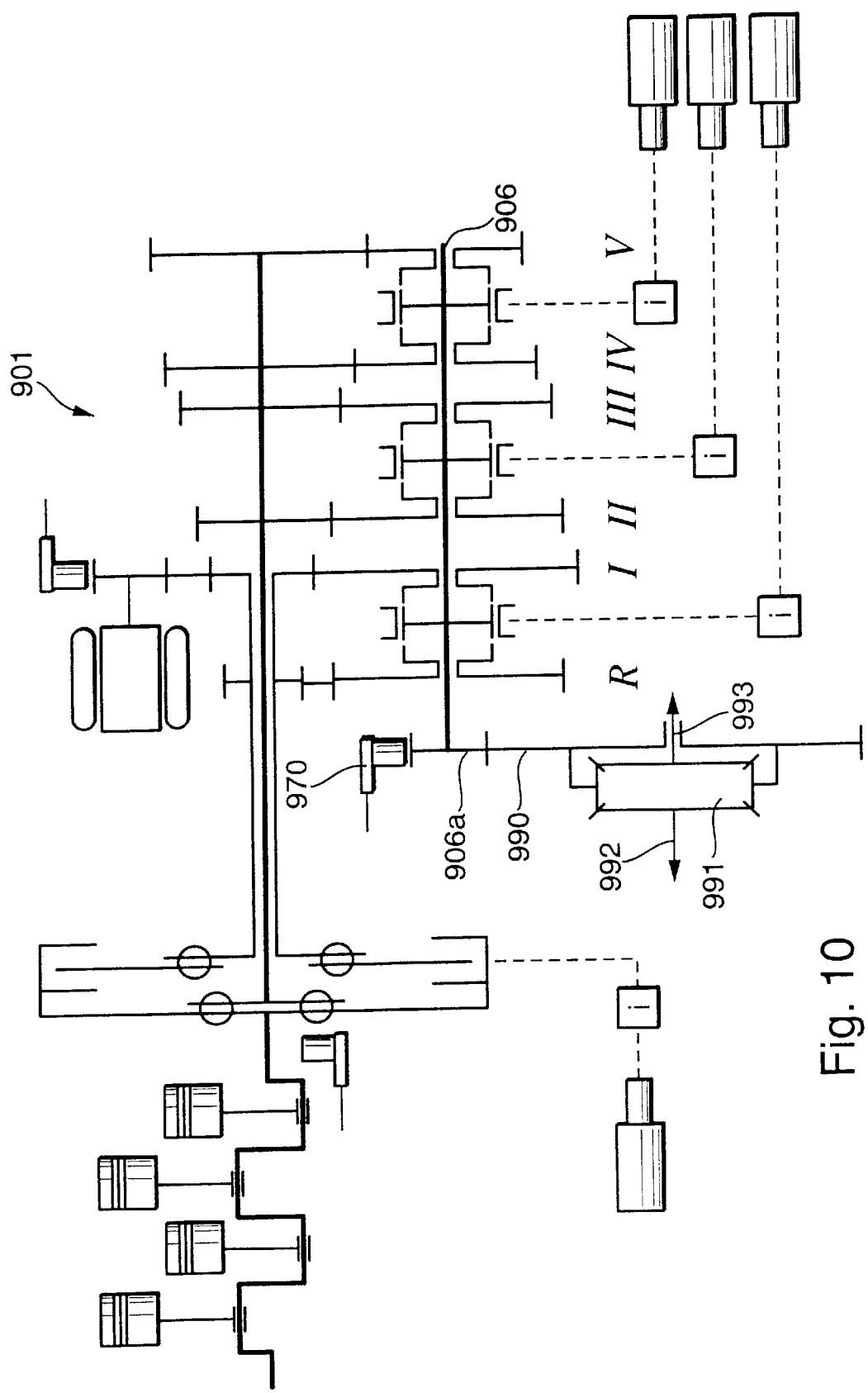

The transmission 901 of FIG. 10 represents an advantageous further development of the transmission 301 of FIG. 4, where the transmission 901 is adapted for transverse front-wheel drive installation. The output shaft 906 carries a fixed gear 906a that meshes with a gear 990 connected to a differential 991. The differential 991 transmits the driving torque equally to the driving wheels, independent of whether the vehicle is moving in a straight line or around a curve of any radius. The rpm sensor 970 detects the rpm rate of the gear 906a and sends a corresponding signal to a control unit (not shown).

Figure 11:
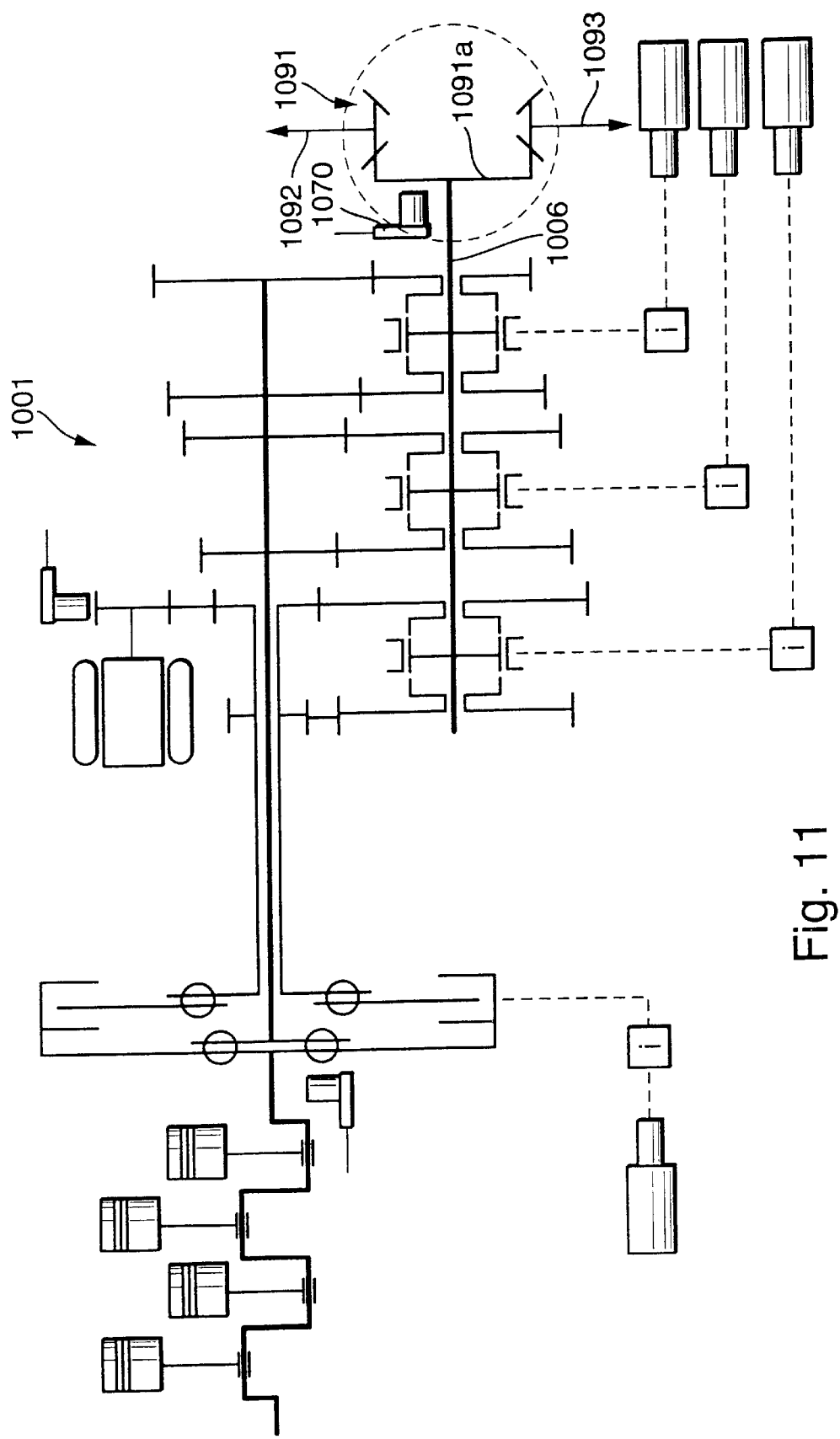

The example of a transmission 1001 in FIG. 11, likewise, has an analogous arrangement as the transmission 301 of FIG. 4, in this case adapted for a lengthwise installation of the combustion engine and adjoining transmission 1001. The differential 1091 is in this case directly coupled to the transmission output shaft 1006. The drive axles 1092, 1093 are arranged substantially at right angles to the output shaft 1006, while the drive axles 992, 993 of the transmission 901 in FIG. 10 are approximately parallel to the transmission output shaft 906. The rpm sensor 1070 detects the rpm rate of a gear 1091a that belongs to the differential and is rotationally fixed on the transmission output shaft 1006. The gear 1091a carries appropriate recesses or protrusions or other marks that can be detected by the rpm sensor 1070.

Figure 12:
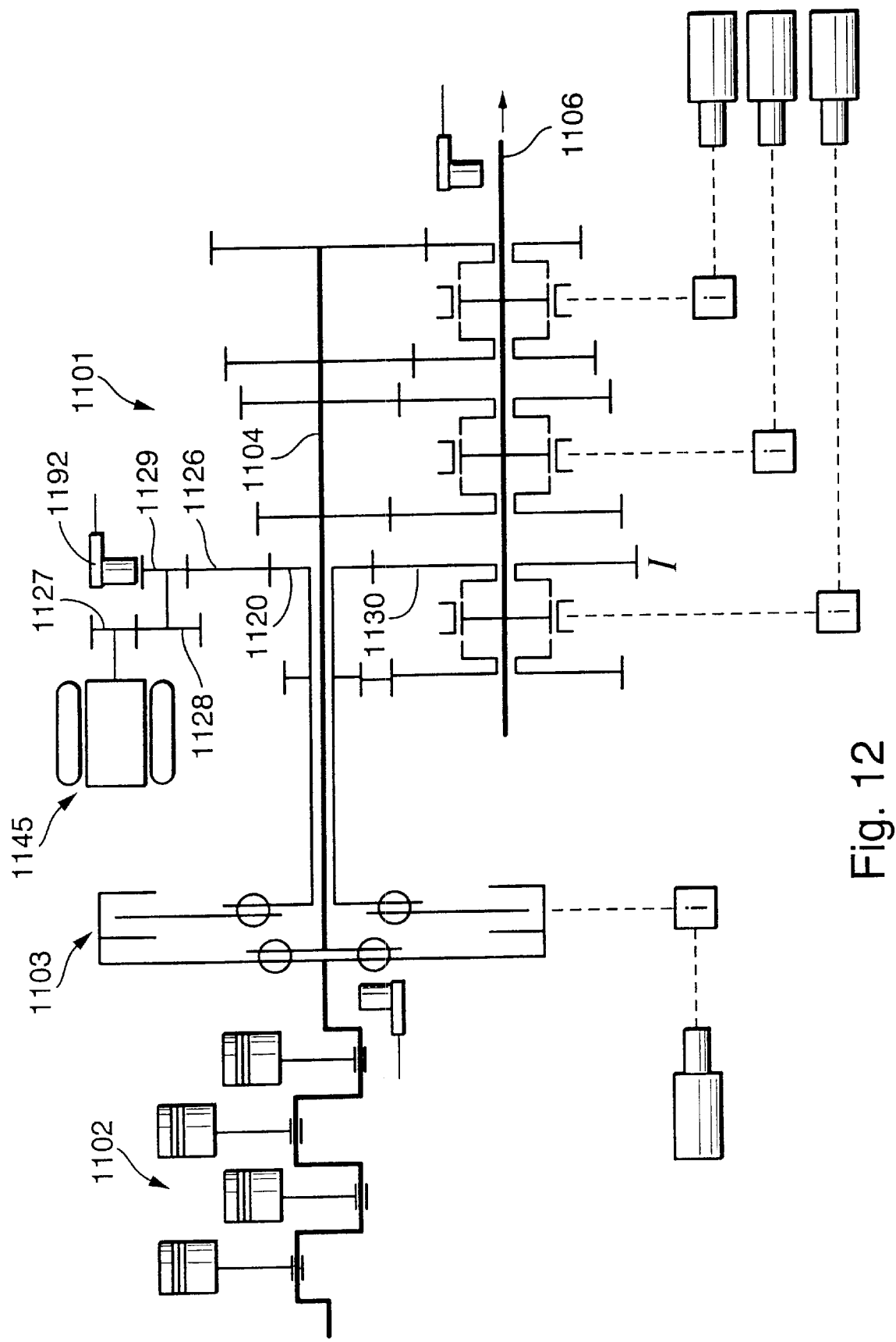

FIG. 12 illustrates a transmission 1101 with an advantageous modification in the gear set associated with the electro-mechanical energy converter 1145. Except for this difference, the transmission 1101 is comparable to the transmission 301 of FIG. 4. The same arrangement of the electro-mechanical energy converter 1145 and its associated gear set can, of course, be used for other embodiments of the invention described herein.

The electro-mechanical energy converter 1145 is connected to a gear pair of one of the transmission levels, e.g., level I with the gear pair 1130, 1120. The gear 1120 meshes with a gear 1126 that reverses the sense of rotation and, in turn, meshes with a gear 1029. Fixed on the same shaft with gear 1029 is a gear 1028 of larger diameter, meshing with a smaller-diameter gear 1127 that is fixed on the rotor shaft 1145a, so that the sense of rotation transmitted to or from the electro-mechanical energy converter 1145 is reversed once more. The overall rpm ratio from the electro-mechanical energy converter to the input shaft 1104 or output shaft 1106 5 corresponds to an rpm reduction, so that the combustion engine 1102 can be started directly with the start-up clutch 1103 engaged. Due to the gear reduction, the electro-mechanical energy converter 1145 has to run at a comparatively high rpm rate to start the engine but requires a smaller amount of torque. Furthermore, this arrangement offers the possibility of running the electro-mechanical energy converter 1145 in energy-recovery mode even at low rpm rates of the output shaft 1106, i.e., at a low vehicle speed. The rpm rate of the electro-mechanical energy converter 1145 can be detected by means of an rpm sensor 1192 from one of the gears 1127 or 1129. If the gear 1129 is used (as illustrated) for the rpm detection, the gear ratio to the electro-mechanical energy converter has to be taken into account.

Figure 13:
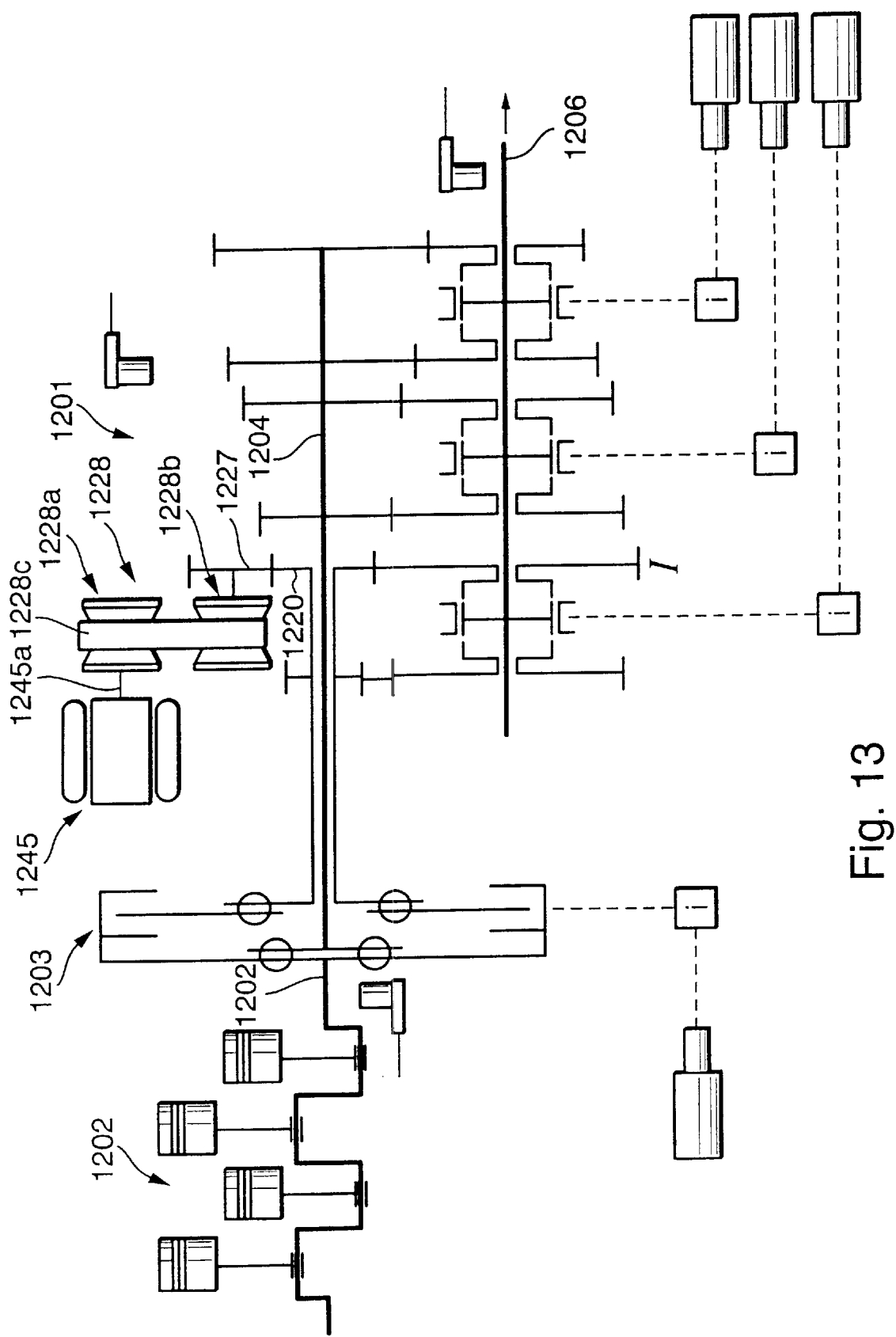

The transmission 1201 of FIG. 13 represents a further advantageous embodiment of the invention, which is substantially the same as the transmission 301 of FIG. 4, except that the electro-mechanical energy converter 1245 of the transmission 1201 can be coupled to the transmission input shaft 1204 or the transmission output shaft 1206 by way of a continuous-ratio drive mechanism.

The continuous-ratio drive mechanism is preferably configured as a cone-pulley transmission device 1228 and coupled into the torque path in a manner that is known per se. The cone pulleys are pairs of conical discs. A first disc pair 1228a is rotationally constrained on the rotor shaft 1245a, and a second disc pair 1228b is rotationally constrained to a gear 1227 which meshes with the gear 1220 of the gear level I of the transmission 1201. Seated in the axial gap between the paired discs of the cone pulleys 1228a and 1228b is a belt- or chain-type of torque-transmitting element 1228c, transmitting torque from one cone-pulley to the other through its frictional engagement with the conical disc surfaces. The rpm ratio of the cone-pulley transmission device 1228, which depends on the respective radii at which the element 1228c engages the conical discs, can be varied by axially displacing at least one of the discs of the pairs 1228a, 1228b. The axial displacement of the conical discs is performed in a manner that is known per se, e.g., through hydraulic units, through a centrifugal effect, and/or the like. It is self-evident that an arrangement of this kind can also be placed at a gear pair of one of the other shift levels of the transmission 1201.

The possibility of varying the rpm ratio between the electro-mechanical energy converter 1245 and the input shaft 1204 or output shaft 1206 is advantageous, because it allows the electro-mechanical energy converter to be operated at an rpm rate corresponding to the maximum possible power output. For example, to start the combustion engine 1202, an rpm-reducing setting can be selected, where the torque-transmitting element 1228c runs at a small radius around the disc pair 1228a and at a large radius around the disc pair 1228b. In this state of the transmission device 1228, with the electro-mechanical energy converter 1245 running at a high rpm rate and the crankshaft 1202a of the combustion engine 1202 running at a low rpm rate, the electro-mechanical energy converter has to deliver only a low amount of torque to start the engine. It is self-evident that the start-up clutch 1203 has to be engaged to start the engine.

To operate the electro-mechanical energy converter 1245 in a generator mode at a higher rpm rate of the input shaft 1204 or output shaft 1206, the cone-pulley transmission 1228 is set to a ratio that allows the electric motor generator to run at the rpm rate where power generation is maximized. The analogous concept applies to controlling the cone-pulley transmission 1228 when the electric motor-generator is used in the energy-recovery mode, in a drive-assisting mode, or as the sole drive source. The amount of torque to be transmitted to the output shaft 1206 when shifting gear levels in the transmission 1201 can also be better adapted to the requirements by adjusting the cone-pulley transmission 1228 to the exact setting as needed in each situation.

Figure 14:
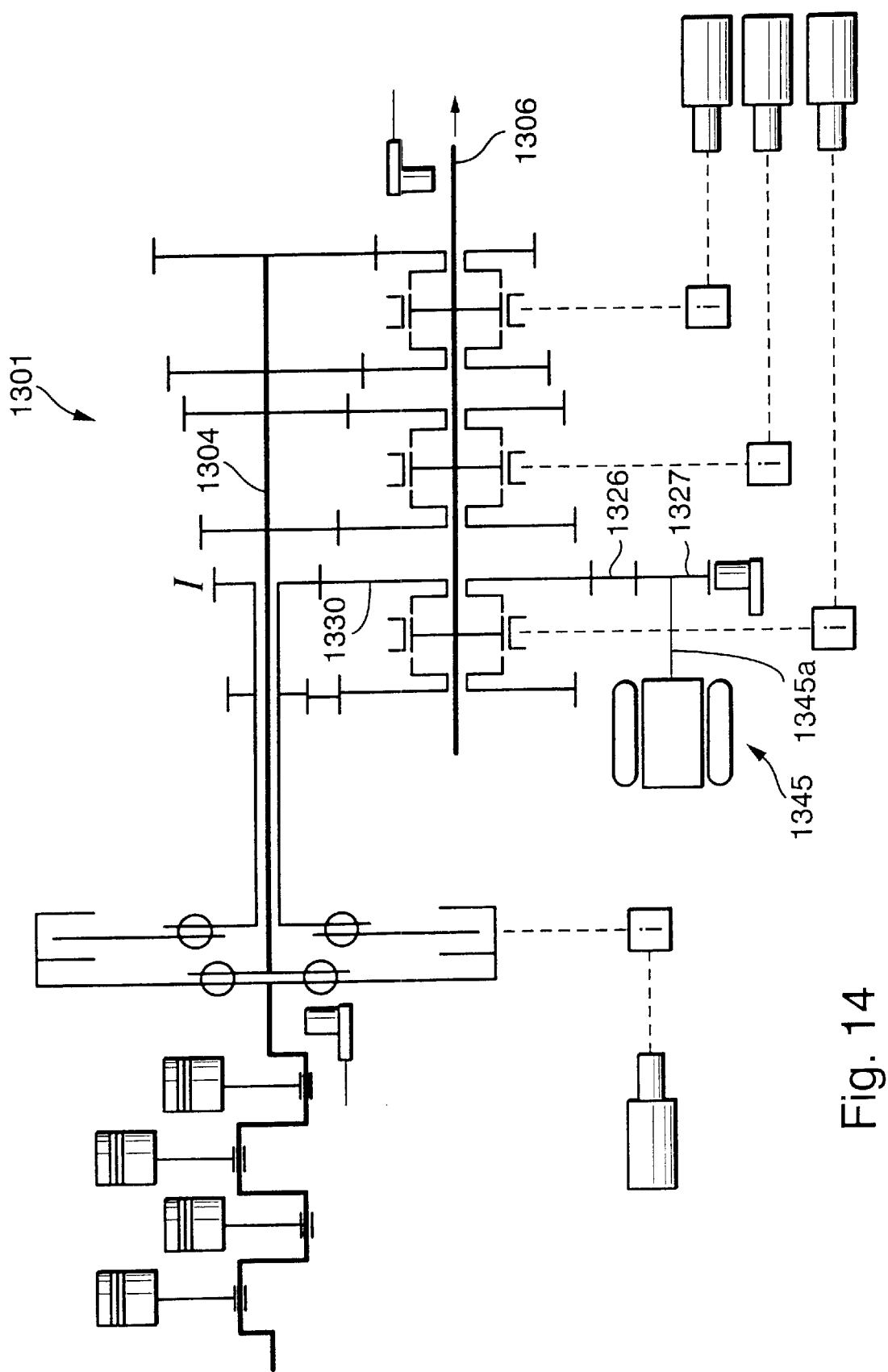

FIG. 14 illustrates an embodiment of a transmission 1301 in which the electro-mechanical energy converter 1345 can again be connected to the transmission input shaft 1304 and/or the output shaft 1306. However, in contrast to the embodiments of the preceding FIGS. 1 to 13, the electro-mechanical energy converter 1345 is connected to the gear stage I of the transmission 1301 by being rotationally constrained to the free gear 1330 on the transmission output shaft 1306. Except for this difference, the transmission 1301 is comparable to the transmission 301 of FIG. 4. The transmission 1301, likewise, transmits torque through a gear 1327 that is fixed on the rotor shaft 1345a and meshes with a rotation-reversing gear 1326. The latter, in turn, meshes with the free gear 1330 of the gear stage I.

Figure 15:
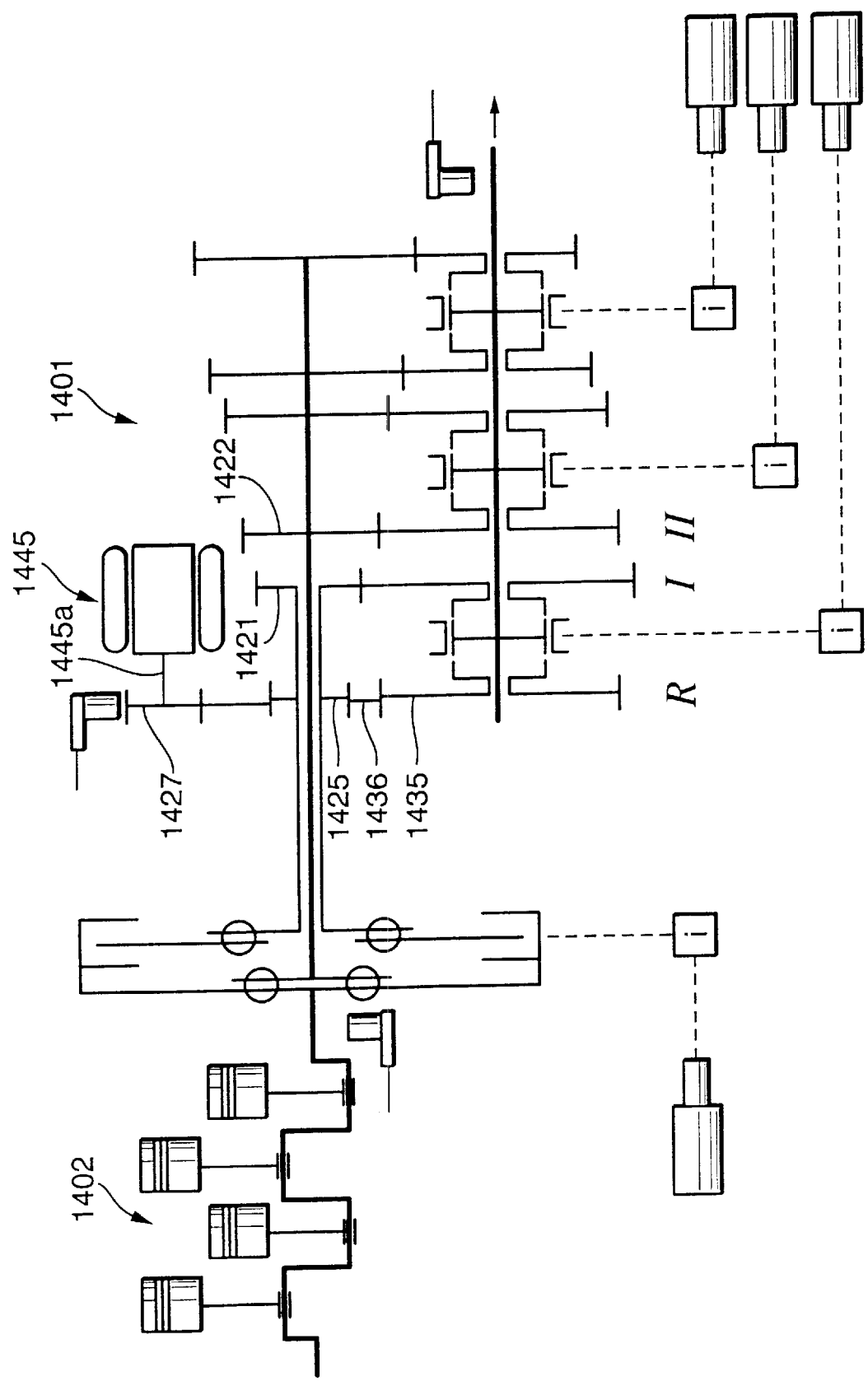

In FIG. 15, an embodiment of a transmission 1401 is shown as an example of how an electro-mechanical energy converter 1445 can be coupled to the gear pair 1425, 1435 (with reverse idler gear 1436) of the reverse gear stage R. The rotor shaft 1445a of the electro-mechanical energy converter 1445 carries a fixed gear 1427 oriented towards the combustion engine 1402. This can lead to an advantageous spatial arrangement of the electro-mechanical energy converter, taking advantage of the available space adjacent to the radially more compact gears 1420, 1421 of the shift levels I and II. In other respects, the transmission 1401 is similar to the transmission 301 of FIG. 4.

Figure 16:
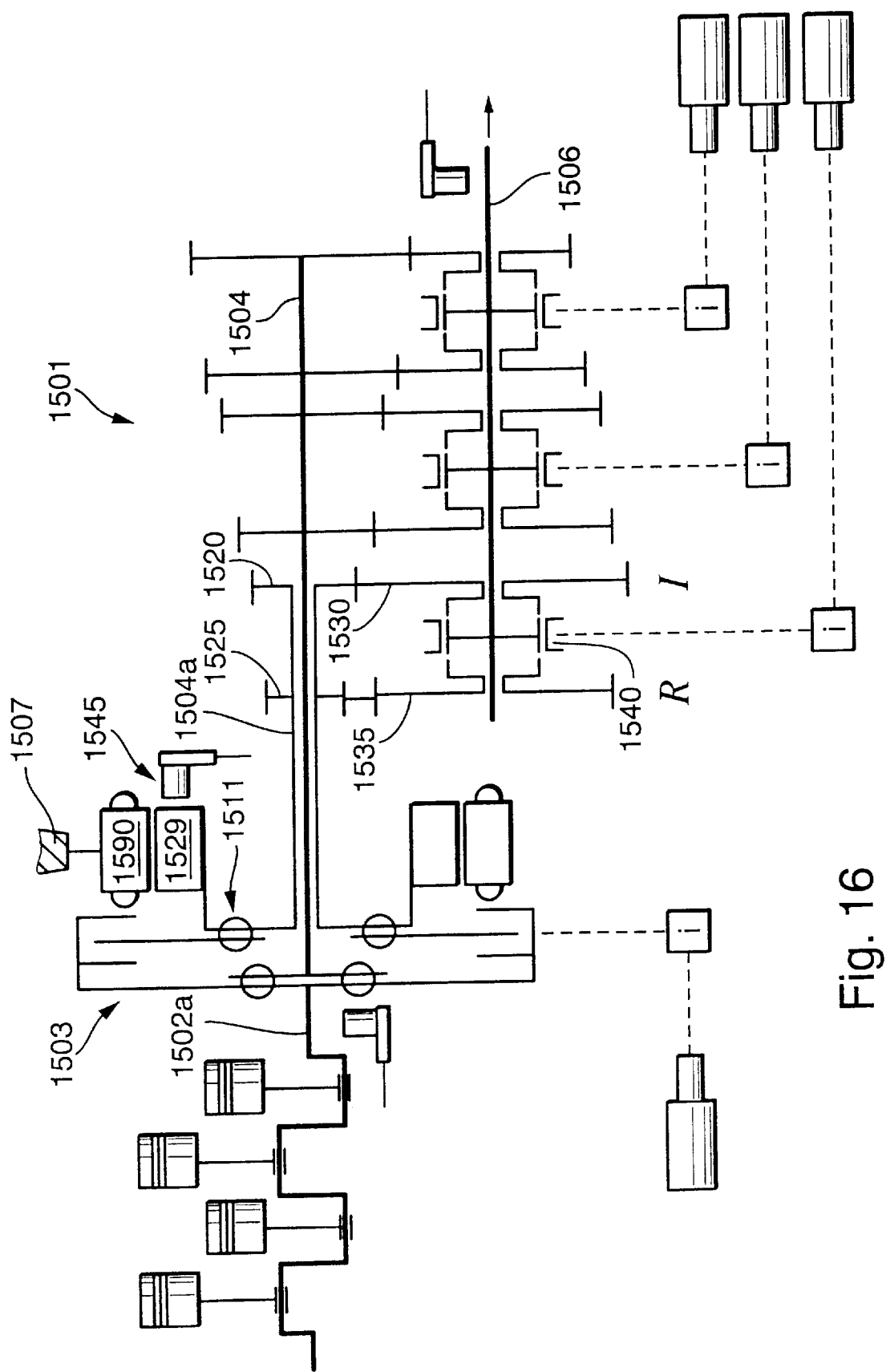

FIG. 16 illustrates a transmission 1501 that is also comparable to the transmission 301 of FIG. 4, except that the electro-mechanical energy converter 1545 is arranged concentrically around the transmission input shaft 1504.

The stator 1590 of the electro-mechanical energy converter 1545 has a fixed attachment to the transmission housing, e.g., to a housing part 1507. The rotor 1529 is rotationally fixed on the sleeve 1504a, which is supported by the transmission input shaft 1504. The sleeve 1504a also constitutes the output part of the damper device 1511 that serves to damp torsional vibrations between the sleeve 1504a and the crankshaft 1502a when the start-up clutch 1503 is in an engaged condition. The sleeve 1504a further holds the fixed gears 1520, 1525 that mesh with the free gears 1530, 1535 of the shift levels I and R, respectively, so that torque can be transmitted from the electro-mechanical energy converter 1545 to the output shaft 1506 by engaging the respective free gear 1530 or 1535 to the output shaft by means of the sliding sleeve 1540. The start-up clutch 1503 is used to couple the sleeve 1504a to the input shaft 1504.

It is self-evident that the stator 1590 and the rotor 1529 could be supported independently in order to ensure that a required gap between them is maintained. For example, the rotor could run in a bearing of a flange connected to the transmission housing.

Figure 17:
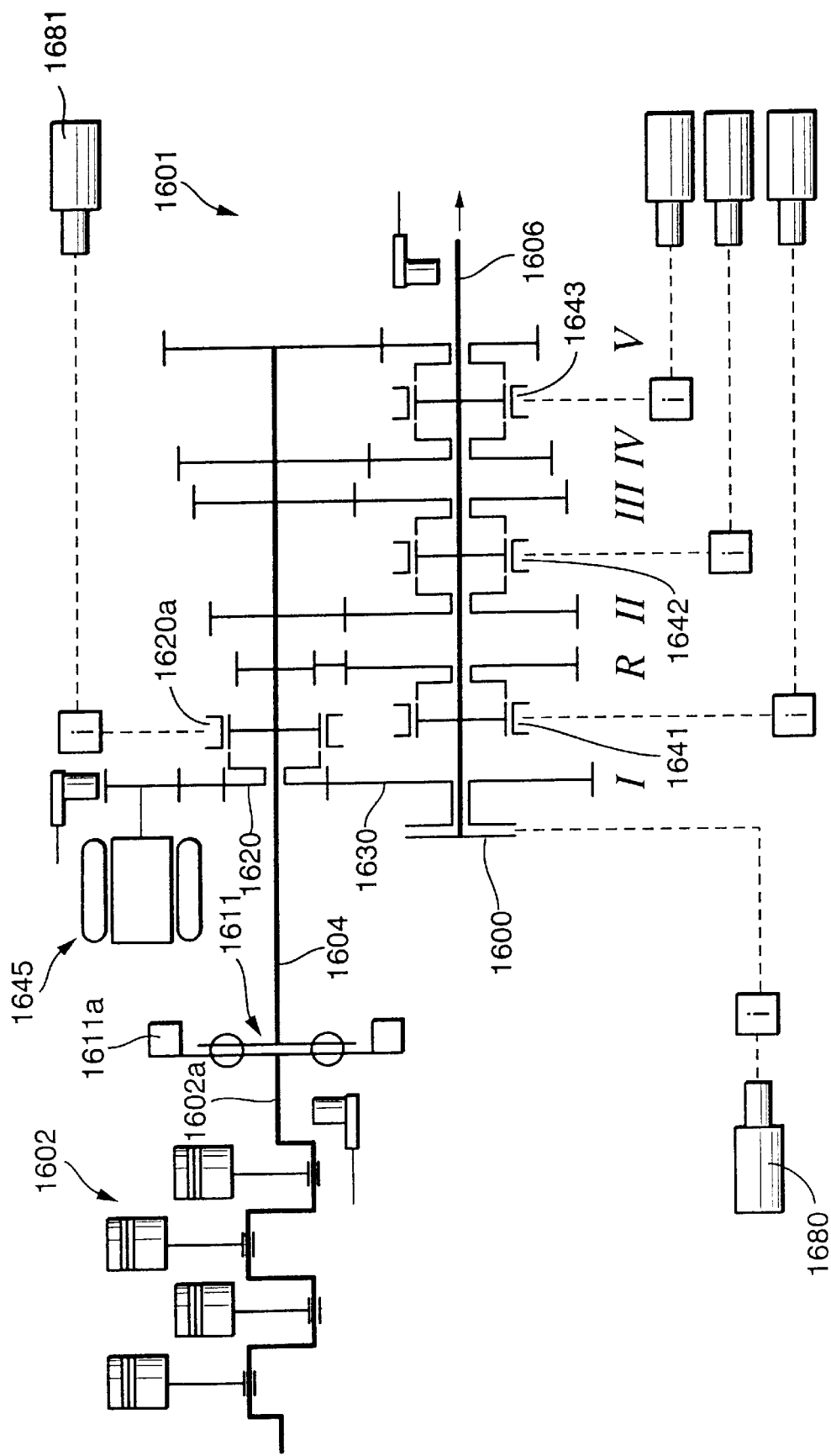

The transmission 1601 shown in FIG. 17 does not require a start-up clutch. The combustion engine 1602 is connected directly to the transmission input shaft 1604 through a torsional vibration damper 1611 with inertial masses 1611a along an outer circumference. The electro-mechanical energy converter 1645 is coupled to the transmission input shaft 1604 by means of the free gear 1620 that belongs to the shift level I and can be rotationally locked to the input shaft 1604 by means of the sliding sleeve 1620a that is operated by the actuator 1681. The electro-mechanical energy converter 1645 can furthermore be coupled to the output shaft 1606 through the clutch 1600, which is operated by the actuator 1680.

The gear pairs of the other shift levels of the transmission, which are not referenced in detail, have the same arrangement and function in the same way as in the previously discussed embodiments.

In the absence of a start-up clutch, the combustion engine 1602 and the electro-mechanical energy converter 1645 work together as follows:

In the starter mode, a torque-transmitting (form-locking) connection between the transmission input shaft 1604 and the free gear 1620 is engaged through the sliding sleeve 1620a. The sliding sleeves 1641, 1642 and 1643 are set to their neutral positions, so that the respectively associated free gears are freely rotatable on the output shaft 1606. In this state of the transmission, the electro-mechanical energy converter can transmit torque to the crankshaft 1602a through the transmission input shaft 1604 and thereby start the combustion engine 1602. Provided the combustion engine 1602 has electrically controlled valves—as shown more clearly in FIG. 36—it is further conceivable to open all valves during an initial time phase of the starting process in which the crankshaft is accelerated together with the inertial masses 1611a of the torsional vibration damper 1611, whereupon the valves required for the starting process are closed and the combustion engine 1602 is started.

When shifting from a currently engaged gear to a new gear level, e.g., from level II to level III, the electro-mechanical energy converter can be used to supply torque to the output shaft 1606 with the clutch 1600 either engaged or slipping. In the case of an up-shift, as the engine rpm rate is lowered, the electro-mechanical energy converter is activated simultaneously, or the clutch 1600 is moved into engagement if the electro-mechanical energy converter 1645 is already engaged through the sliding sleeve 1620a and running in generator mode. The sliding sleeve is taken out of engagement for the shift process. The lowering of the rpm rate of the combustion engine 1602 and the increase in the amount of torque supplied by the electro-mechanical energy converter 1645 are adjusted in such a manner that the gear level II is taken out of engagement at the point where the electro-mechanical energy converter contributes a sufficient amount of torque. When the synchronized rpm level has been reached—likewise controlled through the electro-mechanical energy converter 1645—the sliding sleeve 1642 is moved from its neutral position towards the free gear 1632 to engage shift level III. Subsequently, the torque contributed by the electro-mechanical energy converter 1645 is turned down and the rpm rate of the combustion engine is raised again. As an alternative possibility, the electro-mechanical energy converter 1645 can be uncoupled from the transmission output shaft by disengaging the clutch 1600 and reconnected to the transmission input shaft by means of the sliding sleeve 1620a. The up-shifts into the higher gears are performed in an analogous manner. The procedure for down-shifts is the same, except that the engine rpm rate is raised instead of lowered after disengaging the currently active gear, while the electro-mechanical energy converter is used to slow down the output shaft 1606 and thereby generate electric energy that is put into a storage device, e.g., an accumulator battery such as a high-current battery, or a capacitative storage device. When the synchronized rpm rate and a torque-free condition have been attained at the sliding sleeve of the new shift level, the sliding sleeve is moved into form-locking engagement with the free gear for the new shift level.

As described previously, to operate the electro-mechanical energy converter in a generator mode, the free gear 1620 is engaged by means of the sliding sleeve 1620a and thereby locked to the transmission input shaft 604, so that the electro-mechanical energy converter is driven at the rpm rate of the combustion engine 1602 multiplied by the ratio of the interposed gear set. As an alternative possibility of a generator mode, the clutch 1600 could be in an engaged condition while the sliding sleeve 1620a is disengaged, so that the rpm rate of the electro-mechanical energy converter is dictated by the output shaft 1606, while the free gear 1620 is uncoupled and runs free on the input shaft. This second torque-flow path can also be used if the vehicle is to be slowed down through an energy-recovery mode. In the latter case, the currently engaged gear can be taken out of engagement and the electro-mechanical energy converter 1645 can be used alone by itself to decelerate the vehicle, i.e., without using the drag torque of the combustion engine. This mode is more effective for converting kinetic energy into electrical energy; but with a strong deceleration, it is possible to overload the electro-mechanical energy converter 1645, if the vehicle brakes are not used at the same time. This kind of overload on the electro-mechanical energy converter can be prevented by appropriate program routines in the control unit, so that a gear level is brought into engagement that is appropriate for the rpm rate of the output shaft 1606.

Figure 18:
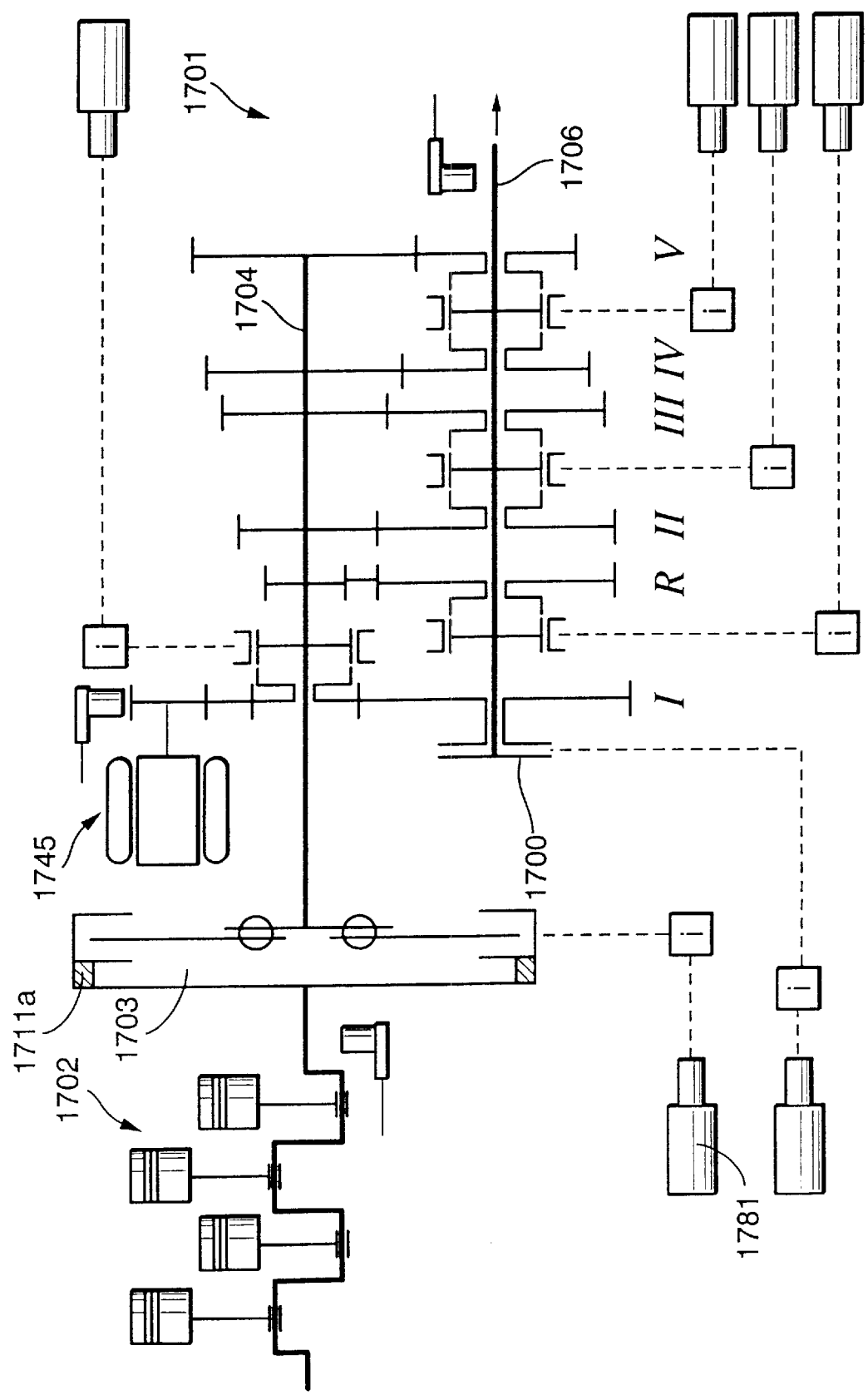

The transmission 1701 illustrated in FIG. 18 is distinguished from the transmission 1601 of FIG. 17 by the addition of a start-up clutch 1703 that is controlled by the actuator 1781. This has the advantage that in the energy-recovery mode, the torque flow path can run through whichever of the gear levels II through V is engaged while the start-up clutch 1703 is out of engagement, but can be moved into engagement if there is a danger of overloading the electro-mechanical energy converter 1745, so that the drag torque of the engine will assist in slowing down the vehicle. Furthermore, this arrangement allows a momentum-assisted start of the combustion engine 1702, where the electro-mechanical energy converter 1745 first accelerates the flywheel mass of the start-up clutch 1703 while the latter is in a disengaged state, whereupon the start-up clutch 1703 is engaged and the stored energy of the flywheel—with or without the assistance of the electro-mechanical energy converter 1745—is used to start the combustion engine 1702. In addition, the transmission 1701 offers the possibility of completely uncoupling the combustion engine 1702 from the transmission input shaft 1704 during gear shifts, in which case the synchronized rpm rate is set by the electro-mechanical energy converter 1745 independently of the the combustion engine, while the electro-mechanical energy converter 1745 can at the same time supply torque to the transmission output shaft 1706 during up-shifts.

Figure 19:
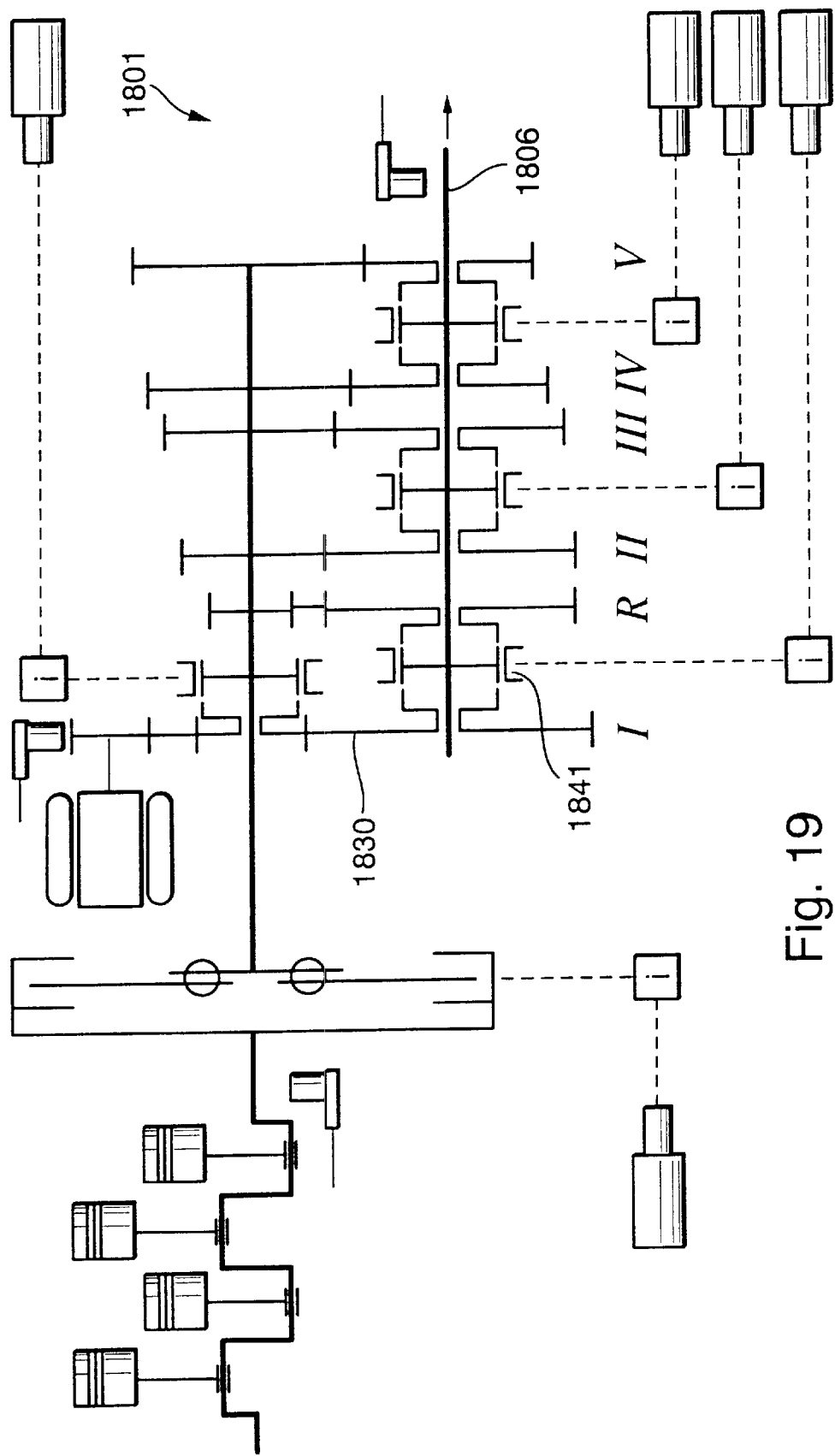

FIG. 19 represents an embodiment of a transmission 1801 that is identical to the transmission 1701 of FIG. 18, except for the absence of a clutch that would correspond to the clutch 1700 of FIG. 18. The function of the clutch 1700 has been integrated in the sliding sleeve 1841 which can couple a free gear 1830 to the output shaft 1806.

The FIGS. 20 to 35 illustrate the flow paths of of the torque in typical operating situations of transmissions according to the invention. The actual torque-flow path in each example is indicated by a bold line along the respective components of the transmission, and the sense of direction of the torque flow is indicated by an arrowhead.

Figure 20:
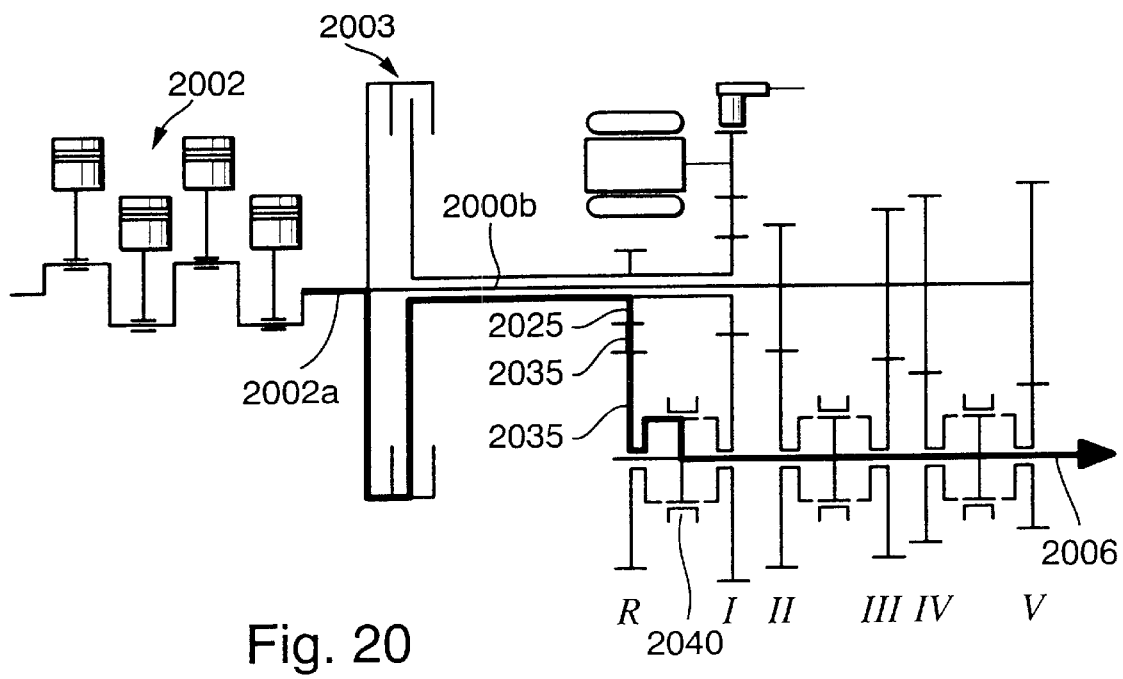

FIG. 20 indicates a torque-flow path from a combustion engine 2002 to the output shaft and to the driving wheels (not shown) in the reverse-drive mode.

From the combustion engine 2002, the driving torque flows through the start-up clutch 2003 (which is rotationally locked to the crankshaft 2002*a*) to the sleeve 2000*b* on the transmission input shaft 2004 and from there through the sleeve-mounted fixed gear 2025 and the reverse idler gear 2036 to the free gear 2035, which is locked to the output shaft 2006 through the sliding sleeve 2040, from where the torque-flow path continues to the driving wheels (not shown).

Figure 21:
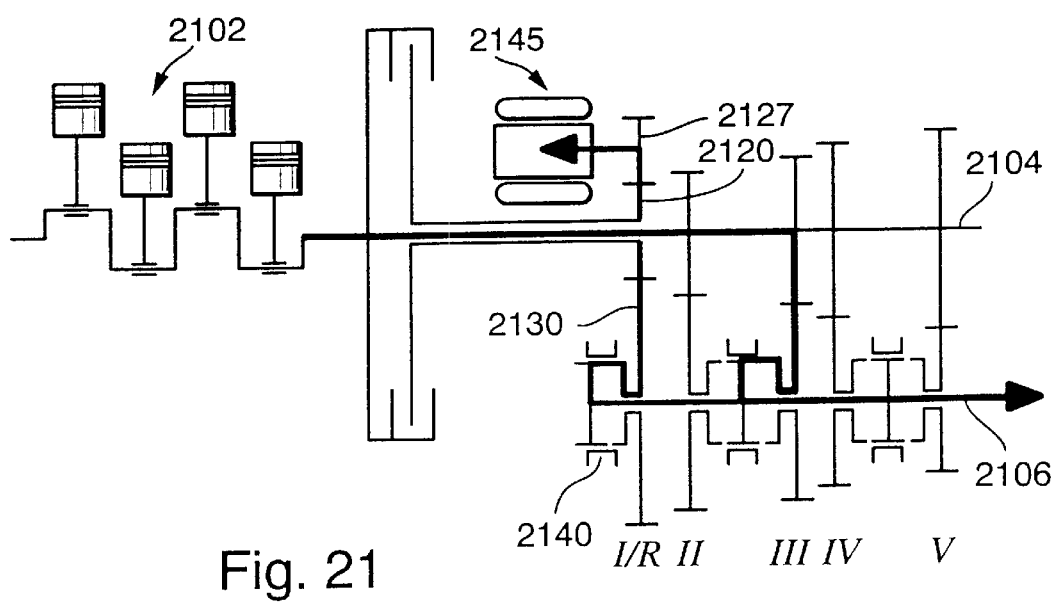

FIG. 21 illustrates the torque-flow path of a transmission according to the invention working in a generator mode while the vehicle is moving. The combustion engine 2102 directly drives the transmission input shaft 2104, from where the torque flows through the fixed gear to the free gear of the currently active shift level III, continuing through the engaged sliding sleeve to the output shaft 2006.

A portion of the torque is tapped off through the engaged sliding sleeve 2140 and passed on through the free gear 2130 and the gear combination 2120, 2127 to the electro-mechanical energy converter 2145, which converts the kinetic energy received into electrical energy. In this arrangement, the rpm rate of the electro-mechanical energy converter 2145 depends on the rpm rate of the output shaft 2106 multiplied by the ratio of the gear combination 2127, 2120, 2130.

Figure 22:
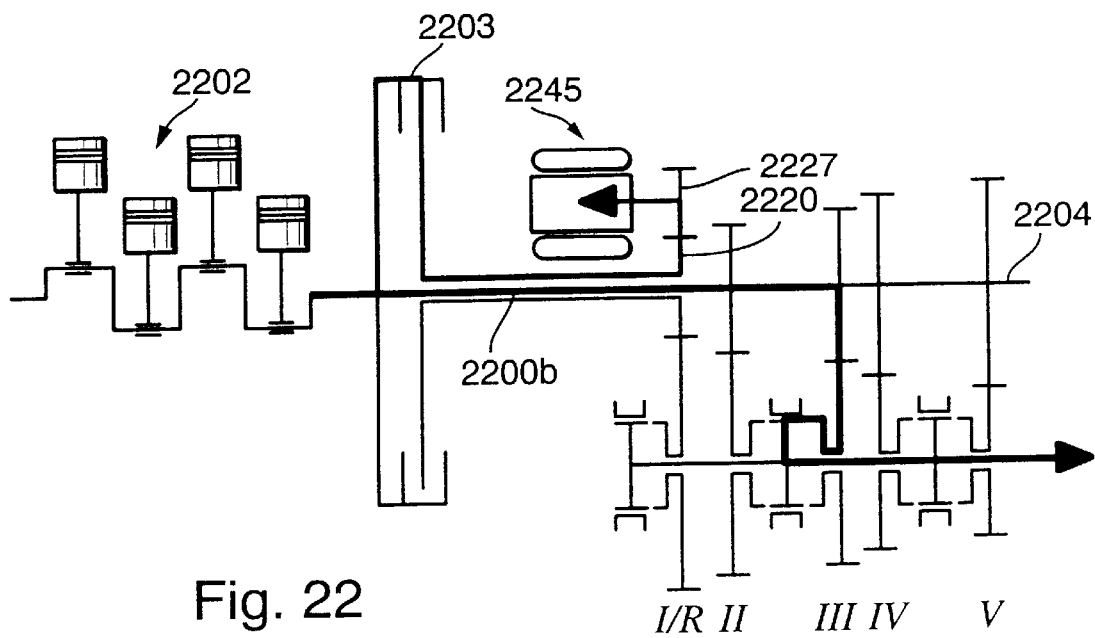

FIG. 22, likewise, shows how the electro-mechanical energy converter 2245 can work as a generator while the vehicle is traveling. In the illustrated arrangement, the electro-mechanical energy converter 2245 is coupled to the input shaft 2204 through the engaged start-up clutch 2203, so that a direct connection exists between the combustion engine 2202 and the electro-mechanical energy converter by way of the sleeve 2220*b* which carries the fixed gear 2220 that meshes with the rotor-shaft gear 2227, so that the rpm ratio between the combustion engine 2202 and the electro-mechanical energy converter corresponds to the ratio of the gear combination 2220, 2227.

The way in which the vehicle is propelled is analogous to FIG. 21, i.e., the drive torque flows through one of the shift stages II through V (III in the illustrated case).

Figure 23:
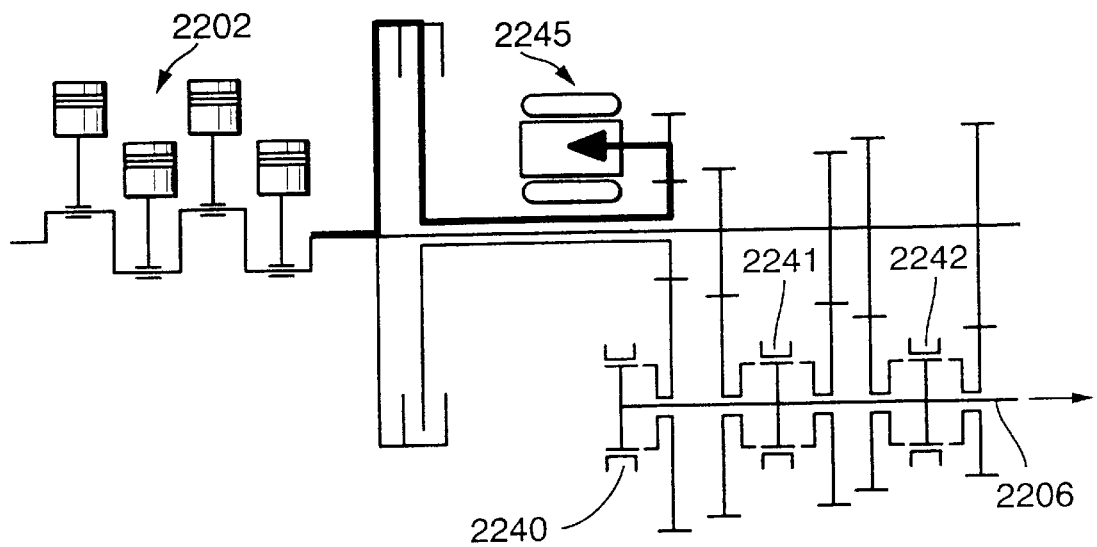

FIG. 23 illustrates the torque-flow path in the case where the vehicle is standing still. The way in which the combustion engine 2202 is driving the electro-mechanical energy converter 2245 is analogous to FIG. 22, but all of the sliding sleeves 2240 to 2242 are set to their neutral positions, so that no torque is transmitted to the output shaft 2206 and the vehicle is therefore not being propelled. The rpm rate of the combustion engine 2202 can be adjusted to the charge level of the storage device.

Figure 24:
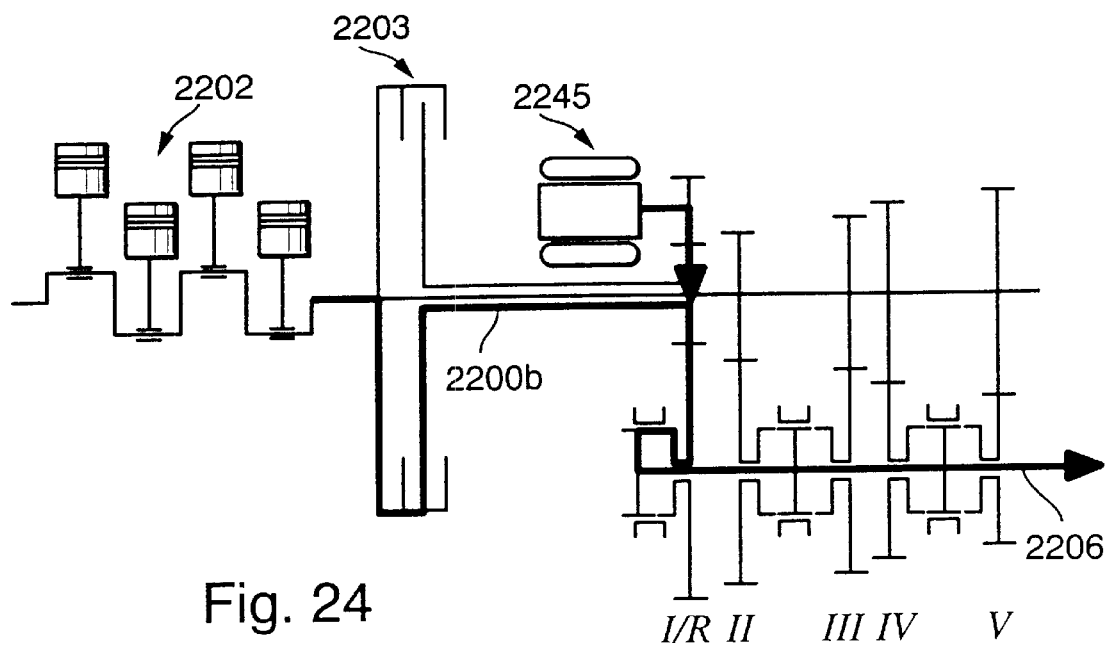

FIG. 24 illustrates a traveling state of the vehicle with the transmission in first gear (I) and with torque being supplied to the output shaft 2206 by both the combustion engine 2202 as well as the electro-mechanical energy converter 2245. In this mode of operation, also referred to as boost mode, the torque flow path leads from the combustion engine 2202 through the start-up clutch 2203 to the sleeve 2200*b* and its connected fixed gear 2220 of the first gear level (I). Gear 2220 also receives torque from the electro-mechanical energy converter 2245, and the combined torque flows through the free gear 2230 with its engaged sliding sleeve 2240 to the output shaft 2206 and to the driving wheels (not shown). The boost mode is preferably used to accelerate the vehicle more strongly, in this case in first gear. As is self-evident, the combustion engine 2202 could also transmit its share of the torque to the output shaft through one of the other gear stages, i.e., II to V, while the electro-mechanical energy converter 2245 can transmit torque to the output shaft 2206 through gear stage I. Thus, the illustrated arrangement allows a boost mode in which torque is supplied to the output shaft 2206 through two different gear stages or, in other words, the electro-mechanical energy converter 2245 can assist the combustion engine 2202 also at other shift levels.

Figure 25:
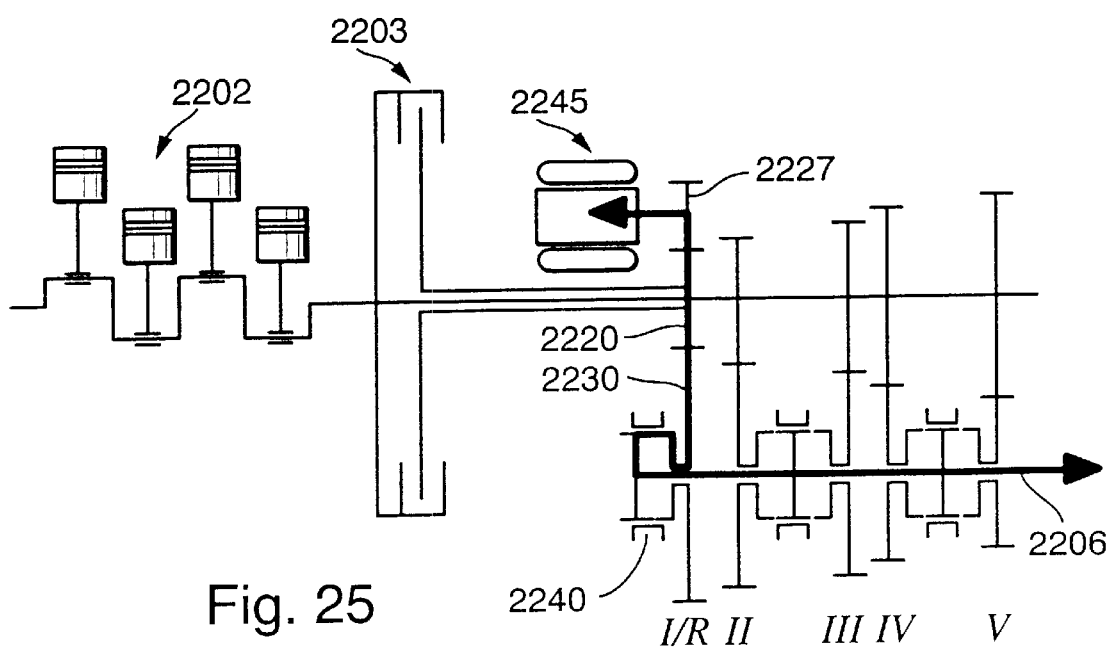

FIG. 25 gives an example of a transmission according to the invention working in recovery mode. The torque flows from the driving wheels of the vehicle (not shown) through the output shaft 2206, the engaged sliding sleeve 2240, free gear 2230 and fixed gears 2220, 2227 to the electro-mechanical energy converter 2245. The latter is in this case operated in generator mode, converting the kinetic energy transmitted from the driving wheels into electric energy, whereby the vehicle is slowed down. The amount of power absorbed by the electro-mechanical energy converter 2245, and thus the amount of vehicle deceleration, is determined by the combined ratio of the gears in the torque-flow path. If the braking effect from energy-recovery alone is not sufficient, then the start-up clutch 2203 can be engaged to add the drag torque of the combustion engine 2202, and/or the vehicle brakes can be applied.

FIGS. 26, 26*a*, 27, 27*a*, 28 show the sequence of phases in a power-shifting process performed with the assistance of the electro-mechanical energy converter 2245, in the illustrated example an up-shift from second to third gear.

Figure 26:
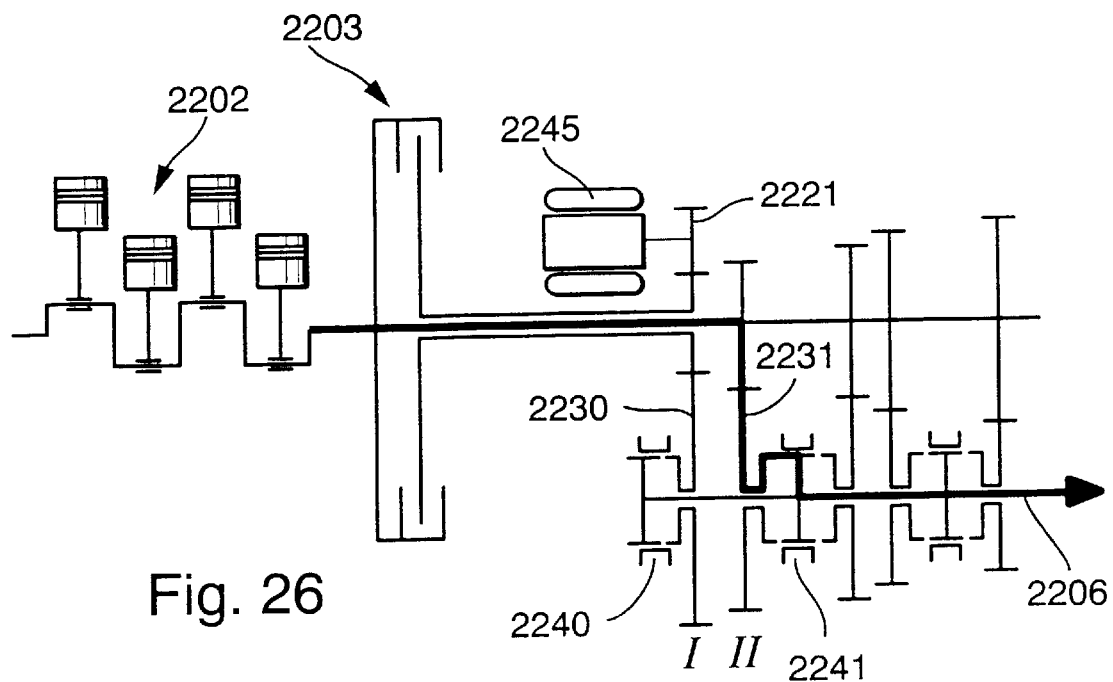
Figure 26A:
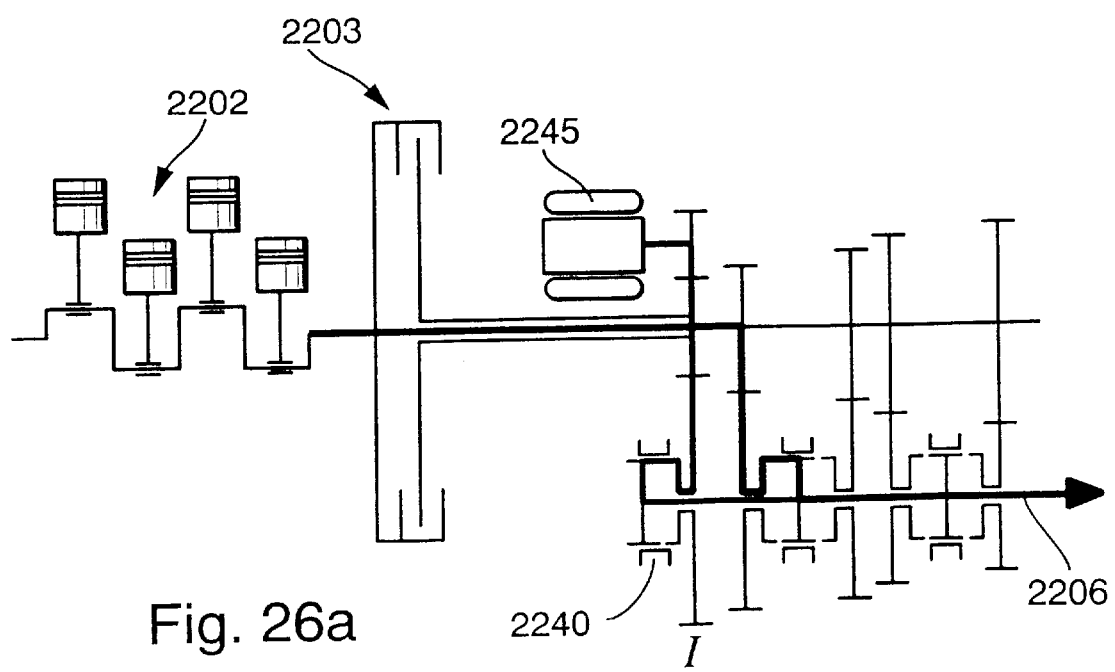

In FIG. 26, the transmission is in shift level II, i.e., the combustion engine 2202 transmits torque to the output shaft 2206 by way of the input shaft 2204, the gear pair 2221, 2231, and the engaged sliding sleeve 2241. The electro-mechanical energy converter 2245 could at this time be working in generator mode, receiving torque, e.g., from the transmission input shaft through the clutch 2203 or, as shown in FIG. 26, from the output shaft 2206 through the free gear 2230 of shift level I, which is engaged by the sliding sleeve 2240. In this case, the electro-mechanical energy converter is arranged at the gear pair of shift level I.

To start the shift process, the electro-mechanical energy converter, supplied with current from the storage device and thus working as a motor, applies torque to the transmission output shaft 2206 through the gear stage I with the sliding sleeve 2240 in an engaged condition. At the same time, the torque of the combustion engine 2202 is lowered.

Figure 27:
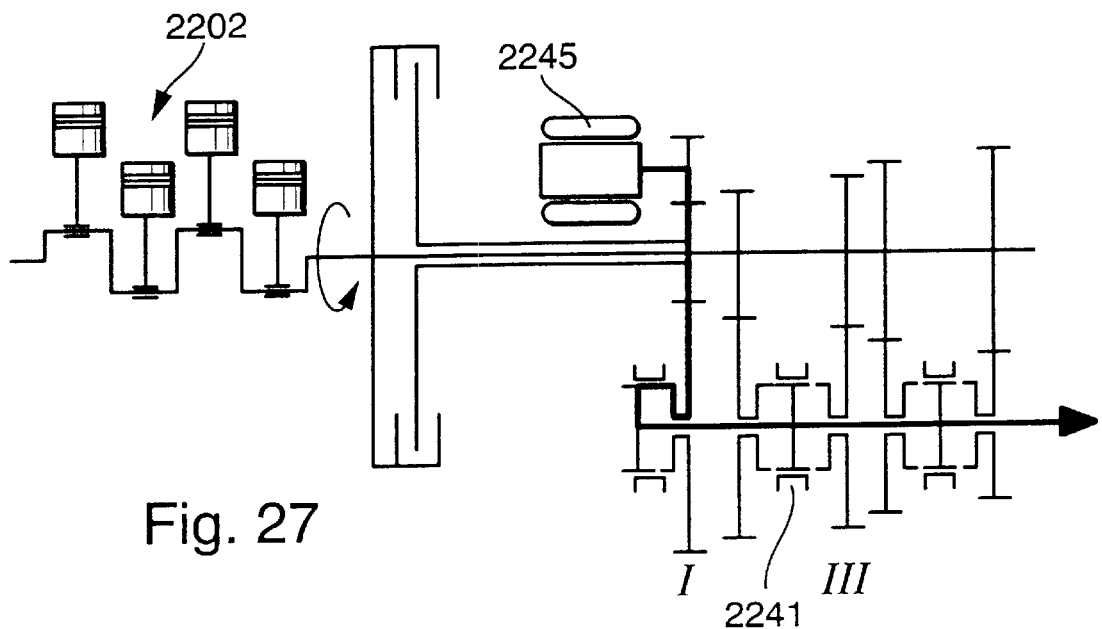
Figure 27A:
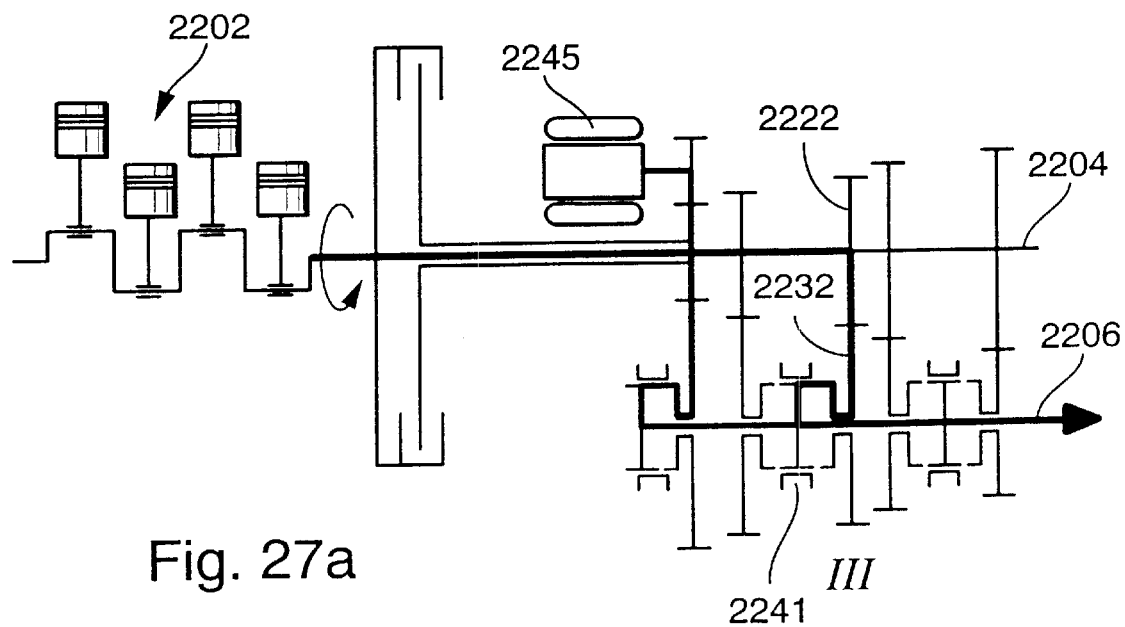

The next step is shown in FIG. 27, where the sliding sleeve 2241 has been moved to its neutral position, so that the electro-mechanical energy converter 2245 alone is maintaining the propulsion of the vehicle through gear stage I. Depending on the power capacity of the electro-mechanical energy converter 2245, the latter will either completely or partially compensate for the missing amount of torque from the combustion engine 2202 during the shift phase where the previous gear has already been disengaged and the new gear is not yet engaged. During this phase, the rpm rate of the combustion engine 2202 is adjusted in order to synchronize the rpm rate at the new gear level III.

After the synchronous rpm rate and a torque-free state of the sliding sleeve 2241 have been attained, the latter is moved axially towards the free gear 2232 and brought into engagement, so that the combustion engine 2202 can transmit torque by way of the transmission input shaft 2204 and the fixed gear 2222 of shift level III to the output shaft 2206, i.e., the new gear is engaged.

Figure 28:
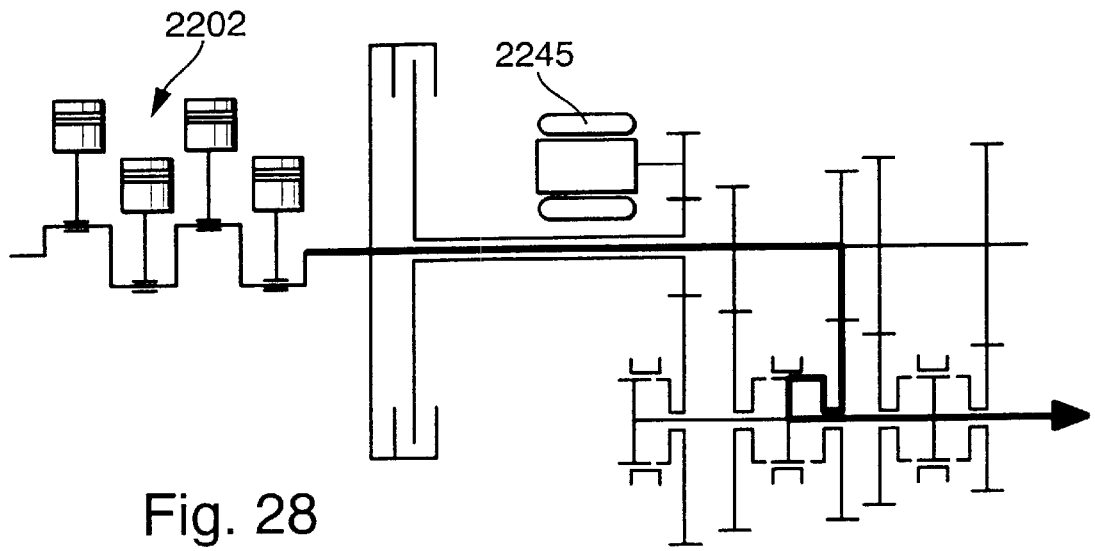

In FIG. 28, the current supply to the electro-mechanical energy converter 2245 is turned off, and the latter returned to the generator mode as discussed in the context of FIG. 26.

Figure 29:
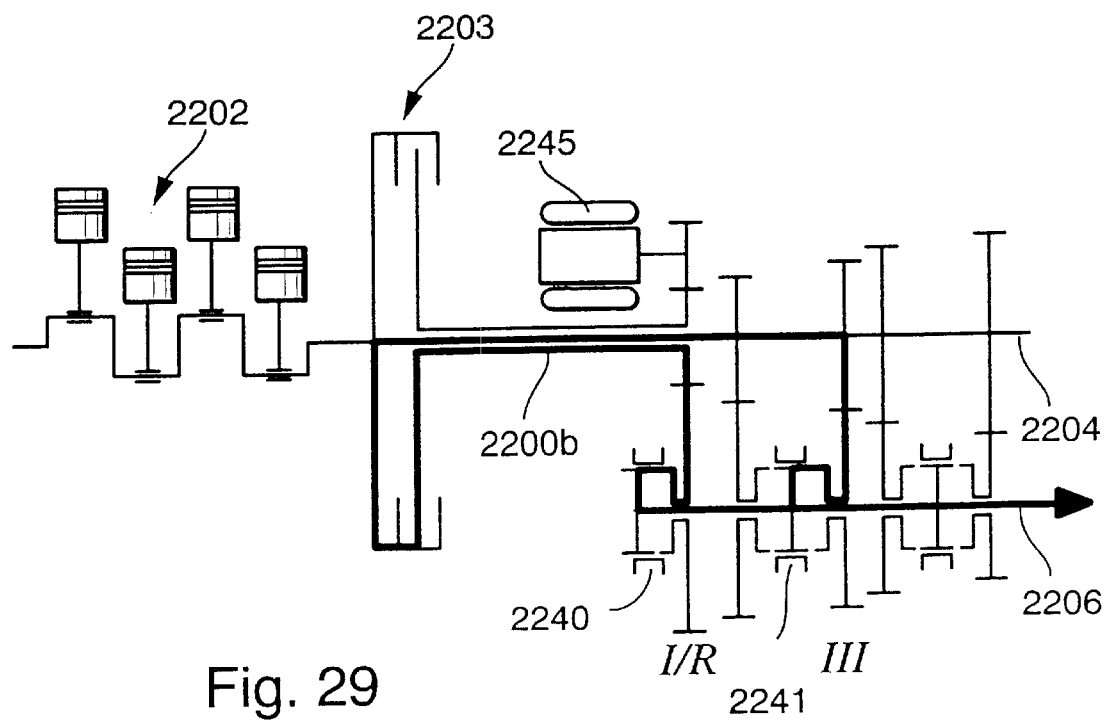

FIG. 29 illustrates how the transmission could be shifted into a locked condition to prevent the vehicle from rolling away unintendedly. With the start-up clutch 2203 engaged, the sliding sleeve 2240 of the gear stage I/R and the sliding sleeve of another gear stage are engaged simultaneously, e.g., the sleeve 2241 may be engaged at the free gear 2222 of gear stage III. Because the sleeve 2200b is coupled to the transmission input shaft 2204 by means of the start-up clutch 2203, the two shift levels I and III are coupled to each other in a torque-locking connection, so that the transmission is blocked and the driving wheels, being coupled to the output shaft 2206, are immobilized.

FIG. 30 illustrates the torque flow when the combustion engine 2202 is started by means of the electro-mechanical energy converter 2245. The combustion engine 2202 can be started either by applying the torque of the electro-mechanical energy converter 2245 directly or through a momentum-assisted start. In the latter case, the electro-mechanical energy converter 2245 first accelerates the flywheel mass of the start-up clutch 2203 while the latter is in a disengaged state, whereupon the start-up clutch 2203 is engaged and the stored energy of the flywheel—with or without the assistance of the electro-mechanical energy converter 2245—is used to start the combustion engine 2202. In the engine-start mode, the transmission input shaft 2204, which is connected directly to the crankshaft 2202a, is in frictional engagement with the sleeve 2200b through the start-up clutch 2203. The sleeve 2200b, in turn, is rotationally tied to the electro-mechanical energy converter 2245 through the gears 2220 and 2227.

Another kind of engine start is in the energy-recovery mode as a drag start. The corresponding torque flow path is shown in FIG. 31. A torque flows from the driving wheels through the output shaft 2206 and the engaged sliding sleeve 2240 to the gear pair 2230, 2220, continuing through the sleeve 2200b and the engaged clutch 2203 to the crankshaft 2202a. The torque arriving at the crankshaft, working against the compression torque (drag torque), is used to start the engine. To improve the driving comfort during the starting phase, the clutch 2203 can be engaged gradually or operated with slip as the torque introduced from the output shaft 2206 is built up. In addition, the electro-mechanical energy converter 2245 can be used to contribute an additional amount of torque through the sleeve 2200b and to thereby further enhance the comfort level of the drag start process. The sliding sleeves of the shift stages II to V are in their neutral positions during a drag start.

Figure 32:
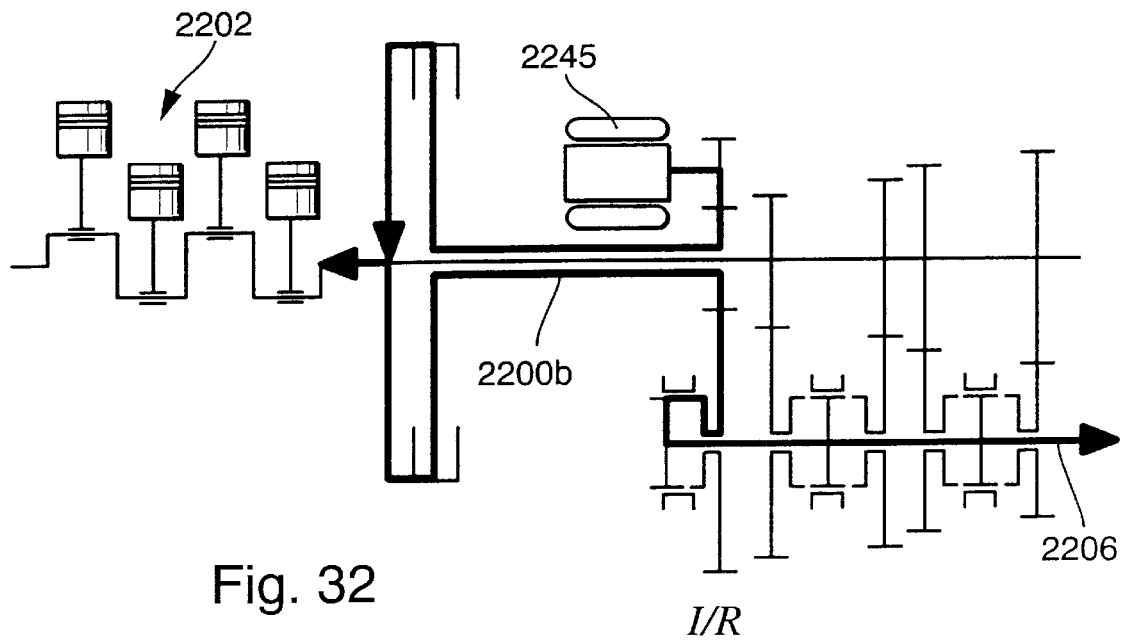

The combustion engine 2202 can be started in an analogous manner during a time when the electro-mechanical energy converter 2245 alone is used to propel the vehicle, as shown in FIG. 32. In this case, the electro-mechanical energy converter 2245 drives the output shaft 2206 through the gear stage I. To initiate the engine start, the start-up clutch 2203 is brought into engagement, and the torque of the electro-mechanical energy converter 2245 combined with the torque flowing back from the driving wheels through the output shaft 2206, gear stage I and sleeve 2200b is used to overcome the drag torque and start the combustion engine 2202.

Figure 33:
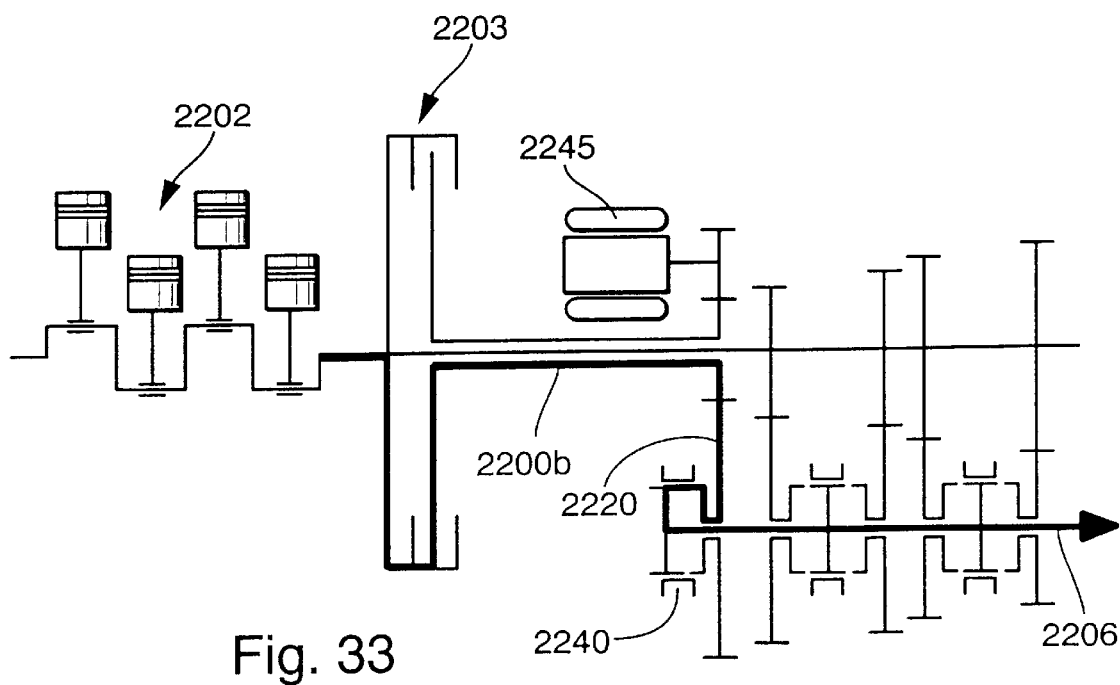

FIG. 33 illustrates the torque flow path when the vehicle is set in motion in first gear. By engaging the start-up clutch 2203, the combustion engine is coupled to the sleeve 2200b, and the torque is applied through the gear stage I, where the sliding sleeve 2240 engages the free gear 2220 to the output shaft, whereby the torque coming from the combustion engine 2202 is introduced into the transmission output shaft 2206.

Figure 34:
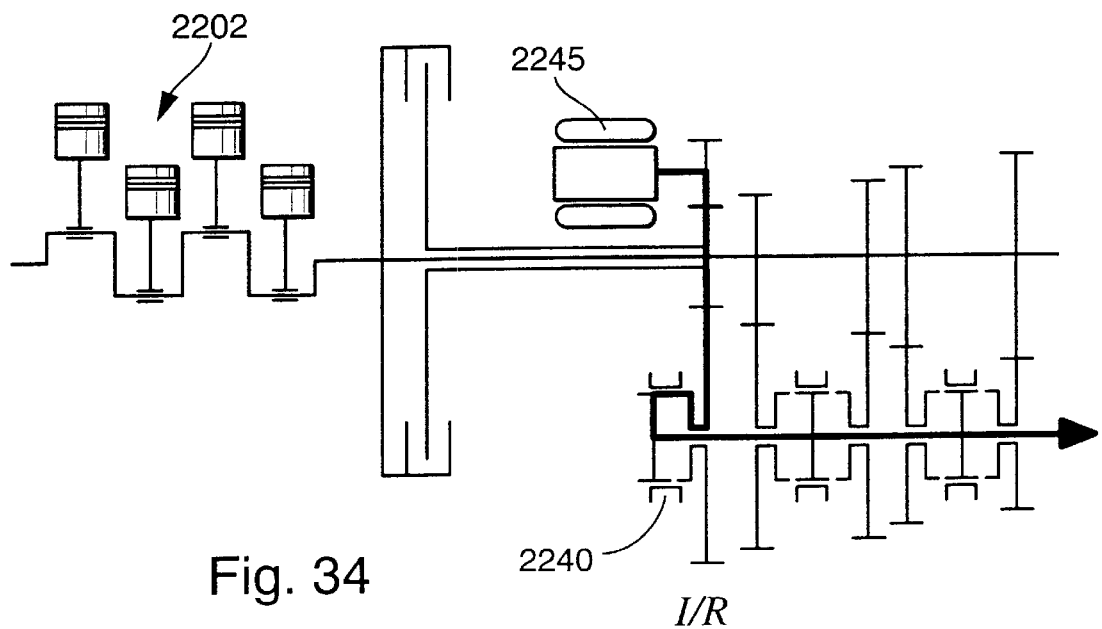

Alternatively, the vehicle can be set in motion by using the electro-mechanical energy converter 2245 in the manner illustrated in FIG. 34. With the electro-mechanical energy converter working through the gear stage I/R, the vehicle can move in a forward or reverse direction. With the illustrated arrangement, the direction of vehicle travel is dictated by the sense of rotation of the electro-mechanical energy converter 2245. Thus, the only difference between starting in the forward or reverse direction lies in the polarity of the electro-mechanical energy converter 2245. To get the vehicle to move, the sliding sleeve 2240 of the gear stage I/R is engaged and the electro-mechanical energy converter 2245 is accelerated appropriately.

Figure 35:
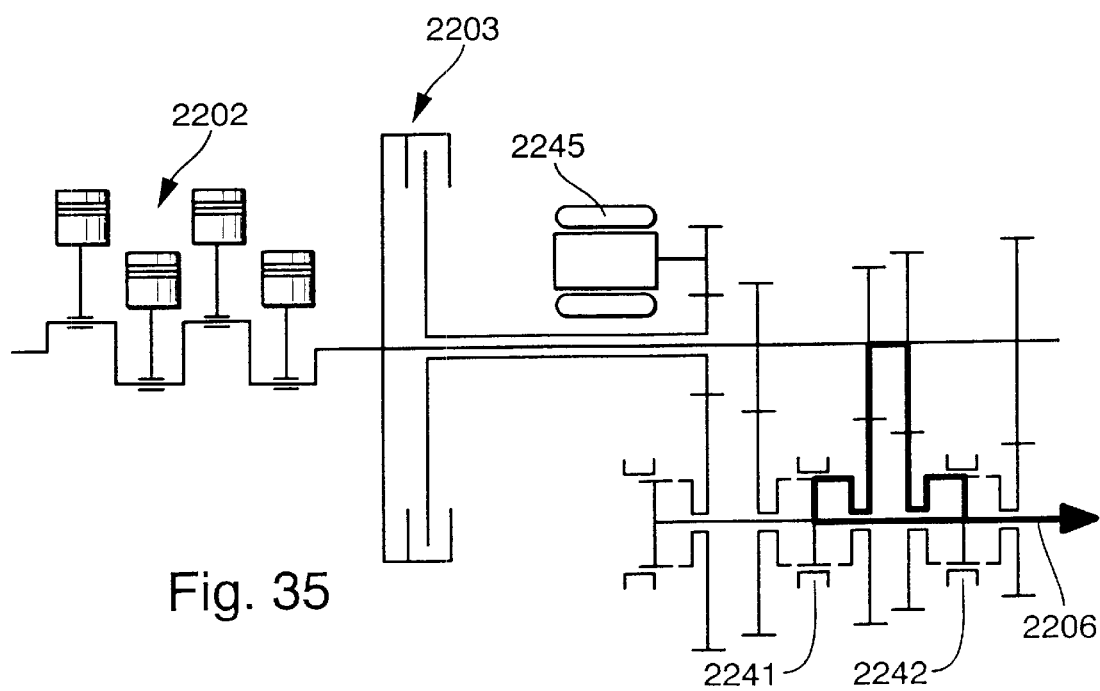

FIG. 35 illustrates an alternative way of realizing a parking lock by simultaneously locking two of the free gears associated with the sliding sleeves 2241 and 2242 into engagement with the output shaft 2206, whereby the transmission is blocked. A parking lock of this kind is possible only if the sliding sleeves are controlled by different actuators and has the advantage that it puts a positive, form-locking constraint on the transmission.

Figure 36:
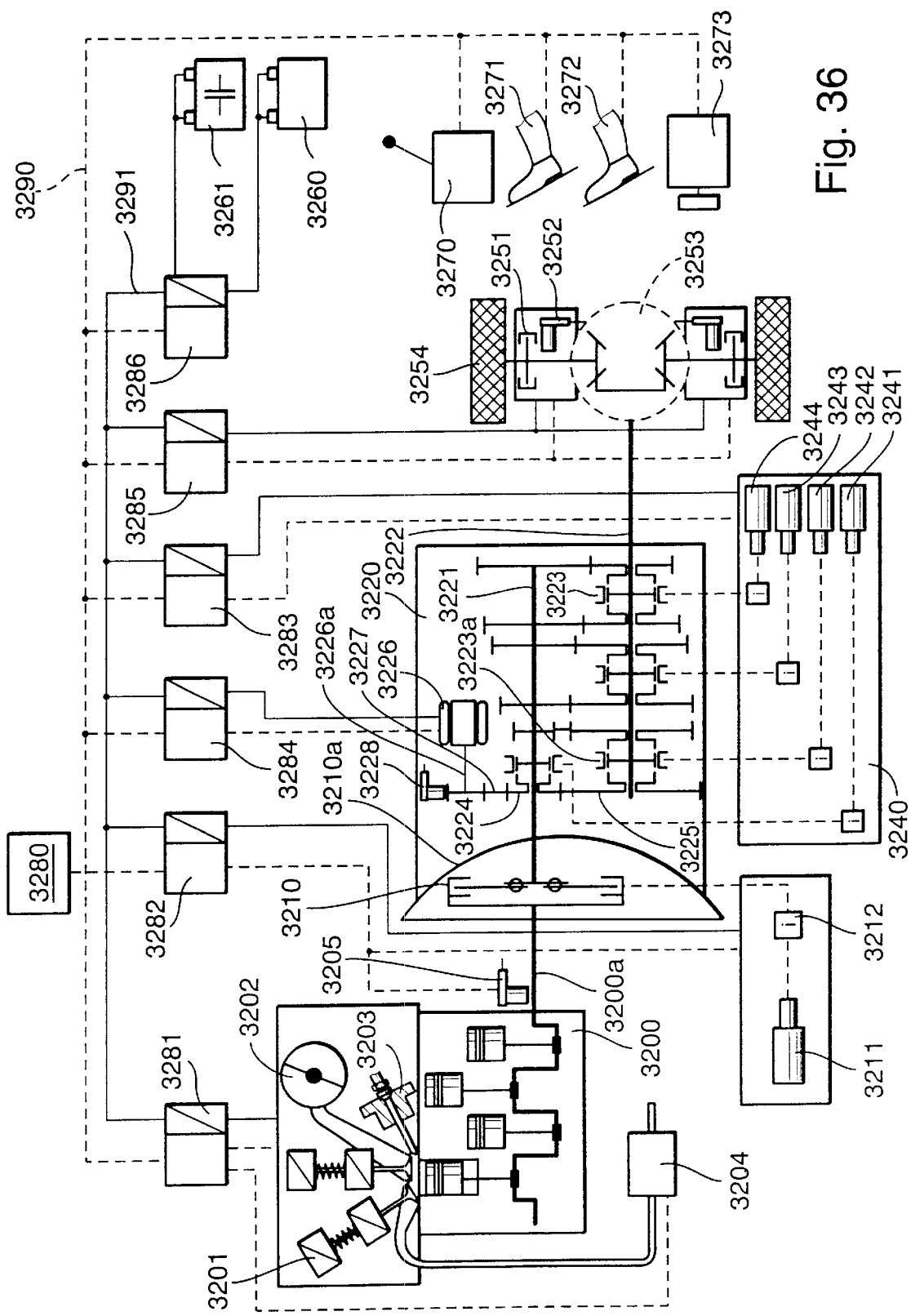
FIG. 36 represents a schematic map to illustrate the control-signal flow for clutches.

FIG. 36 gives a schematic view of a vehicle equipped with a transmission 3220 in accordance with the present invention. The combustion engine 3200 has separately controllable valves 3201, which can be opened and closed, e.g., by an electrical actuator independent of a valve-drive mechanism that is coupled to the crankshaft. The separately controllable valves 3201 allow a control over the compressive drag torque of the combustion engine, which can be advantageous, e.g., in starting the combustion engine 3200, because the electro-mechanical energy converter 3226 can be dimensioned for a smaller power rating.

The throttle valve 3202 can likewise be equipped with an actuator, e.g., an electric motor, in order to automate the operation of the throttle for the purpose of controlling the rpm rate of the engine, for example to set the rpm rate for synchronization when shifting gears. In principle for the same purpose, the fuel injection 3203 could also be controlled automatically by the control unit.

The exhaust valve 3201 is connected to a catalytic converter 3204 with an oxygen sensor (a so-called Lambda-Sond sensor) and in some cases with a temperature sensor for sensing the temperature of the exhaust gas or of the catalytic converter.

The clutch 3210 is arranged in the torque flow path between the combustion engine 3200 and the transmission 3220, functioning as a start-up clutch to uncouple the combustion engine 3200 from the transmission 3220. The clutch 3210 can be a dry clutch, accommodated in the clutch bell 3210a, or it can be configured as a wet clutch and arranged in the transmission. In many cases, the clutch can be omitted, and the crankshaft 3200a can be coupled directly to the transmission input shaft 3221. The clutch 3210 is operated automatically by means of a clutch actuator 3211 through a clutch-actuating mechanism with a force- or motion-amplifying device 3212 or other means of moving the clutch.

The transmission 3220 is structured into a transmission input shaft 3221 and a transmission output shaft 3222 with each shift level represented by a fixed gear on the input shaft 3221 meshing with a free gear on the output shaft 3222. Any one of the free gears can be locked to the output shaft 3222 by engaging a shift clutch 3223, e.g., a sliding sleeve, to cause the torque to flow through the gear pair of the respective shift level. The shift clutches are operated by a transmission actuator system 3240 that includes the actuators 3421 to 3244. The number of actuators may depend on the type of gear-shifting system used and on the arrangement of the shift clutches 3223 as well as on the choice of location where the actuator system 3240 is placed, e.g., whether it is arranged outside or inside of the transmission housing. Embodiments representing these possibilities have been discussed previously in the context of FIGS. 1 to 19.

The electro-mechanical energy converter 3226 is coupled by way of a gear 3227 to one of the gear pairs. In the illustrated example, it is the pair 3224, 3225, i.e., the pair with the greatest rpm-reduction ratio. The electro-mechanical energy converter 3226 can be coupled to the input shaft 3221 by means of the free gear 3224 and its associated shift clutch 3224a, controlled automatically by an actuator 3241. It can also be coupled to the output shaft 3222 through the free gear that is paired with the gear 3224 and the associated gear clutch 3223a. With this arrangement, the transmission 3220 can function as a power-shifting transmission, supported by the electro-mechanical energy converter 3226 when the traction of the combustion engine 3200 is interrupted during a gear shift. Furthermore, the electro-mechanical energy converter 3226 in the transmission 3220 can also be used as an electric generator, booster, and starter motor.

The rpm rates of the individual shafts are monitored and transmitted to a control unit for evaluation by at least one rpm sensor 3205 at the crankshaft 3200a and an rpm sensor 3228 at the rotor shaft 3226a of the electro-mechanical energy converter 3226. The rpm rate of the output shaft can be monitored by an rpm sensor placed at the output shaft itself and/or by wheel rpm sensors 3252 (as shown) that may belong to an anti-lock braking system of the brakes 3251 at the wheels 3254. The wheels are positively coupled to the transmission output shaft 3222 through the differential 3252.

The transmission 3220 is to a large extent automated and controlled by a central control unit 3280. The driver gives input to the central control unit 3280 through the drive pedal 3271, the brake pedal 3272 and the manual actuating element or shift lever 3270. The control unit 3280 may also provide a manual shift mode in which the driver selects a desired gear level by means of the manual actuating element.

The control unit 3280 controls subordinate control devices or auxiliary systems such as the air-conditioning compressor and the like. Subordinate control devices are tied to the central control unit 3280 by means of the control line 3290 configured, e.g., as a CAN bus. These subordinate controls include at least the engine control unit, the clutch control unit 3282, the control of the transmission actuators, the control unit 3286 of the anti-lock braking system, and the control unit 3284 of the electro-mechanical energy converter. At least some of the subordinate control units have their own power electronic section supplied by the on-board power system through the power supply line 3291. The on-board system is fed by a storage battery 3261, e.g., a high-current battery and/or an appropriately designed power capacitor 3260. The electro-mechanical energy converter 3226, depending on its operating mode, either receives current from the storage devices 3260, 3261 or returns current, i.e., charges the storage devices.

Figure 37:
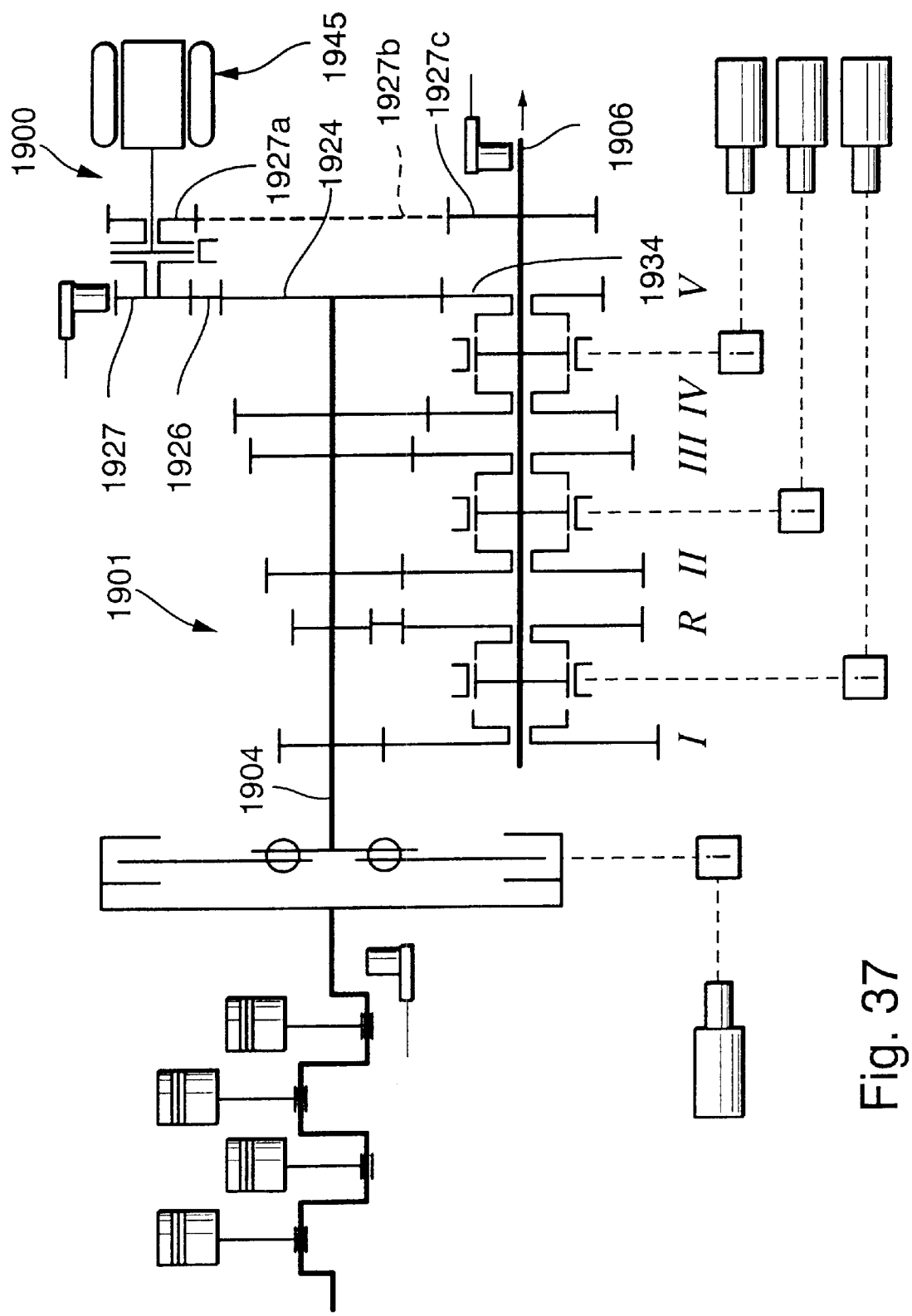
FIGS. 37 to 38 illustrate advantageous configurations of the inventive transmission.

FIG. 37 illustrates a transmission 1901 of a comparable design as the transmission 401 in FIG. 5, except that the electro-mechanical energy converter 1945 is arranged to work with the gear pair 1924, 1934 of shift level V.

According to the invention, the electro-mechanical energy converter 1945 can be coupled either to the transmission input shaft 1904 or the output shaft 1906. The selective coupling is effected by a shift clutch 1900, e.g., a sliding sleeve by which either of the free gears 1927 or 1927a can be engaged to the rotor shaft. The gear 1927, in turn, is coupled to the input shaft 1904 through a further gear 1926, while the gear 1927a is coupled to the output shaft 1926 through a connection 1927b (shown as a broken line), e.g., a gear-, belt-, or chain drive including a gear or pulley 1927c.

Figure 38:
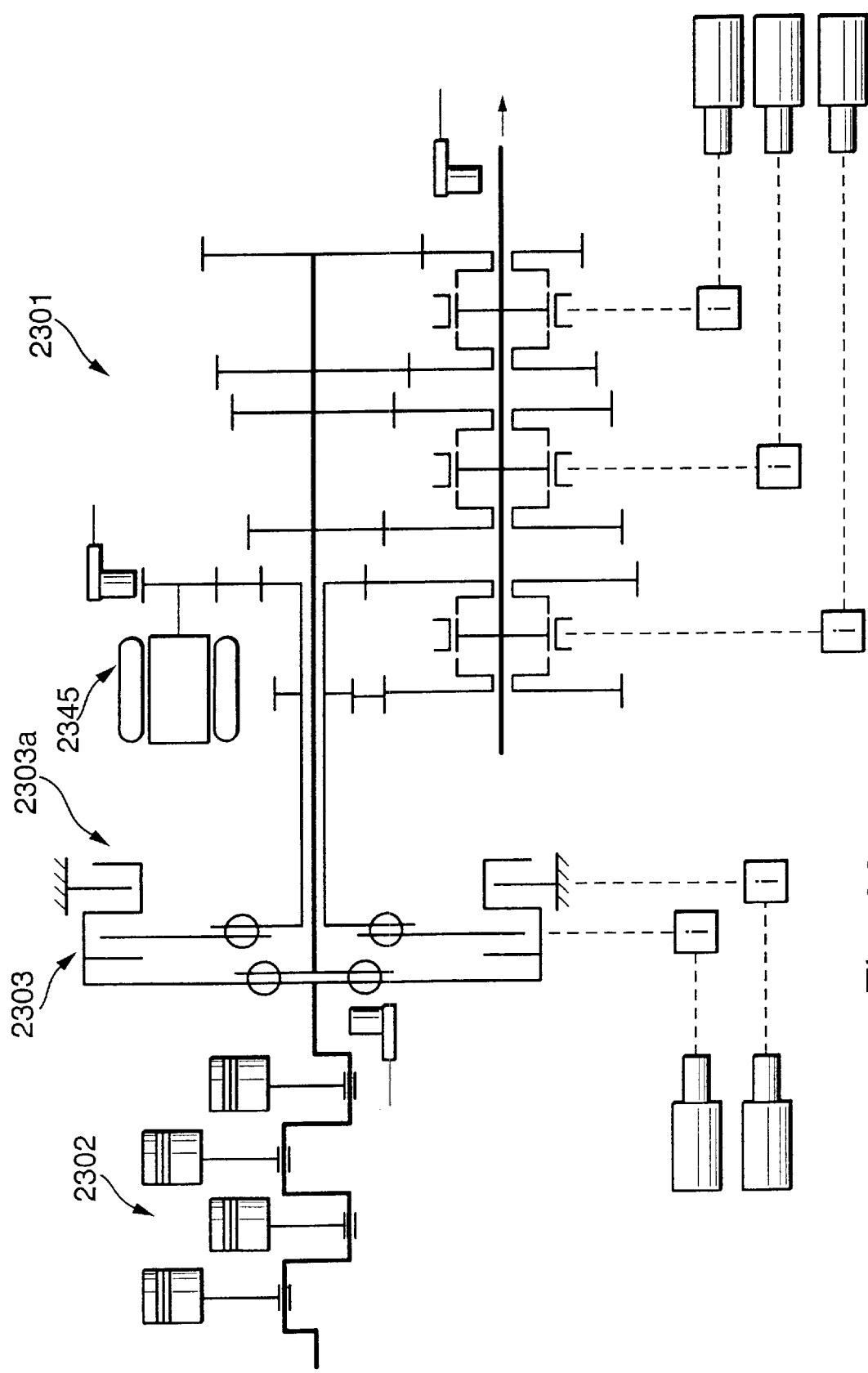

FIG. 38 illustrates an embodiment of a transmission 2301 where the rotary output of the combustion engine 2302 can be locked to the housing, e.g., by means of a clutch 2303a that is integrated in the start-up clutch 2303. This allows the electro-mechanical energy converter 2345 to drive the vehicle at torque levels that are higher than the drag torque of the combustion engine 2202 and also to receive torque in the same way when operating in an energy-recovery mode to convert kinetic energy into electric energy. An arrangement of this kind is advantageous for electro-mechanical energy converters with a high power rating that perform a major share of the work in a hybrid drive system.

The graphs in FIGS. 39a, 39b, 40a, 40b, 41a and 41b represent time profiles of an up-shift process that is assisted by an electro-mechanical energy converter as described in the context of the preceding drawing figures. The shift process is subdivided into the phases a–e. Three selected possibilities of performing the shift process are represented by the examples of the FIGS. 39a–41b.

Figure 39A:
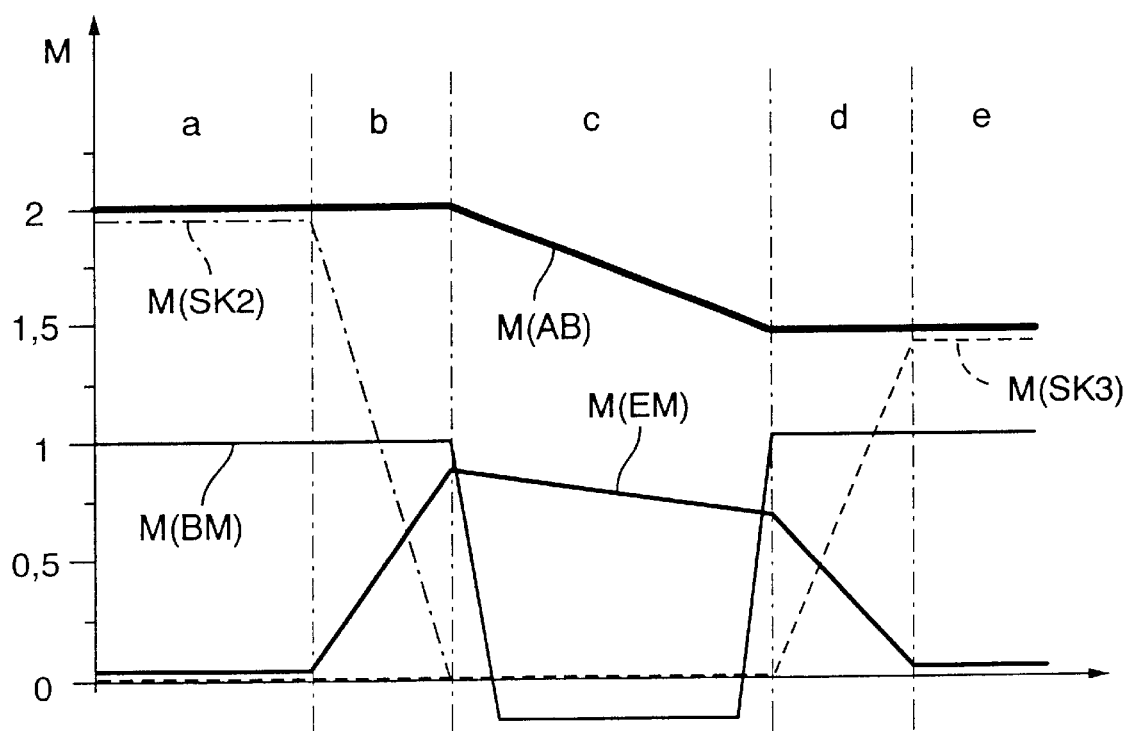
FIGS. 39a to 41b represent time profiles of torques and rpm rates during a gear shift.
Figure 39B:
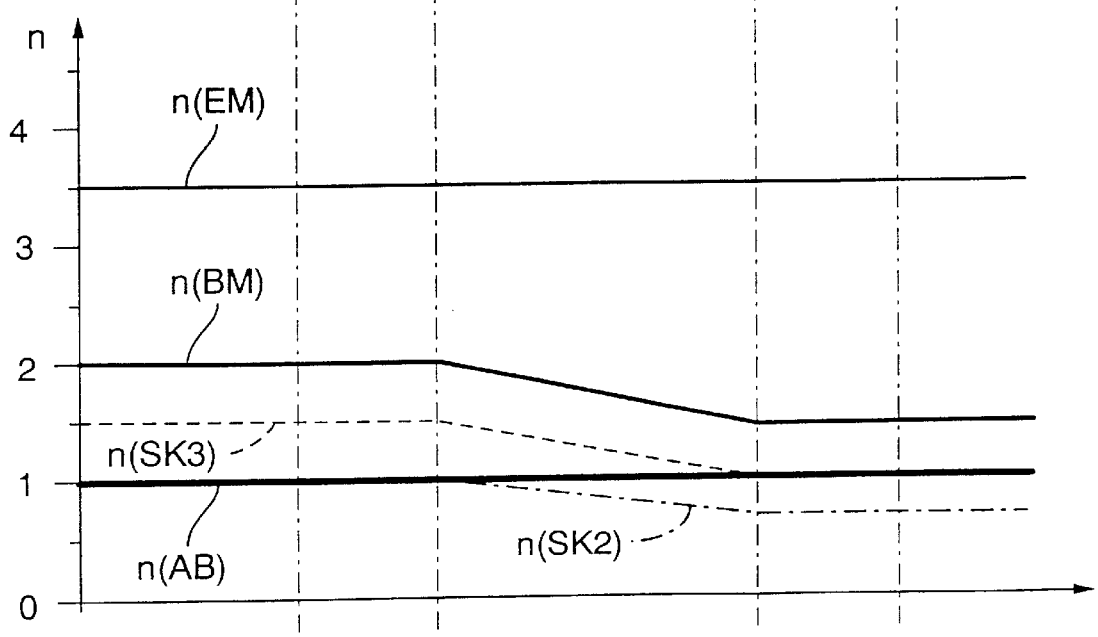

The FIGS. 39a and 39b show an example where the electro-mechanical energy converter replaces the full amount of traction during the shift process, with FIG. 39a showing torques and FIG. 39b showing rpm rates through the phases of the shift process in arbitrary units.

Phase a represents the conditions before the shift process, e.g., an up-shift from second to third gear, is started. The combustion engine applies the torque M(BM) to the transmission input shaft. Passing through the gear stage II, the torque is magnified according to the ratio of second gear to an amount M(SK2) at the shift clutch on the output shaft. The electro-mechanical energy converter is not supplying a torque M(EM) at this time, being coupled to the input shaft and running at an rpm rate n(EM) corresponding to the gear ratio between the input shaft and the electro-mechanical energy converter, thereby using part of the torque M(BM) to generate electricity. The electro-mechanical energy converter can also be selectively set to idle along. The output torque M(AB) and output rpm rate n(AB) of the transmission are mathematically tied together with the other quantities mentioned above.

In phase b, the shift process is started as the electro-mechanical energy converter applies an increasing amount of torque through another gear level, e.g., level I, to the output shaft while the torque M(BM) supplied by the combustion engine is simultaneously reduced and the rpm rates stay the same. After the torque M(SK2) through the shift clutch at second gear has been reduced to zero, the latter shift clutch is moved out of engagement. The output torque M(AB) stays substantially unchanged during phase b.

After the shift clutch of second gear has been disengaged, the sliding sleeve is synchronized during phase c with the free gear of shift level III. With the electro-mechanical energy converter supplying the entire output torque M(AB), the shift clutch for third gear can be brought into engagement as soon as the synchronous rpm rate has been attained.

The synchronization in phase c means that the rpm rate n(BM) of the combustion engine is allowed to be slowed down sufficiently by the drag torque of the engine that the free gear of shift level III (which is coupled to the engine through the corresponding fixed gear and the transmission input shaft) matches the rpm rate n(SK3) of corresponding sliding sleeve or shift clutch, at which point the engagement can take place.

After the engagement of the shift clutch, the combustion engine is powered up again in phase d, and the supply of electric current to the motor/generator is taken back to zero.

The benefit of completely replacing vehicle traction during a gear shift is evident from the torque profile M(AB) of the transmission output shaft which shows that the output torque never dips to a lower level than the output torque at the new shift level after the gear change.

Phase e shows the stationary amounts of torque and rpm rate after the shift into third gear has been completed.

Figure 40A:
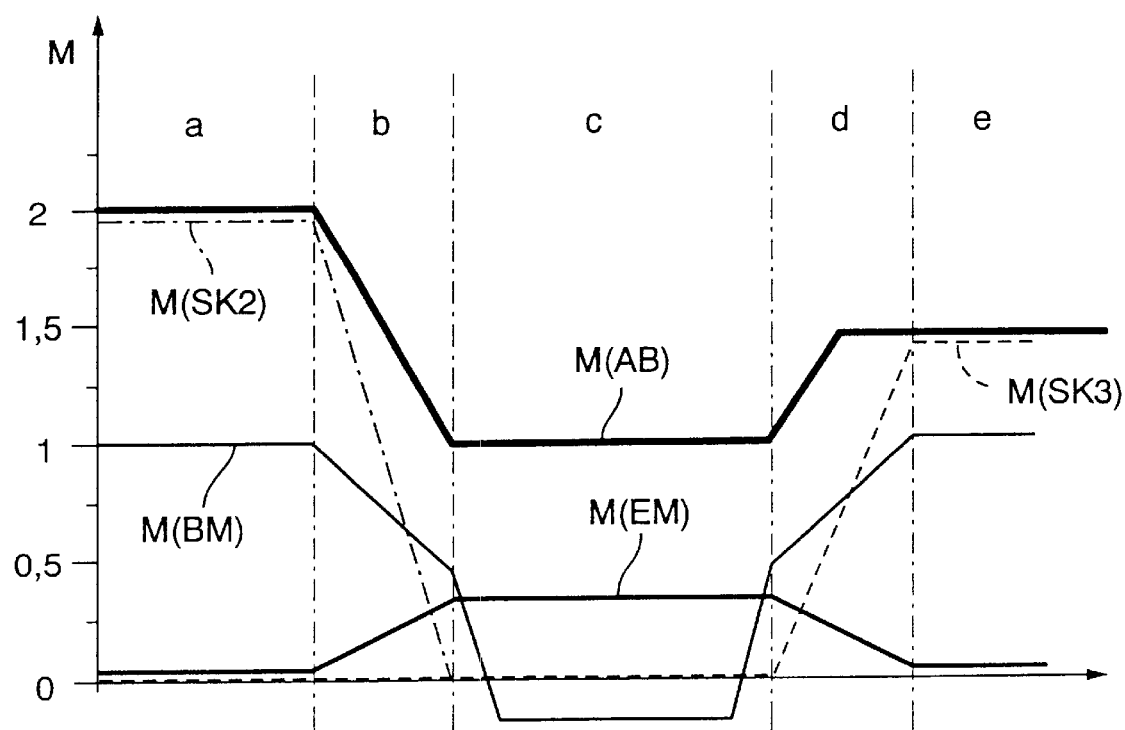
Figure 40B:
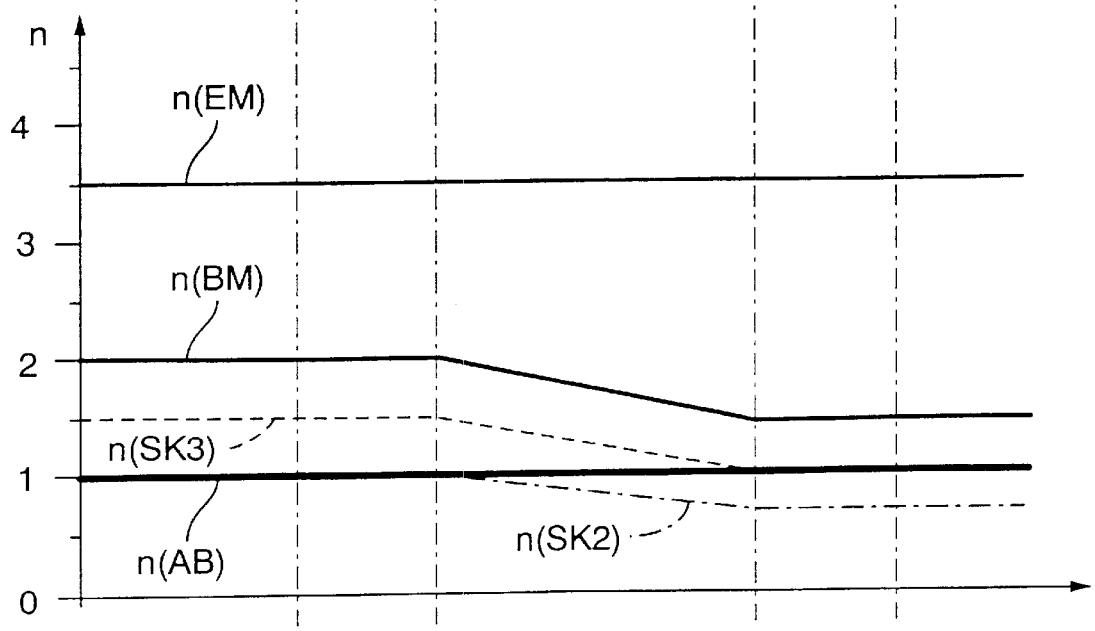

The FIGS. 40a and 40b illustrate in a manner analogous to FIGS. 39a, 39b how an up-shift from second to third gear is performed with only a partial replacement of the engine torque M(BM) by a less powerful electro-mechanical energy converter. In this example, too, the electro-mechanical energy converter is operated at a constant rpm rate during the shift process. In contrast to the preceding example of a full replacement of the engine torque, the less powerful electro-mechanical energy converter of the present example cannot supply the full amount of torque M(EM) required to replace the engine torque M(BM) for a torque-free state of the shift clutch at third gear, after the shift clutch has been disengaged from second gear. To ensure a torque-free state of the shift clutch at third gear, the engine torque is cut back to reach the level of the torque M(EM) of the electro-mechanical energy converter by the end of phase b, i.e., an amount that the electro-mechanical energy converter will be able to replace during the phase c, with only a slight reduction in the output torque M(AB) during the shift process.

Figure 41A:
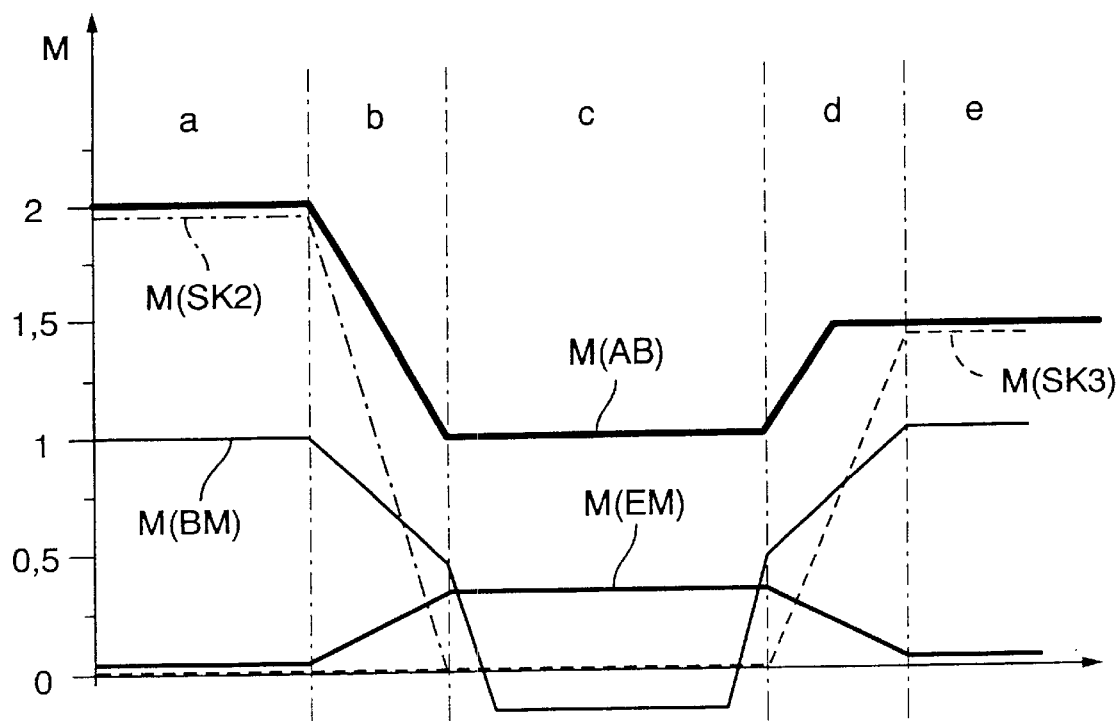
Figure 41B:
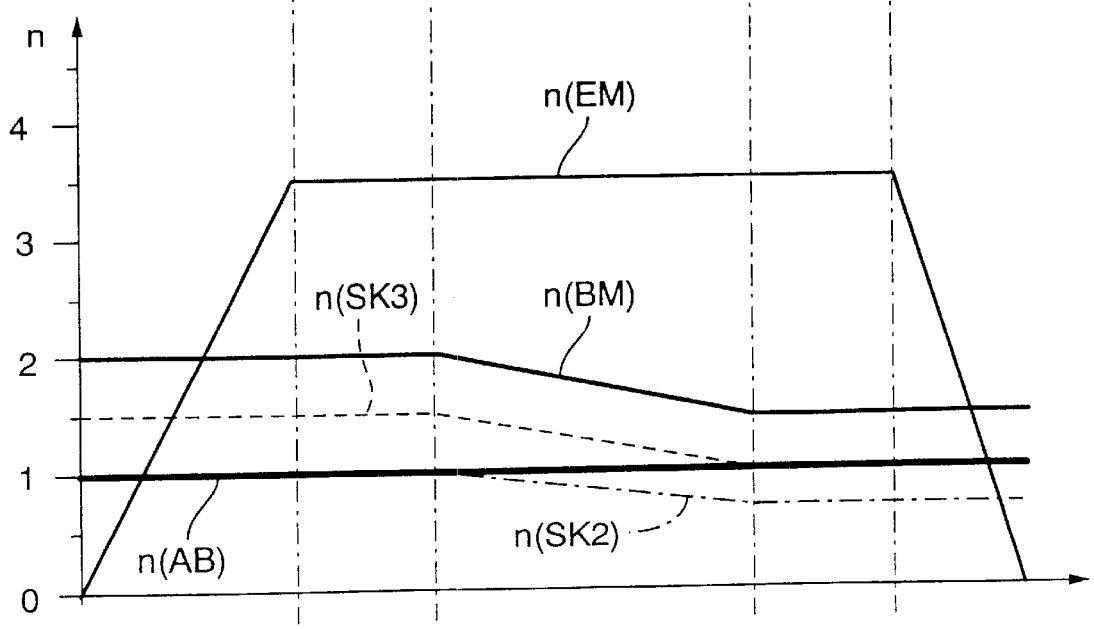

The FIGS. 41a and 41b illustrate a slightly modified version of the example of FIGS. 40a and 40b, in which the electric motor generator is at rest before and after the shift process and therefore the rpm rate n(EM) has to be raised from zero to its working level during phase a and cut back to zero again during phase e.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A transmission comprising at least two shafts, one of the shafts being an input shaft and another of the shafts being an output shaft, a plurality of gears arranged to cooperate in gear pairs, a plurality of clutches, and an electro-mechanical energy converter with at least a rotor and a stator, wherein the transmission is shiftable between a plurality of different transmission ratios and is adapted to transmit a torque between the input shaft and the output shaft, the input shaft being adapted so that it can be driven by an engine torque of a crankshaft of a combustion engine of a vehicle, and at least one of the clutches is adapted to engage and disengage a first connection between the rotor and at least one of the input shaft and the output shaft, wherein the at least one of the clutches is adapted to alternatively switch said first connection so that the input shaft is engaged while the output shaft is disengaged and vice versa.

2. The transmission of claim 1, wherein said first connection is arranged between the rotor and the output shaft.

3. The transmission of claim 1, wherein said first connection is arranged between the rotor and the input shaft.

4. The transmission of claim 1, wherein the output shaft delivers an output torque dependent on the engine torque; wherein the engine torque is interrupted during time intervals when the transmission is shifted from one transmission ratio to another, said interruption causing a deficiency in output torque; and wherein during said time intervals the electro-mechanical energy converter delivers an electric motor torque to the output shaft, thereby reducing said deficiency.

5. The transmission of claims 3, wherein the input shaft is adapted to be coupled to the crankshaft.

6. The transmission of claim 5, wherein the electro-mechanical energy converter is adapted for starting the combustion engine.

7. The transmission of claim 1, wherein the electro-mechanical energy converter is adapted for driving at least a part of the transmission.

8. The transmission of claim 1, further comprising a storage device for electrical energy, wherein the rotor receives mechanical energy from the transmission and the electro-mechanical energy converter converts the mechanical energy into electrical energy and feeds the latter into the storage device.

9. The transmission of claim 1, wherein at least one of said plurality of clutches is adapted to engage and disengage a second connection between the input shaft and the crankshaft.

10. The transmission of claim 1, wherein the plurality of clutches comprises a start-up clutch.

11. The transmission of claim 1, wherein the rotor has an axis of rotation arranged coaxially with one of the input shaft and the output shaft.

12. The transmission of claim 1, wherein the rotor has an axis of rotation arranged parallel to one of the input shaft and the output shaft.

13. The transmission of claim 1, further comprising at least one shift-clutch actuator unit; wherein the gear pairs comprise free gears mounted rotatably on one of the at least two shafts and the clutches comprise shift clutches adapted to selectively lock said free gears to said one shaft; wherein the gear pairs further comprise fixed gears mounted non-rotatably on another of the at least two shafts; wherein the selective locking of said free gears serves to select one of said plurality of transmission ratios; and wherein the at least one shift-clutch actuator unit serves to actuate at least one of the shift clutches in an automated mode of operation.

14. The transmission of claim 13, wherein at least one of the shift clutches is a friction clutch.

15. The transmission of claim 13, wherein at least one of the shift clutches comprises a synchronization device interposed between shift clutch and free gear.

16. The transmission of claim 10, wherein the start-up clutch is designed as a friction clutch.

17. The transmission of claim 10, wherein the start-up clutch is designed as a hydrodynamic clutch.

18. The transmission of claim 10, further comprising a clutch bell housing; wherein the start-up clutch is arranged inside the clutch bell housing.

19. The transmission of claim 1, wherein at least one of said plurality of clutches is a dry friction clutch.

20. The transmission of claim 10, wherein the start-up clutch is arranged inside the transmission housing.

21. The transmission of claim 10, wherein the start-up clutch is a hydrodynamic torque converter.

22. The transmission of claim 21, wherein the hydrodynamic torque converter comprises a converter-bypass clutch.

23. The transmission of claim 1, further comprising at least one actuator unit; wherein at least one of the plurality of clutches comprises a slave cylinder and said actuator is energized by a pressure medium supplied by a pressure-medium source and controlled by at least one valve; said at least one valve directing the pressure medium to the at least one slave cylinder and thereby actuating said at least one clutch.

24. The transmission of claim 1, further comprising at least one electrically energized actuator unit to actuate at least one of said plurality of clutches, said electrically energized actuator unit comprising at least one of an electric motor and an electro-magnet.

25. The transmission of claim 24, wherein the electrically energized actuator unit comprises at least one of a motion-amplifying mechanism, a motion-reducing mechanism, and a motion-transmitting mechanism arranged in series after the at least one of an electric motor and an electro magnet.

26. The transmission of claim 13, wherein at least one of the shift clutches comprises a slave cylinder; the at least one shift-clutch actuator unit is energized by a pressure medium supplied by a pressure-medium source and controlled by at least one valve; said at least one valve directing the pressure medium to the at least one slave cylinder and thereby actuating said at least one shift clutch.

27. The transmission of claim 1, wherein the electro-mechanical energy converter is adapted to perform at least one of the functions of starting the combustion engine of the vehicle, generating electrical energy from kinetic energy, and storing said electrical energy in a storage device.

28. The transmission of claim 13, wherein the electro-mechanical energy converter is adapted for at least one of driving the transmission and being driven by the transmission by way of one of the fixed gears.

29. The transmission of claim 1, further comprising a flywheel; wherein the electro-mechanical energy converter is adapted for at least one of driving the transmission and being driven by the transmission by way of the flywheel.

30. The transmission of claim 1, wherein the electro-mechanical energy converter is adapted for at least one of driving the transmission and being driven by the transmission by way of the input shaft.

31. The transmission of claim 29, wherein the stator and the rotor are arranged coaxially with the input shaft and the rotor is mounted non-rotatably on the flywheel.

32. The transmission of claim 1, wherein the stator and the rotor are arranged coaxially with the input shaft and the rotor is mounted non-rotatably on a flange element connected to the input shaft.

33. The transmission of claim 10, wherein the shifting from one transmission ratio to another comprises the steps of disengaging the start-up clutch, shifting out of a currently active gear, shifting into a new gear, and re-engaging the start-up clutch; and wherein the electro-mechanical energy converter is activated to supply torque to the transmission when the start-up clutch, in the course of being disengaged, ceases to transmit one hundred percent of the engine torque to the input shaft.

34. The transmission of claim 33, wherein during the step of disengaging the start-up clutch, the electro-mechanical energy converter supplies torque at a rate of increase designed to compensate for at least a part of a decrease of torque entering the transmission through the start-up clutch.

35. The transmission of claim 34, wherein after completion of the step of disengaging the start-up clutch, the amount of torque supplied by the electro-mechanical energy converter changes from a current amount of torque to a new amount of torque as required for shifting into the new gear.

36. The transmission of claim 35, wherein while the start-up clutch is disengaged, the electro-mechanical energy converter contributes an amount of torque within a range delimited by said current amount and said new amount.

37. The transmission of claim 35, wherein while the start-up clutch is disengaged, the electro-mechanical energy converter contributes an amount of torque below a range delimited by said current amount and said new amount.

38. The transmission of claim 33, wherein during all of said steps for shifting the transmission from one ratio to another, the electro-mechanical energy converter is kept at a constant rpm rate.

* * * * *